(12) United States Patent
Ragogna et al.

(10) Patent No.: US 9,481,743 B2
(45) Date of Patent: Nov. 1, 2016

(54) POLYELECTROLYTE POLYMERS, THEIR MANUFACTURE AND USE

(71) Applicant: The University of Western Ontario, London (CA)

(72) Inventors: Paul Ragogna, London (CA); Ryan Guterman, Thornhill (CA); Elizabeth R. Gillies, London (CA); Timothy Christopher Corkery, Montreal (CA); Bradley Michael Berven, London (CA)

(73) Assignee: THE UNIVERSITY OF WESTERN ONTARIO, London, ON (CA)

( * ) Notice: Subject to any disclaimer, the term of this patent is extended or adjusted under 35 U.S.C. 154(b) by 0 days.

(21) Appl. No.: 14/774,298

(22) PCT Filed: Mar. 7, 2014

(86) PCT No.: PCT/CA2014/050193
§ 371 (c)(1),
(2) Date: Sep. 10, 2015

(87) PCT Pub. No.: WO2014/138959
PCT Pub. Date: Sep. 18, 2014

(65) Prior Publication Data
US 2016/0032028 A1 Feb. 4, 2016

Related U.S. Application Data

(60) Provisional application No. 61/784,364, filed on Mar. 14, 2013.

(51) Int. Cl.
*B01J 49/00* (2006.01)
*B01J 39/20* (2006.01)
(Continued)

(52) U.S. Cl.
CPC ............. *C08F 30/02* (2013.01); *B01J 41/14* (2013.01); *C08F 2/48* (2013.01); *C08F 30/06* (2013.01);
(Continued)

(58) Field of Classification Search
CPC .......... C08F 30/02; C08F 30/06; C08F 2/48; C08F 292/00; C09D 133/04; C09D 5/14; C08J 5/20; B01J 41/14; C08K 3/346; C08L 2312/06
USPC .................................... 521/28, 38
See application file for complete search history.

(56) References Cited

U.S. PATENT DOCUMENTS 3,168,502 A * 2/1965 Sexsmith ................. C08F 8/40
510/469
5,633,115 A * 5/1997 Jaeger .................... B41N 3/034
101/459
2012/0220740 A1 8/2012 Geremia et al.

FOREIGN PATENT DOCUMENTS

WO 9410214 5/1994
WO 2012174543 12/2012

OTHER PUBLICATIONS

International Search Report in PCT/CA2014/050193 dated Jul. 15, 2014.
(Continued)

*Primary Examiner* — William Cheung
(74) *Attorney, Agent, or Firm* — Lynn C. Schumacher; Stephen W. Leonard; Hill & Schumacher

(57) ABSTRACT

A method of forming a polyelectrolyte polymer by photopolymerizing a monomer having an ionic group covalently linked to a photocurable group. The ionic group can be borate and/or phosphonium ion. The polymer can be crosslinked as by diacrylate.

49 Claims, 22 Drawing Sheets

(51) Int. Cl.
| | |
|---|---|
| C08F 30/02 | (2006.01) |
| C08F 30/06 | (2006.01) |
| C08F 2/48 | (2006.01) |
| C09D 133/04 | (2006.01) |
| C08J 5/20 | (2006.01) |
| B01J 41/14 | (2006.01) |
| C08F 292/00 | (2006.01) |
| C08K 3/34 | (2006.01) |
| C09D 5/14 | (2006.01) |

(52) U.S. Cl.
CPC ............... *C08F 292/00* (2013.01); *C08J 5/20* (2013.01); *C08K 3/346* (2013.01); *C09D 5/14* (2013.01); *C09D 133/04* (2013.01); *C08L 2312/06* (2013.01)

(56) References Cited

OTHER PUBLICATIONS

Written Opinion in PCT/CA2014/050193 dated Jul. 15, 2014.
Jocelyn J. Tindale et al., Highly fluorinated phosphonium ionic liquids: novel media for the generation of superhuydrophobic coatings, The Royal Society of Chemistry 2009, pp. 1831-1833.
Jocelyn J. Tindale et al., Synthesis and characterization of fluorinated phosphonium ionic liquids, Can. J. Chem. 85: 660-667, 2007.
J.J. Tindale et al., Thiol appended, fluorinated phosphonium ionic liquids as covalent superhydrophobic coatings, Journal of Molecular Liquids 152 (2010) 14-18.
Masahiro Yoshizawa et al., Novel Polymer Electrolytes Prepared by Copolymerization of Ionic Liquid Monomers, Polym. Adv. Technol. 13, 589-594 (2002).
Hiroyuki Ohno et al., Development of new class of ion conductive polymers based on ionic liquids, Electrochimica Acta 50 (2004) 255-261.
Shijing Cheng et al., Phosphonium-Containing ABA Triblock Copolymers: Controlled Free Radical Polymerization of Phosphonium Ionic Liquids, Macromolecules 2011, 44, 6509-6517.
H. Ghassemi et al., Main-Chain Poly(arylene ether) Phosphonium Ionomers, Appl. Organometal. Chem. 12, 781-785 (1998).
Hechun Lin et al., Application of Ionic Liquids in Photopolymerizable Holographic Materials, Optical Materials 33 (2011) 759-762.
Evan S. Hatakeyama et al., New protein-resistant coatings for water filtration membranes based on quaternary ammonium and phosphonium polymers, Journal of Membrane Science 330 (2009) 104-116.
Zulma Jimenez et al., Photopolymerization Kinetics of Ionic Liquid Monomers Derived from the Neutralization Reaction Between Trialkylamines and Acid-Containing (Meth)Acrylates, Polymer Chemistry, 2007, 45, 13, 3009-3021.
Bradley M. Berven et al., Self-Crosslinking Borate Anions for the Production of Tough UV-Cured Polyelectrolyte Surfaces, Journal of Polymer Science, Part A: Polymer Chemistry, 2013, 51, 499-508.
Chengzhong Cui, Synthesis of Ionic Boron Amphiphilic Diblock Copolymers and Pyridylborate Ligands for Transition Metal Complexes, The State University of New Jersey, USA 2010 Cf. pages 167, 117, 118.
Akihiko Kanazawa et al., Novel Polycationic Biocides: Synthesis and Antibacterial Activity of Polymeric Phosphonium Salts, Journal of Polymer Science: Part A: Polymer Chemistry, vol. 31, 335-343 (1993).

\* cited by examiner (a)

(b)

(a)

(b)

(a)

(b)

(a)  (b)  (c)

(a)

(b)

(a)

(b)

POLYELECTROLYTE POLYMERS, THEIR MANUFACTURE AND USE

CROSS REFERENCE TO RELATED APPLICATIONS

This patent application is a National Phase application claiming the benefit of PCT/CA2014/050193 entitled "POLYELECTROLYTE POLYMERS, THEIR MANUFACTURE AND USE" and filed Mar. 7, 2014, in English, which further claims the priority benefit of U.S. Provisional Application Ser. No. 61/784,364 filed Mar. 14, 2013, the contents of which are incorporated herein in their entirety by reference.

FIELD

This invention relates to the field of polyelectrolyte polymers. The polymers can be functionalized and substrates can be provided with functionalized surfaces.

BACKGROUND

Over the past several decades, UV-curing has given rise to new functional materials in various fields of polymer science. The attraction of photopolymerization stems from the excellent control over the spatial and temporal polymerization process,[1,2] along with high cross-linking densities[3,4] and low energy cost. To broaden the scope of potential applications for this technique, there is a need to introduce new polymers with unconventional functionality for the growing demand in industry. Polyelectrolytes have been filling a niche in polymer science as they have noticeable differences in their chemical and physical properties as compared to neutral polymers.[5,6] This includes their conformation in solution, the propensity to form gels, and the potential to form layer-by-layer architectures on a surface.[7-9] Bringing polyelectrolyte chemistry and photopolymerization together represents a paradigm shift in what may lead to new functional materials.

UV-curing is the process by which a thin layer or film of liquid monomer is polymerized using UV light. Polymerization propagates via free radical mechanisms using a light sensitive initiator and monomer containing, for example, acrylates, methacrylates, or styrenes. Radicals are formed by the cleavage of the initiator which commences polymerization. Reactions rates are initially extremely high as a large pool of unreacted monomer surrounds the radicals. As the polymer propagates, cross-linked networks are formed. This results in the vitrification of the polymer matrix during which propagation slows and the rate of termination increases. This is a diffusion-controlled process, as radicals no longer have the mobility required to continue the reaction. Typically within a second the reaction is complete and the material is a hard, cross-linked solid.

Thermal curing is currently the dominant method in the coatings industry. Despite its usefulness, considerable drawbacks still plague the thermal cure. Thermal curing generally requires use of a large amount of solvent to process and deposit the material, as the viscosity of the formulation is otherwise too high. After deposition of resin, ovens heat up the material to the desired temperature for up to an hour to effect the thermal curing step. This process is energy intensive and requires ventilation to handle resulting volatile organic compounds. Startup and shutdown times of these systems consume energy while not producing product. UV curing systems, on the other hand, display higher efficiency with few of the thermal processing issues.

The photopolymerization industry has yet to incorporate electrolytes into their coating formulations, despite potential uses for the resulting films. Polyelectrolyte films have mainly been employed as surface-modifying agents, exploiting their ionic properties.[9] One use for charged polymers is for the fabrication of layer-by-layer (LbL) assemblies. Charged substrates are dipped back and forth between solutions of positively and negatively charged polymer. During each immersion, a thin layer of polyelectrolyte is adsorbed, and the surface charge is reversed. Depending on choice of solvent, the ionic strength of the solution, and polyelectrolyte, users are capable of controlling film thickness.[9] Recently, LbL assemblies have been shown to exhibit excellent gas barrier properties, act as anti-corrosion coatings, and as vehicles for drug delivery.[8,10,11] The broad scope of the technique stems from the use of charged molecules to form electrostatic bonds as opposed to covalent bonds, which require appropriate functionality to facilitate formation. LbL assemblies have also been made through various other means utilizing bio-recognition,[12,13] hydrogen-bonding, or host-guest interactions.[14,15] Currently, electrostatic assemblies dominate the field. To deposit the first charged polyelectrolyte, substrates are treated.[10,11,16] Chemical treatments of glass, quartz, or metal are the most common method to create a charged surface. In cases where chemical treatment has not been an option, such as for wood or plastics, LbL deposition is not viable, limiting the scope of potential applications for the technique. Polyelectrolyte LbL assemblies have also been known to flow depending on temperature and humidity, which may result in decreased performance.[10,11,17] A potential way to improve upon such problems would be to have the ability to form robust polyelectrolyte networks on any desired substrate.

SUMMARY

In a broad aspect, the present invention is a polyelectrolyte polymer in which an electrolyte is covalently bound to the polymer. The ionic moiety becomes covalently bound to the polymer matrix as the polymer forms during a photocuring process.

Generally, the polymer is formed from a cross-linking monomer, for example a diacrylate, and the ionic moiety is bound to a photoreactive moiety, for example an acrylate, to become covalently linked as part of the polymeric network during the propagation reaction. The curing process is generally photoinduced, typically in the presence of a photoinitiator.

The polymeric network can be formed as a film which may or may not be secured to an underlying substrate. The polymer can also take other forms such as a nanoparticle, microparticle, etc.

The invention has been demonstrated using a phosphonium ion salt linked to an acrylate or styrene.

In an aspect, the invention thus includes a method of forming a polyelectrolyte polymer. The method includes the step of photopolymerizing a monomer comprising an ionic group covalently linked to a photocurable group.

A family of monomers of the invention is shown by the structure of Formula (A):

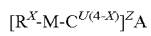

(A)

wherein:
M is a boron (B) or phosphorus (P) atom, X is a whole number from 0 to 3, each R and $C^U$ group is selected independently of each other;
each R is an optionally substituted alkyl or aryl ($Ar^1$) group;
each $C^U$ includes a photocurable moiety; and
when M is boron, A is a cation, and Z=−1, and
when M is phosphorus, A is an anion, and Z=+1.

The alkyl group can be C1-C30 straight chain, branched or cycloalkyl, and the alkyl group is optionally substituted with one or more of halogen and phenyl. The phenyl can also be optionally substituted with e.g., one or more of halogen and C1-C6 alkyl. The aryl group ($Ar^1$) can be a phenyl group optionally substituted up to five times with a halogen, C1-C30 straight chain, branched or cycloalkyl, and the alkyl or cycloalkyl group can be optionally substituted with one or more halogen, wherein each substitution is made independently of the other.

In particular embodiments in which M is a phosphorus atom, R can have the formula —$CH_2R'$ in which R' is C1-C29 straight chain, branched or cycloalkyl group, where the group is optionally substituted with one or more of halogen and optionally substituted phenyl.

R can have the formula —$CH_2$ $CH_2R''$ in which R'' is C1-C28 straight chain, branched or cycloalkyl, and the alkyl group can be optionally substituted with one or more of halogen and optionally substituted phenyl. R' and R'' can be perfluorinated. Optional phenyl substituents are halogen, C1-C8 alkyl.

In particular embodiments in which M is boron, R is an optionally substituted aryl group.

A photocurable moiety can include, for example, a group selected from alkene, isocyanate, alcohol, epoxide, and thiol, wherein the alkene is optionally conjugated with a carbonyl or aryl group.

In certain embodiments, M is phosphorus and $C^U$ has the formula —(C1-C12 alkyl)-$R^U$ wherein $R^U$ includes a photocurable moiety.

In certain embodiments, wherein $R^U$ has the structure defined by formula (B) or (C):

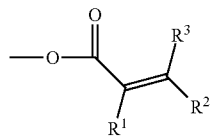
(B)

wherein each of $R^1$, $R^2$ and $R^3$ of (B) is independently selected from the group consisting of H, methyl, ethyl and propyl;

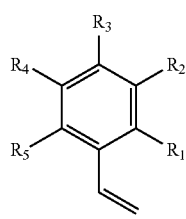
(C)

wherein at least one of $R^1$, $R^2$, $R^3$, $R^4$ and $R^5$ of (C) is a bond covalently linking the aromatic ring of (C) to the C1-C12 alkylene diradical of —(C1-C12)-$R^U$, and each of the others of $R^1$, $R^2$, $R^3$, $R^4$ and $R^5$ is selected independently from the group consisting of H, halogen and optionally substituted C1-C8 alkyl.

In certain embodiments in which M is boron, $C^U$ has the structure defined by formula (C) wherein at least one of $R^1$, $R^2$, $R^3$, $R^4$ and $R^5$ of (C) is a bond and each of the others of $R^1$, $R^2$, $R^3$, $R^4$ and $R^5$ is selected independently from the group consisting of H, halogen and C1-C8 alkyl.

Methods include the step of photopolymerizing includes photopolymerizing a mixture of two or more monomers as defined above. The step of photopolymerizing can photopolymerizing a mixture of a monomer(s) and a cross-linking agent.

Advantageously, the method includes forming a homogeneous mixture of the monomer and the cross-linking agent prior to the step of photopolymerizing. Forming a homogeneous mixture can includes sonicating the mixture. Forming a homogeneous mixture can include mixing a solvent and monomer(s) and the cross-linking agent. It is also possible in instances to mix the monomer and the cross-linking agent together in the absence of solvent.

Examples of cross-linking agents are EB 130, ethylene glycol diacrylate, hexanediol diacrylate, diethylene glycol diacrylate, glycerol diacrylate, trimethylol propane triacrylate, hexane diol dimethacrylate, glycerol triacrylate, trimethylolpropane triacrylate, ethylene glycol dimethacrylate, 1,3-propanediol dimethacrylate, 1,2,4-butanetriol trimethacrylate, and 1,4-butanediol diacrylate.

In an aspect, a method of the includes forming a composite material by photopolymerizing a mixture of monomer(s) and nanoparticles and/or microparticles. Nanoparticles can silica particles, which can be passivated.

Monomer(s) can be used in a photopolymerizing process that is part of roll-to-roll polymer production process.

In another aspect, the invention provides a polyelectrolyte polymer having a polymer matrix having an phosphonium or borate salt, or a combination thereof, covalently linked thereto. The matrix can be crosslinked.

It is possible to obtain a polyelectrolyte polymer having a surface with a water contact angle greater than 120° or greater than 130°, or greater than 140° or greater than 150°.

An exemplary polyelectrolyte having a phosphonium ion and anion on an outer surface of the polymer is one in which the anion is one or more of: carboxylates ($CH_3CO_2^-$, $C_2H_5CO_2^-$, optionally substituted $ArCO_2^-$, sulfates ($HSO_4^-$, $CH_3SO_4^-$), sulfonates ($CH_3SO_3^-$), tosylates, and fluoroorganics ($(CF_3SO_2)_2N^-$, $(C_2F_5SO_2)_2N^-$, $(C_3F_7SO_2)_2N^-$, $CF_3CO_2^-$, tetraphenylborate, triphenyl(substituted aryl)borate, diphenylbis (substituted aryl)borate, phenyltris(substituted aryl)borate, tetrakis(substituted aryl) borate and tetrakis(pentafluorophenyl) borate). Here, aryl substituents are one or more of vinyl, $CF_3$, $OCH_3$, methyl, ethyl, propyl, butyl, pentyl. It is understood by the skilled person, in certain contexts throughout this specification, that the bond of a radical/substituent such as "$CF_3$" can be shown or be omitted.

As mentioned, the polymer may be formed as a coating for a substrate. In a specific example of the invention, a polymer was formed on the surface of a paper (cellulosic) product. As described in greater detail below, the anionic halide counterion of a phosphonium cationic moiety of the polymer was exchanged with clay particles and found to exhibit satisfactory optical properties.

As another example of the feasibility of the invention, monomeric constituents of the polymer were cast onto a polyester film and irradiated. Again, through anion exchange, the polymer was provided with a layer of clay particles.

In yet another specific example, a borate anion bearing phosphino ligands was exchanged onto a polymer surface with subsequent formation of a phosphino-palladium complex. The complex was found to have activity as a Suzuki cross-coupling catalyst.

In another surface modification, Au-25 nanoparticles were exchanged with phosphonium counterion to obtain an Au-25 coated polymer.

The invention includes a method of preparing or manufacturing a polyelectrolyte polymer.

These and other aspects of the invention will become apparent given the examples described in greater detail below.

BRIEF DESCRIPTION OF DRAWINGS

The invention will become more fully understood from the detailed description and the accompany figures, in which:

In FIG. 6(a), the trace for [cation−C]$^+$ appears generally above that for [cation+2H]$^+$;

FIGS. 12(c) and 12(d) (lower left and right, respectively) show a comparison between (c) AFM topography and (d) phase map images of a film with 80 w % loading. The difference in phase is indicative of two distinct interactions between the probe tip and the surface;

Figure 22:
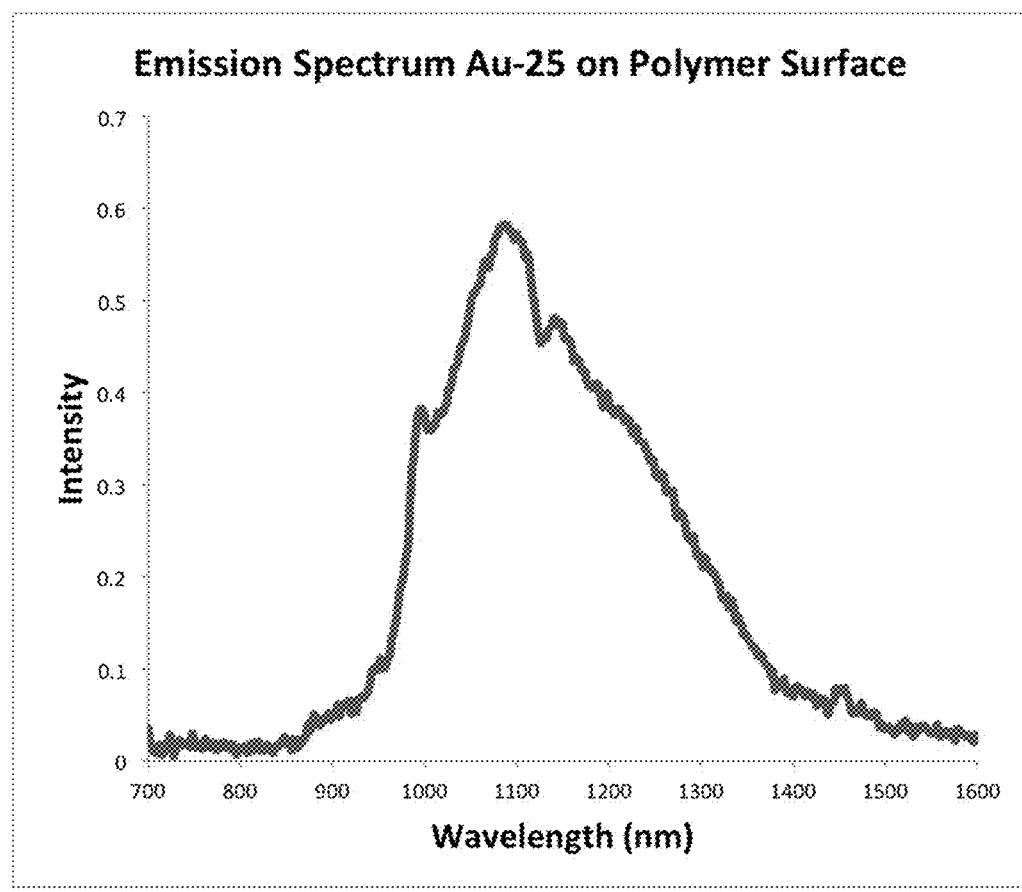
Figure 23:
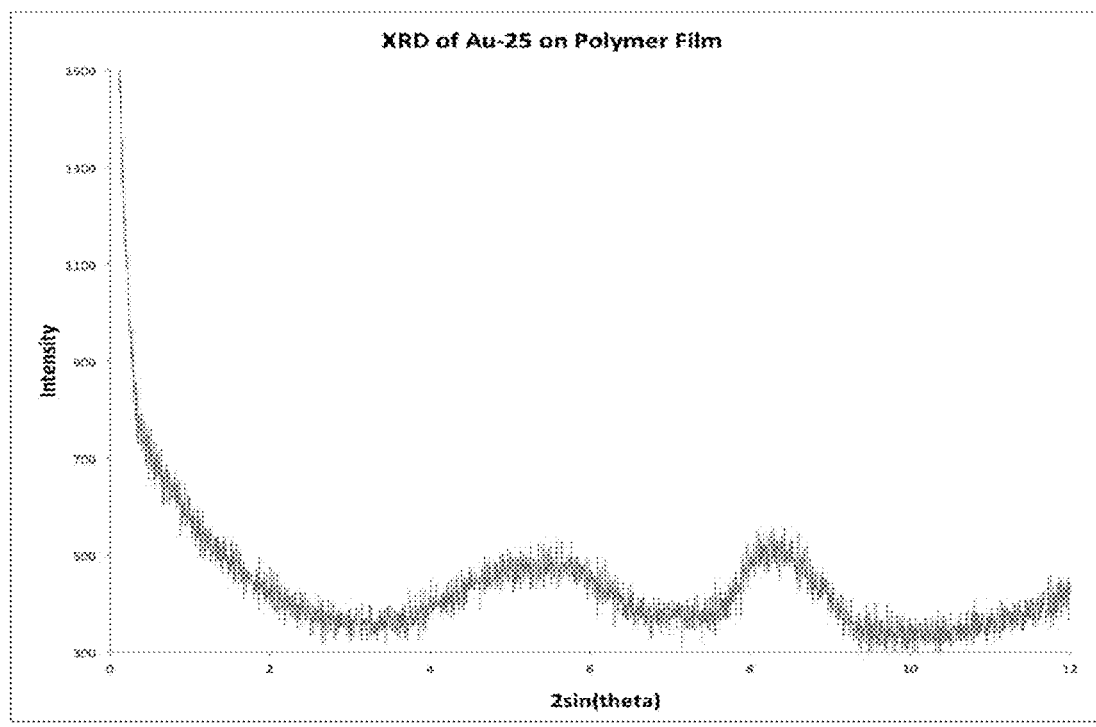
Figure 24:
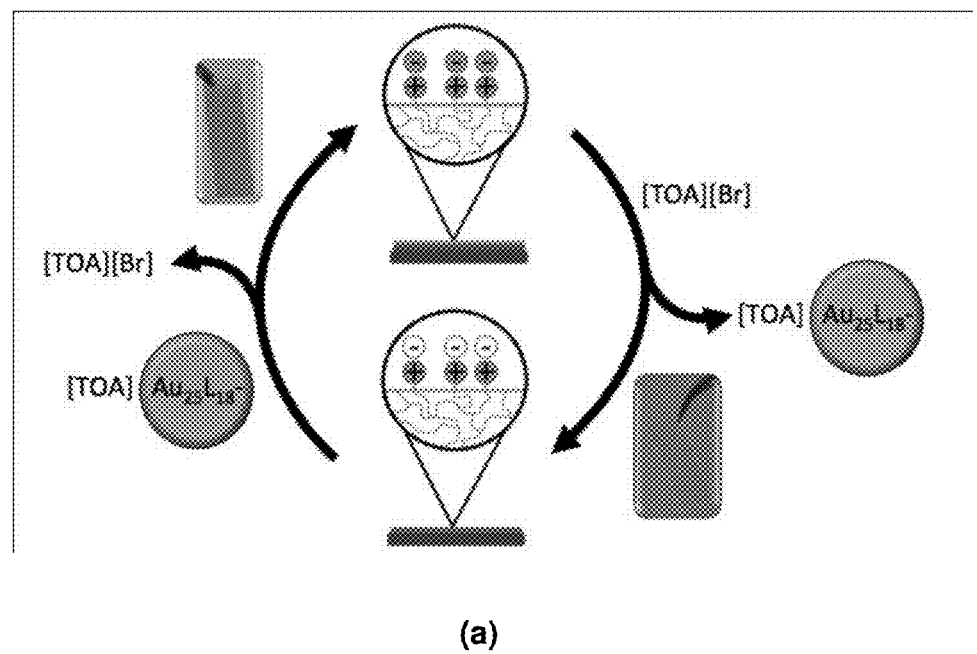
Figure 24:
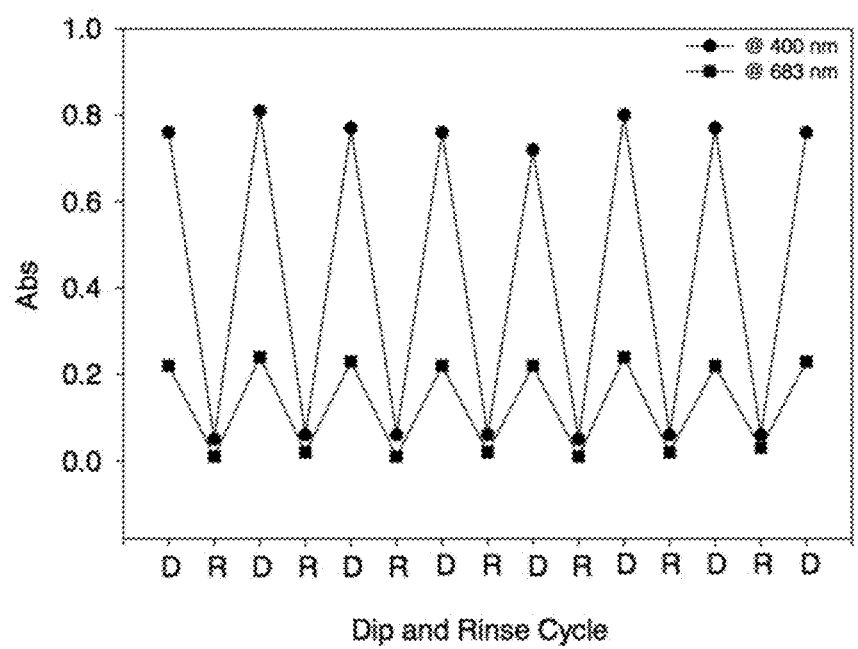
Figure 25:
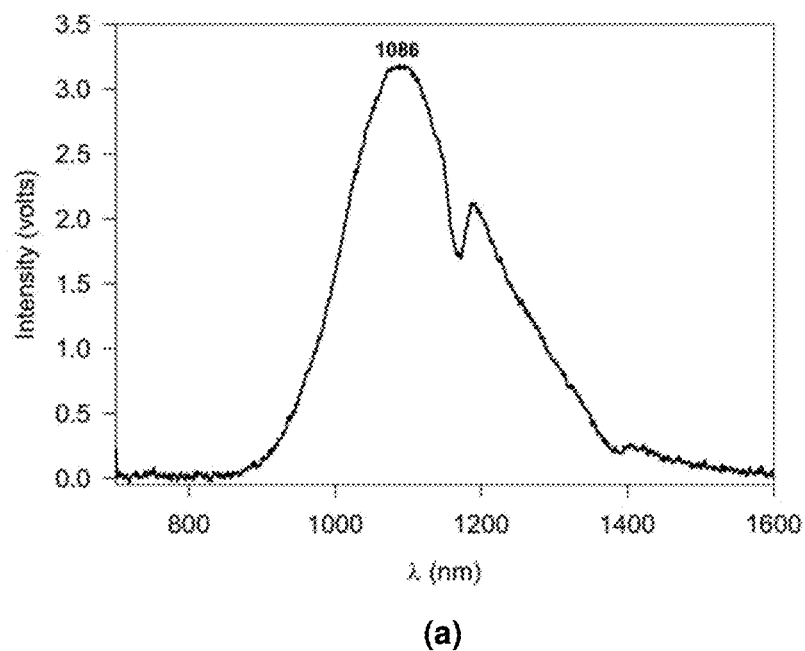
Figure 25:
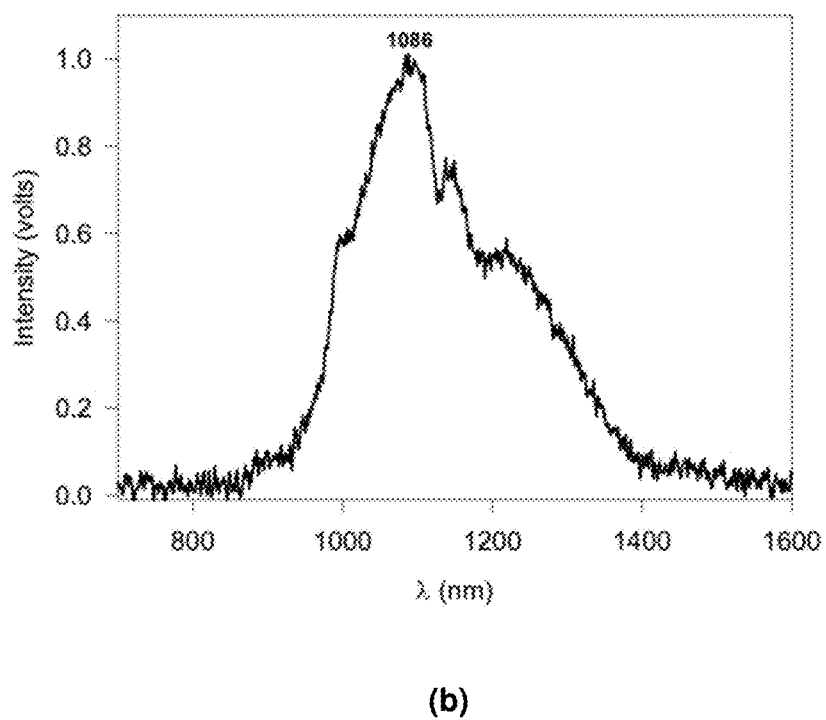

10 minutes, (lowermost to uppermost curves), respectively. The inset shows absorbance vs. dipping time;

FIG. 22 is an emission spectrum of film of EB 130 and compound [1]Cl coated in Au-25 after dipping in a 0.5 wt % solution for 5 min;

FIG. 23 is an XRD of polymer of EB 130 and compound [1]Cl film dipped in a 0.5 wt % solution of Au-25 for 5 minutes;

FIG. 24 shows, in lower plot (b), that immersion of PPF in [TOA][Au$_{25}$L$_{18}$] resulted in a burgundy coloured coating due to the replacement the bromide anion with [Au$_{25}$L$_{18}$]$^-$, forming [TOA][Br] as the byproduct. Immersion of Au$_{25}$-PPF in a solution of [TOA][Br] stripped the surface of [Au$_{25}$L$_{18}$]$^-$ forming [TOA][Au$_{25}$L$_{18}$] as a byproduct according to the scheme shown in the upper portion (a) of the figure. This process regenerated the film with bromide anions, which could then be recycled for further ion-exchange reactions; and FIG. 25 shows (a) a near-IR photoluminescence spectrum of Au$_{25}$$^-$ nanocluster in acetonitrile solution (C=0.3 mM) and (b) immobilized on the surface of IL polymer film after 10 minutes immersion in the [TOA][Au$_{25}$L$_{18}$] stock solution.

DETAILED DESCRIPTION OF THE INVENTION

Described herein are experiments which establish that a monomer containing an ionic moiety, for example a phosphonium ion or a borate ion covalently linked to an ionizable group, can be photopolymerized to form a polyelectrolyte polymer.

In one embodiment, a photopolymerizable mixture includes a cross-linking molecule which is incorporated into the matrix of the polymer.

In one set of experiments, photopolymerization mixtures containing a cross-linker and one of ionic monomers [1]NTf$_2$, [2]NTf$_2$ and [3]NTf$_2$ were used to form polyelectrolyte polymer films.

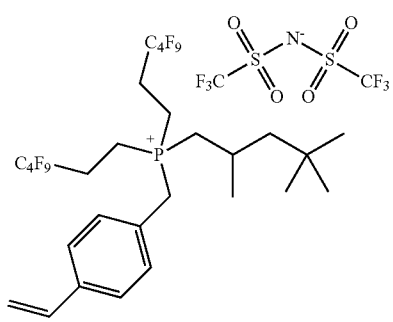

[1]NTf$_2$

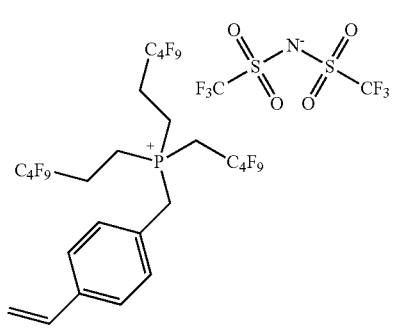

[2]NTf$_2$

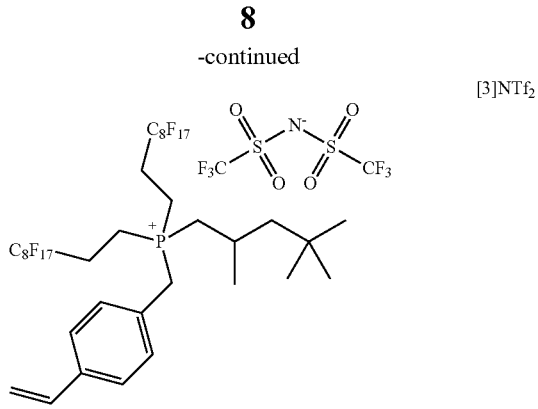

[3]NTf$_2$

Various properties of the monomers were studied, and some comparisons with properties e.g., miscibility in various solvents of the corresponding chloride salts were made. Polymers were produced using the bis(trifluoromethylsulfonyl)imide salts of each of the monomers and a diacrylate cross-linker. With inclusion of sufficient monomer in the polymerizable composition, polymers having an increased water contact angle (WCA) compared to similar polymers produced without the monomers were obtained. Examination of the polymers found the ionic phosphonium to be located at the air-polymer interface suggesting the availability of the phosphonium center and/or its substituents for further chemistry e.g., anion exchange in layer-by-layer deposition.

Fluorinated phosphonium salts, when coated on a roughened substrate, have been seen to produce superhydrophobic surfaces.[18] The possibility of producing a superhydrophobic surface through photocuring was thus explored. More specifically, effects of altering the photopolymerizable monomer and amount of surface-passivated silica nanoparticles incorporated into a polymerizable mixture were examined. Surface-passivated (PDMS) hydrophobic nanoparticles were thus incorporated into polymerizable compositions and the feasibility of obtaining photocured superhydrophobic coatings in a way that is amenable to roll-to-roll industrial production was established. Experiments showed, for example, that formation of a highly loaded polymer could be obtained using the phosphonium-chloride monomer [1]Cl containing perfluorobutyl groups:

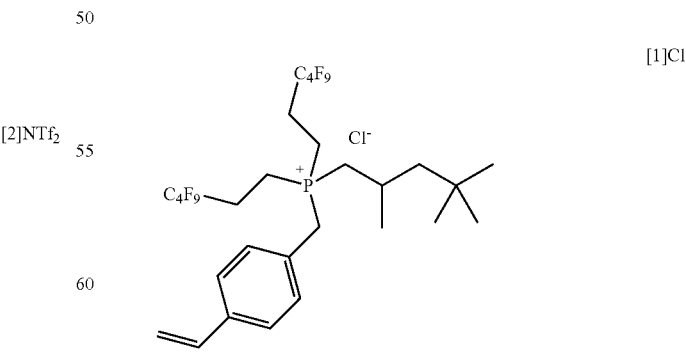

[1]Cl

In another series of experiments, changes in WCA as a function of alumina microparticle loading were examined for compounds [1]X and [2]X.

[1]X

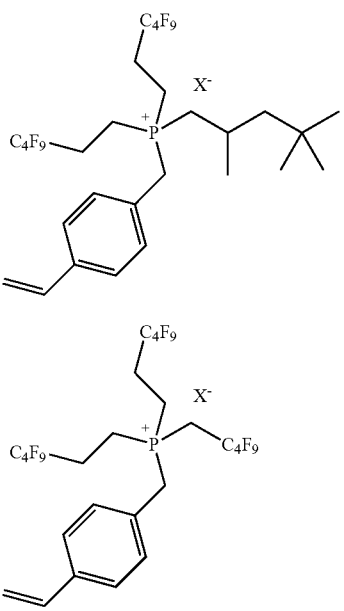

[2]X where X⁻ is Cl⁻ or $N((SO_2)CF_3)_2^-$. In all cases, it was found possible to obtain a superhydrophobic UV-cured polymer film i.e., a film having a WCA in excess of 150°.

In another series of experiments, changes in WCA as a function of silica nanoparticle loading were examined for compounds [1]X and [2]X.

Properties of a cross-linked polymer of the invention were also examined. A monomer [4]Cl was UV-cured in the presence of a diacrylate cross-linker.

[4]Cl

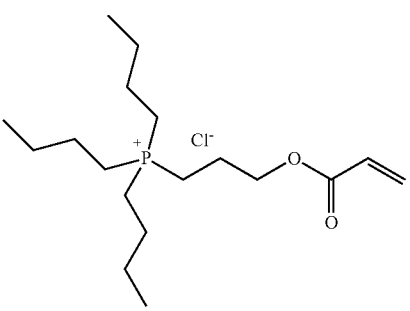

Polymers having different amounts of the ionic salt were produced and found capable of killing bacteria, the capability being related to the proportion of the monomer incorporated into the polymerization mixture.

A similarly cross-linked polymer was produced and the surface modified by exchange of the counter-anion of the phosphonium salt. Polymers having a surface layer comprising clay platelets or Au-25 nanoclusters were thus created. In another case, a triphosphino substituted borate was deposited on the polymer surface and palladium catalyst prepared therefrom. In the exemplary embodiment, the catalyst was found to be active in catalyzing a Suzuki cross-coupling reaction.

Unless otherwise specified, or required by its context, the word "comprise" and "include", in their various forms, are to be construed as being inclusive and open ended, and not exclusive. Specifically, when used in this specification including claims, the terms "comprises", "comprising", "includes" and "including" and variations thereof mean the specified features, steps or components are included. These terms are not to be interpreted to exclude the presence of other features, steps or components. The term "consist", in its various forms is to be construed as being closed ended. So, for example, a mixture containing a prepolymer mixture in which the prepolymers consist of A and B means that the only prepolymers present are the prepolymers A and B.

The contents of all references and publications cited herein are incorporated into this specification as though reproduced herein in their entirety.

A "cross-linking monomer" or a "cross-linker" of the invention is a monomer containing two or more reactive groups, e.g. the ethylene unsaturation of an acrylic acid ester group (—CH═CHC(O)O—R) or styrene group (styrenyl radical: —($C_6H_4$)CH═$CH_2$) that can be induced to chemically react and form covalent bonds with reactive groups of other molecules in a free radical reaction when photoirradiated in the presence of a photoinitiator. Reactive groups of a monomer are typically "separately reactive" meaning that although covalently linked to each other within the monomer, they are not conjugated to each other and are free to chemically react independently of each other in a polymerization or cross-linking reaction. A typical "cross-linker" is an organic compound having at least two ethylenically unsaturated groups having a molecular weight of about 700 Daltons or less.

"Photopolymerizing" a reactant mixture means exposing the mixture to photons e.g., UV radiation so that reactants undergo free radical reaction to form a polymer matrix.

One component of a photopolymerization reaction of the invention is a monomer having an ionic salt and a reactive group that participates in the reaction to form a polyelectrolyte polymer of the invention. The ionic salt and reactive portions of the monomer are covalently linked to each other.

In illustrated embodiments, the ionic salt is part of a monomer having one, two, three or four photoreactive groups. A cross-linking monomer can be included in a mixture to be photocured.

In certain embodiments, there are two or more monomers that react to form a polyelectrolyte polymer in which the monomers are miscible with each other at room temperature without the aid of a solvent or other auxiliary agent that needs to be removed after the polymer is formed. By miscible is meant that the two monomers can be mixed, and if necessary or desired, agitated as by sonication, specifically insonation, to form a homogenous mixture (single liquid phase) which retains its homogeneity for a length of time required to be cast and photopolymerized.

A "photoreactive" or "photocurable" group is a chemical moiety which forms radicals to form covalent bonds with other molecules when exposed to irradiating, typically UV, light. So a "photoreaction" refers to a reaction in which one or more reactants form a product in the presence of photons. Typically, such reactions are conducted in the presence of a photoinitiator. Also, the photons involved are generally in the UV-range 250 to 390 nm), which as described elsewhere herein lends control to a reaction.

A "polyelectrolyte polymer", sometimes referred to as a "polyionic polymer", as used herein, refers to a polymer which under some set of conditions (e.g., physiological conditions) has a net positive or negative charge resulting from ions covalently bound to the matrix of the polymer. Polycations e.g., phosphoniums have a net positive charge and polyanions e.g., borates of this invention have a net negative charge. In the case of a polyelectrolyte polymer that is polycationic, the cationic species is not protonated. A specific example of this is a polymer in which a phosphonium salt is covalently linked to the polymer matrix. A phosphonium salt covalently linked to a polymer has the structure $(-PR^1R^2R^3)^+X^-$ in which the bond to the phosphorus atom is a link to the polymer matrix. This corresponds to the bond the phosphorus atom has to the remainder of the monomer containing a photocurable group prior to polymerization. All of $R^1$, $R^2$ and $R^3$ are other than a hydrogen, and one or more of these can also contain a photocurable group of the monomer so can also serve to covalently link the phosphonium incorporated into the polymer. $X^-$ may be any anion and is often a halide, usually $Br^-$ or $Cl^-$ in the polymer produced during photopolymerization. As exemplified herein the anion, if it is not covalently linked to polymer can be exchanged for another anion or polyanionic species, having a desired characteristic. A borate salt covalently linked to a polymer has the structure $(-BR^1R^2R^3)^-X^+$ in which the bond to the boron atom is a link to the polymer matrix. This corresponds to a bond the boron atom has to the remainder of the monomer reactant prior to polymerization. All of $R^1$, $R^2$ and $R^3$ are other than a hydrogen, and one or more or all of these can also contain a photocurable group of the monomer so can also serve to covalently link the borate to the polymer matrix produced during photopolymerization.

The polymer matrix may comprise one or more polymers, as well as, additional reagents incorporated in the polymerization of various polymers such as initiators, catalysts, solvents, and the like. Polymers are macromolecules of an individual monomer or monomers. The polymer matrix may comprise a single polymer or more than one polymer.

One can thus see that reactive groups of the cross-linking monomer and ionic monomer react with each other to form or become part of the polymeric network of a polyelectrolyte polymer of the invention.

UV curing formulations of illustrated embodiments utilize cross-linking monomers to tune the viscosity of the mixture of the cross-linking monomer and ionic monomer. Examples of such cross-linking monomers are diacrylates, triacrylates, dimethacrylates, etc. These monomers are thus incorporated into the product polymer, so it possible to form the polymer without use of a solvent that would need to be removed afterwards. The cross-linking and ionic monomers are miscible with each other. In illustrated embodiments, the cross-linking and ionic monomers are insonated to form a homogenous mixture prior to curing of the mixture.

As mentioned above, an ionic salt forms part of an ionic monomer. The salt can be any ionic salt covalently bound to a suitable reactive group that will react by photopolymerization with reactive groups of other photocurable monomers, and a cross-linking monomer if present.

The bulbs that are responsible for producing UV light consume much less energy than traditional heating ovens with essentially zero start-up time. Irradiance time for photopolymerization systems can vary depending on the application, but full cure is often achieved in a matter of seconds.[1] A small collection of lamps can replace an entire curing oven, thus drastically reducing the amount of space required to cure. This allows for high throughput of material, thus increasing the amount of product one can produce per unit time. One common technique is the "roll-to-roll" process. First, a UV bulb is placed in a housing over a variable speed conveyor. The substrate on the conveyor is irradiated by UV light and fully polymerizes before exiting. Complete polymerization occurs in a matter of seconds, which is generally not possible with thermal curing systems.

One can thus appreciate application of the present invention in preparation of LbL. Cross-linked networks can be formed almost instantly on any flat or three-dimensional substrates due to the rapid polymerization rates associated with free radical chemistry[1-4]. Photopolymerized coatings can possess resistance to solvent, impact, temperature, and abrasion[19]. Substrate choice is not so limited because polymerization may occur on any surface at or near room temperature.

EXPERIMENTAL

Syntheses of all compounds were conducted under a $N_2$ atmosphere and prepared in a nitrogen-filled MBraun Labmaster 130 glove box unless otherwise noted. Phosphine quaternization and anion exchange reactions were prepared in a nitrogen filled MBraun Labmaster dp glove box and worked up under air.

Cytop 183 (2,4,4-trimethylpentyl)phosphine, ADDITOL HDMAP (2-hydrox-2-methy-1-phenyl-propanone), HDDA (hexanediol diacrylate), Ebecryl 12™ (EB 12), and EB 130, 1-hydroxycyclohexylphenylketone (CPK), 2,4,4-trimethylpentyl-bis(1H,1H,2H,2H-perfluorohexyl)phosphine, 1-hydroxycyclo hexylphenylketone (CPK) and $PH_3$ (g) were from Cytec Canada Inc.

Acetone, dichloromethane, lithium bistriflamide, benzotrifluoride, chloroform, 4-chloromethylstyrene, dimethylformamide, hexanes, isopentane, lithium bis(trifluoromethylsulfonyl)imide, magnesium sulfate and 1H,2H,2H-perfluorohex-1-ene, ethyl acetate, benzene, 4-chloromethylstyrene, 1,2-dibromoethylene, and 4-bromostyrene were purchased from Alfa Aesar and used as received, except where noted. 3-bromo-1-propanol was purchased from Alfa Aesar and purified through basic alumina. Acryloyl chloride was also purchased from Alfa Aesar and distilled prior to use.

2,2,3,4,4,4-Hexafluorobutylmethacrylate was purchased from SynQuest Labs., Inc. and used without purification.

Surface-passivated superhydrophobic nanoparticles were purchased from SkySpring Nanomaterials Inc. as a dry powder and used as received.

Clay powder (Nanofill 116) was donated by Southern Clay Products and also used as received. Literature procedures were used for the synthesis of thallium tris(bisphenylphosphino) borate and bis(benzonitrile)palladium(II) chloride[20]. ([$Au_{25}L_{18}$]$^-$ TOA$^+$ (TOA=tetraoctyl ammonium) nanoclusters were prepared as described below.

Solvents were purchased from Caledon and dried using either an MBraun Solvent Purification System or an Innovative Technologies Inc. Solvent Purification System. Solvents used in the glove box were deoxygenated and dried using an MBraun controlled atmosphere solvent purification system and stored over 4 Å molecular sieves. 1H,2H,2H-perfluorohex-1-ene was deoxygenated prior to use by bubbling $N_2$ through it for 30 minutes. 2,2'-Azobis(2-methylpropionitrile) (AIBN) was obtained from DuPont Chemicals and used as received. Acetone-$d_6$ and chloroform-d were purchased from Cambridge Isotope Laboratories and used as received. Dried solvents were collected under vacuum in a flame dried Strauss flask and stored over 4 Å molecular sieves (3 Å for acetonitrile) in the dry box. Triethylamine was purchased from Caledon and distilled from KOH prior to use. Deuterated chloroform was purchased from Caledon and stored over 4 Å molecular sieves in the dry box. Tetrahydrofuran and diethyl ether were deoxygenated and dried using an MBraun controlled atmosphere solvent purification system and stored over 4 Å molecular sieves. Acetone-$d_6$ was purchased from Cambridge Isotope Laboratories and used as received.

Cross-Linked Ionic Hydrophobic Polymers 4-vinylbenzyl chloride and acetone-$d_6$ were purchased from Sigma Aldrich and used as received. Nuclear Magnetic Resonance (NMR) spectroscopy was conducted on a Varian INOVA 400 MHz spectrometer ($^1$H, 400.09 MHz, $^{31}$P{$^1$H} 161.82 MHz, $^{19}$F, 376.15 MHz). All $^1$H spectra were referenced relative to tetramethyl silane (CDCl$_3$; $^1$H $\delta_H$=7.26 ppm and CO(CD$_3$)$_2$; $^1$H $\delta_H$=2.04). The chemical shifts for $^{31}$P{H} NMR spectroscopy were referenced using an external standard (85% H$_3$PO$_4$; $\delta_P$=0). The chemical shifts for $^{19}$F{$^1$H} NMR spectroscopy were also referenced using an external standard (trifluorotoluene; $\delta_F$=−63.9 ppm). Infrared spectra were recorded using a Bruker Tensor 27 spectrometer using attenuated total reflectance mode (ATR) using a ZnSe crystal. Sonication of the UV curable formulations was conducted in an E60H Elmasonic sonicator at frequency of 37 kHz using an effective power of 100 W. Deposition of the formulation was performed using a 25-micron Meyer Rod purchased from Gardco on microscope slides purchased from Technologist Choice unless otherwise noted. UV curing was performed using a modified UV curing system purchased from UV Process and Supply Inc. with a mercury bulb. Samples were irradiated with an energy density of 1956 mJ/cm$^2$ and an irradiance of 1383 mW/cm$^2$. Water contact angles (WCA) were measured using a Kruss DSA100 Drop Shape Analyzer and analyzed using Drop Shape Analysis. Thermal degradation was determined using Thermal Gravimetric Analysis (TGA) on a Q600 SDT TA instrument. A sample of 5-15 mg was placed in an aluminum cup and heated at a rate of 10° C./min from room temperature to 600° C. under nitrogen atmosphere (100 mL/min). Glass transition temperatures were determined using Differential Scanning calorimetry (DSC) on a DSC Q20 TA instrument. A sample of approximately 10 mg was placed in an aluminum Tzero pan and underwent a heat/cool/heat profile at 10° C./min under nitrogen atmosphere (100 mL/min). Data was acquired from the final heat cycle of the heat/cool/heat profile. Melting points of all HFPS were determined using a Gallenkamp Variable Heater in air. Mass spectrometry was recorded in both positive and negative ion modes using electrospray ionization (ESI) Micromass LCT spectrometer. Elemental analysis (EA) was performed by the Elemental Analysis Laboratory at the Université de Montreal. Time-of-fight Secondary Ion Mass Spectrometry (TOF-SIMS) measurements were performed using an ION-TOF (Gmbh) TOF-SIMS IV equipped with a Bi cluster liquid metal ion source. A 25 keV Bi$_3^+$ cluster primary pulsed ion beam (10 kHz, pulse width 20 ns) was used to bombard the surface to generate secondary ions. The positive or negative secondary ions were extracted from the sample surface, mass separated and detected via a reflectron-type time-of-flight analyser. Depth profiles were obtained by repeating the following cycle: sputtering an area of 500 µm×500 µm on the sample surface with a 3 keV Cs$^+$ ion beam for 0.5 s followed by, with a delay of 2 s, collecting mass spectra at 128×128 pixels with the Bi$_3^+$ ion beam over an area of 245 µm×245 µm in the center of the sputtered area.

Solubility/Miscibility Tests

Approximately 5-10 mg of compound was added to a test tube followed by the addition of 1.5 mL of solvent followed by 5 seconds of gentle stirring. If dissolution was not observed immediately, the mixture was further stirred and sonicated for 30 seconds. Material was deemed soluble if the resulting solution was free of particulate and haze, determined by visual inspection. Material was deemed insoluble a large majority of the powder did not dissolve. If solutions remained hazy, they were referred to as emulsion mixtures.

Film Preparation

A desired amount of photoinitiator, crosslinker, and phosphonium salt were weighed and combined in screw top vials. The mixture was then insonated at 45° C. for 20 min until the solutions were free of particulate and haze. After cooling to room temperature, the solutions were cast on glass slides and irradiated with UV light three times.

Synthesis of [1]Cl 2,2,4-trimethylpentyl-bis(1H,1H,2H,2H-perfluorohexyl) phosphine (8.04 g, 12.60 mmol) and 4-vinylbenzyl chloride (3.85 g, 25.19 mmol) were dissolved in dimethylformamide (7 mL) and heated to 120° C. under an N$_2$ atmosphere. The reaction was monitored by $^{31}$P{$^1$H} NMR spectroscopy and complete after 3 hours. The product was precipitated in hexanes as a light brown solid. Recrystallization (dichloromethane into hexanes, followed by stirring in isopentane) yielded a white, crystalline solid. (4.77 g, 54%); Anal. Calcd for C$_{29}$H$_{34}$ClF$_{18}$P: C, 44.04%; H, 4.33%. Found: C, 44.91%; H, 4.08%. T$_m$: 95.3-95.7° C. IR: n(C—F) 1133 cm$^{-1}$, n(HC=CH$_2$) 990 cm$^{-1}$. $^1$H NMR (acetone-d$_6$, δ) 7.60 (d, 2H, $^3$J=10.8 Hz), 7.38 (d, 2H, $^3$J=8.0 Hz), 6.64 (dd, 1H, $^3$J=17.4 and 10.8 Hz), 5.72 (d, 1H, $^3$J=17.4 Hz), 5.15 (d, 1H, $^3$J=11.4 Hz), 4.85 (d, 2H, $^3$J=16.0 Hz), 3.18-2.91 (m, 4H), 2.82-2.65 (m, 8H), 2.38-2.26 (m, 1H), 1.51-1.28 (m, 2H), 1.21 (d, 2H, $^3$J=6.4 Hz), 0.89 (s, 9H). $^{19}$F{$^1$H} NMR (acetone-d$_6$, δ) −80.9 to −81.2 (m, 6F), −114.75 (bs, 2F), −123.68 (bs, 2F), −125.90 (bs, 2F); $^{31}$P{$^1$H} NMR (acetone-d$_6$, δ) 35.7 (s). MS (ESI+, %): 755.1 ([cation]$^+$, 100), 1545.3 ([(cation)$_2$+anion]$^+$, 30). MS (ESI−, %): 825.1 ([M+Cl]$^-$, 10), 689.1 ([M-C$_6$H$_4$CH=CH$_2$]$^-$, 10).

Synthesis of [1]NTf$_2$

Compound [1]Cl (1.09 g, 1.37 mmol) and lithium bis(trifluoromethylsulfonyl)imide (0.800 g, 2.74 mmol) were dissolved in dichloromethane (12 mL) and allowed to stir under an N$_2$ atmosphere. Once there was no further visible accumulation of precipitate (40 hours), the reaction mixture was partitioned between dichloromethane (100 mL) and water (100 mL), the organics washed with water (2×100 mL), dried (MgSO$_4$) and the solvent removed. The resulting pale yellow oil was triturated with diethyl ether/hexanes (10/90, 50 mL) to afford a white powder that was filtered and dried in vacuo. (1.24 g, 87%); Anal. Calcd for C$_{31}$H$_{34}$F$_{24}$NO$_4$PS$_2$: C, 35.95%; H, 3.31%; N, 1.35%. Found: C, 36.19%; H, 3.31%; N, 1.27%. T$_m$: 88.1-88.8° C. IR: n(C—F anion) 1347 cm$^{-1}$, n(C—F cation) 1135 cm$^{-1}$, n(SO$_2$) 1057 cm$^{-1}$, n(HC=CH$_2$) 988 cm$^{-1}$. $^1$H NMR (acetone-d$_6$, δ) 7.57 (d, 2H, $^3$J=7.6 Hz), 7.48 (d, 2H, $^3$J=7.6 Hz), 6.76 (dd, 1H, $^3$J=17.4 and 10.8 Hz), 5.84 (d, 1H, $^3$J=18.0 Hz), 5.30 (d, 1H, $^3$J=10.8 Hz), 3.08-3.01 (m, 4H), 2.86-2.74 (m, 8H), 2.43-2.31 (m, 1H), 1.51-1.40 (m, 2H), 1.27 (d, 3H, $^3$J=6.4 Hz), 0.92 (s, 9H); $^{19}$F{$^1$H} NMR (acetone-d$_6$, δ) −80.0 (s, 6F), −81.9 to −82.0 (m, 6F), −115.6 to −115.7 (m, 4F), −124.5 (bs, 4F). −126.6 to −126.7 (m, 4F). $^{31}$P{H} NMR (acetone-d$_6$, δ) 34.5 (s). MS (ESI+, %): 755.1 ([cation]$^+$, 100), 1790.3 ([(cation)$_2$+anion]$^+$, 10). MS (ESI−, %): 1314.9 ([cation+(anion)$_2$]$^-$, 50), 281.2 ([NTf$_2$]$^-$, 100)

Synthesis of [2]Cl

Tris(1H,1H,2H,2H-perfluorohexyl)phosphine[21] (5.15 g, 6.67 mmol) and 4-vinylbenzyl chloride (2.12 g, 13.34 mmol) were dissolved in dimethylformamide (8 mL) and heated to 120° C. while stirring under an N$_2$ atmosphere. The reaction was monitored by $^{31}$P{$^1$H} NMR spectroscopy and complete after 3 hours. The reaction mixture was precipitated into benzene, filtered, redissolved in acetone and freeze dried in vacuo, yielding off-white crystals (3.37 g, 55%); Anal. Calcd for $C_{27}H_{21}ClF_{27}P$: C, 35.06%; H, 2.29%. Found: C, 35.07%; H, 2.28%. $T_m$: 79.5-81.4° C. IR: n(C—F) 1133 cm$^{-1}$, n(HC=CH$_2$)$_{990}$ cm$^{-1}$. $^1$H NMR (acetone-d$_6$, δ) 7.71 (d, 2H, $^3$J=9.6 Hz), 7.45 (d, 2H, $^3$J=8.4 Hz), 6.73 (dd, 1H, $^3$J=17.6 and 10.8 Hz), 5.80 (d, 1H, $^3$J=17.6 Hz), 5.26 (d, 1H, $^3$J=11.2 Hz), 5.15 (d, 2H, $^3$J=16.8 Hz), 3.47-3.35 (m, 6H), 3.02-2.88 (m, 6H). $^{19}$F{$^1$H} NMR (acetone–d$_6$, δ) −82.1 (s, 9F), −115.5 to −115.6 (m, 6F), −124.5 (bs, 6F), −126.7 to −126.8 (m, 6F). $^{31}$P{$^1$H} NMR (acetone-d$_6$, δ) 38.0 (s). MS (ESI+, %): 889.0 ([cation]$^+$, 100). MS (ESI−, %): 959.0 ([M+Cl]$^-$, 40), 822.9 ([M-C$_6$H$_4$CH=CH$_2$]$^-$, 100).

Synthesis of [2]NTf$_2$

Compound [2]Cl (1.60 g, 1.73 mmol) and lithium bis(trifluoromethylsulfonyl)imide (1.14 g, 3.97 mmol) were dissolved in chloroform/benzotrifluoride (1:1, 20 mL) and allowed to stir under an N$_2$ atmosphere (48 hours). The reaction mixture was partitioned between benzotrifluoride (50 mL) and water (50 mL), washed with water (2×50 mL), dried (MgSO$_4$), and the volatiles removed. The oily product was triturated in dichloromethane to afford a white solid that was filtered, rinsed with dichloromethane (2×10 mL) and dried in vacuo. (1.25 g, 63%); Anal. Calcd for $C_{29}H_{21}F_{33}NO_4PS_2$: C, 29.78%; H, 1.81%; N, 1.20%. Found: C, 29.93%; H, 1.52%; N, 1.19%. $T_m$: 55.3-56.2° C. IR: n(C—F anion) 1344 cm$^{-1}$, n(C—F) 1133 cm$^{-1}$, n(SO$_2$) 1061 cm$^{-1}$, n(HC=CH$_2$) 990 cm$^{-1}$. $^1$H NMR (acetone-d$_6$, δ) 7.78 (d, 2H, $^3$J=8.4 Hz), 7.50 (d, 2H, $^3$J=8.4 Hz), 6.77 (dd, 1H, $^3$J=18.0 and 11.2 Hz), 5.87 (d, 1H, $^3$J=18.0 Hz), 5.31 (d, 1H, $^3$J=10.8 Hz), 4.45 (d, 2H, $^3$J=14.8 Hz), 3.28-3.17 (m, 6H), 2.98-2.81 (m, 6H). $^{19}$F{$^1$H} NMR (acetone-d$_6$, δ) −80.1 (s, 6F), −82.0 to −82.1 (m, 9F), −115.5 to −115.6 (m, 6F), −124.5 (bs, 6F). −126.7 to −126.8 (m, 6F). $^{31}$F{$^1$H} NMR (acetone-d$_6$, δ) 37.2 (s). MS (ESI+, %): 888.9 ([cation]$^+$, 100). MS (ESI−, %): 1448.7 ([cation+(anion)$_2$]$^-$, 80), 1169.5 ([M]$^-$, 70), 280.1 ([NTf$_2$]$^-$, 100).

Synthesis of [3]Cl

A 250 mL pressure tube was charged with bis(1H,1H,2H,2H-perfluorooctyl)(2,4,4-trimethylpentyl)phosphine (5.0 g, 4.98 mmol) and 2 molar equivalents of 4-vinylbenzyl chloride (1.52 g, 9.96 mmol) in 100 mL of a 2:1 mixture of deoxygenated DMF and trifluorotoluene. The mixture was heated at 125° C. for 6 hours. Volatiles were removed at 60° C. in vacuo. The viscous yellow oil was redissolved in a minimal amount of acetone (10 mL) and precipitated in stirring hexanes (100 mL). This process was repeated three additional times. The oil was heated in vacuo at 60° C. until a yellow solid was obtained. (4.24 g, 65%); Anal. Calcd for $C_{37}H_{34}ClF_{34}P$: C, 37.31%; H, 2.88%. Found C, 37.38%; H, 3.18%. $T_m$: 72.5-73.5° C.; $T_g$: 35° C. IR: n(C—F) 1145 cm$^{-1}$, n(HC=CH$_2$) 952 cm$^{-1}$. $^1$H NMR (acetone-d$_6$, δ): δ 7.74 (d, 2H, $^3$J=8 Hz), 7.49 (d, 2H, $^3$J=8 Hz), 7.74 (d, 2H, $^3$J=8 Hz), 6.75 (dd, 4H, $^3$J=12 Hz (trans), $^3$J$_{1H-1H}$=8 Hz (cis)), 5.84 (d, 1H, $^3$J=20 Hz), 5.27 (d, 1H, $^3$J=12 Hz), 5.00 (d, 2H, $^3$J=16 Hz), 2.54-3.40 (m, 10H), 2.26-2.4 (m, 1H), 1.51 (m, 1H), 1.30-1.45 (m, 1H), 1.25 (d, 3H, $^3$J=8 Hz), 0.9 (s, 9H). $^{19}$F NMR (acetone-d$_6$, δ) −126.07 (s, 4F), −122.67 (m, 8F), −121.50 (m, 12F), −114.52 (s, 4F), −81.01 (t, $^3$J=8 Hz, 4F). $^{31}$P{H} NMR (acetone-d$_6$, δ) 34.8 (s). MS (ES+, %) ([cation]$^+$, 100).

Synthesis of [3]NTf$_2$

Dry deoxygenated DCM (15 mL) was added to a 50 mL roundbottom flask followed by the addition of [3]Cl (1.04 g, 0.873 mmol). After complete dissolution, 2 molar equivalents of lithium bis((trifluoromethyl)sulfonyl)imide (0.125 g, 0.437 mmol) were added and left stirring for 12 hours. The slurry was added to a separatory funnel followed by the addition of 30 mL of DCM. The organic layer was washed with distilled water (4×10 mL) and then dried with a minimal amount of sodium sulphate. Volatiles were evaporated in vacuo resulting in an orange viscous oil. (0.63 g, 50%); Anal. Calcd for $C_{39}H_{34}F_{40}NO_4PS_2$: C, 32.63% H, 2.39% N, 0.98% S 4.47%. Found: C, 32.61% H, 2.35% N, 0.97% S 4.5%. $T_g$: −16° C. IR: n(C—F anion) 1348 cm$^{-1}$, n(C—F) 1134 cm$^{-1}$, n(SO$_2$) 1060 cm$^{-1}$, n(HC=CH$_2$) 949 cm$^{-1}$. $^1$H NMR (acetone-d$_6$, δ) 7.59 (d, 2H, $^3$J=8 Hz), 7.51 (d, 2H, $^3$J=8 Hz), 6.79 (dd, 4H, $^3$J=12 Hz (trans), $^3$J=8 Hz (cis)), 5.85 (d, 1H, $^3$J=18 Hz), 5.30 (d, 1H, $^3$J=20 Hz), 4.35 (d, 2H, $^3$J=16 Hz), 2.70-3.20 (m, 10H), 2.30-2.50 (m, 1H), 1.34-1.51 (m, 2H), 1.30 (d, 3H, $^3$J=8 Hz), 0.95 (s, 9H). $^{19}$F NMR (acetone-d$_6$, δ) −79.44 (s, 6F), −81.19 (m, 6F), −114.80 (s, 4F), −121.77 (m, 12F), −122.86 (m, 8F), −126.2 (s, 4F). $^{31}$P{H} NMR (acetone-d$_6$, δ) 35.6 (s). MS (ESI+, %): 1155 ([cation]$^+$, 100). MS (ESI−, %); 1715 ([cation+(anion)$_2$]$^-$, 20).

Synthesis of Nonafluoro-Tert-Butyl Allyl Ether

A 500 mL pressure RBF was charged with sodium nonafluoro-tert-butoxide (65 g, 0.25 mol), allyl bromide (18.8 g, 0.15 mol) and DMF (150 mL, SPS purified) then heated at 90° C. for 6 hours. The reaction mixture was poured into a brine solution (200 mL) and the lower organic phase was removed and fractionally distilled under ambient conditions. The first 2 fractions were azeotropes with water (30-40° C. @ 760 mmHg, confirmed by $^1$H NMR) and the final fraction was the desired olefin, nonafluoro-tert-butyl allyl ether (23.4 g, 85 mmol, 56%, 45-47° C. @ 760 mmHg). $^1$H NMR (CDCl$_3$, δ): δ 5.9 (m, 1H, CH=CH$_2$), 5.4 (d, 1H, $^3$J$_{trans}$=16 Hz, CH=CH$_2$), 5.3 (d, 1H, $^3$J$_{cis}$=10 Hz, CH=CH$_2$), 4.6 (d, 2H, $^3$J=5 Hz, CH$_2$). $^{19}$F NMR (CDCl$_3$, δ): −71.5 (s, 9F).

Synthesis of Tris(nonafluoro-tert-butoxypropyl)phosphine

A 50 mL autoclave was charged with nonafluoro-tert-butyl allyl ether (23.4 g, 85 mmol), AIBN (1.5 g, 9.2 mmol) and purged with N$_2$. Then PH$_3$ was added to a pressure of 80 psi (7.9 mmol) and the sealed autoclave was heated to 70° C. for 5 hours. After cooling overnight the autoclave was recharged with PH$_3$ to 80 psi. The contents were then heated at 70° C. for a further 3 hours. After cooling the pressure vessel to 10° C. the remaining PH$_3$ was removed by careful and continuous purging with N$_2$ and incineration of the PH$_3$ residues in a specifically designed burn-box. The yellow reaction mixture was then fractionally distilled under vacuum to isolate the phosphine (6.7 g, 7.8 mmol, 31%, 70-75° C. @ 0.3 mmHg). $^1$H NMR (CDCl$_3$, δ): δ 4.0 (t, 6H, OCH$_2$), 1.8 (m, 6H, PCH$_2$), 1.4 (m, 6H, CH$_2$CH$_2$CH$_2$). $^{19}$F NMR (CDCl$_3$, δ): −70.7 (s, 9F). $^{31}$P{H} NMR (CDCl$_3$, δ) −32.4 (s). MS (ES+, %) 877.1 ([O=PR$_3$—H]+, 100).

Synthesis of [3b]Cl

A 70 mL pressure tube was charged with tris(nonafluorobutoxypropyl)phosphine (2.8 g, 3.25 mmol), 4-vinylbenzyl chloride (0.85 g, 6.1 mmol), acetonitrile (5 mL) and trifluorotoluene (5 mL) and heated at 80° C. for 7 hours. The volatiles were then removed and the remaining yellow oil was washed quickly with Et$_2$O (2×5 mL) and triturated with Et$_2$O at −20° C. to afford a white powder. The solid was filtered in the air on a frit and washed with cold 80/20 Et$_2$O/hexane (3×5 mL), then dried under high vacuum to afford [3b]Cl as a microcrystalline solid. It could be recrystallised from acetone/benzene at −20° C. (2.3 g, 2.3 mmol, 70%). Anal. Calcd for $C_{30}H_{27}ClF_{27}O_3P$: C, 35.50%; H, 2.68%. Found C, 35.50%; H, 2.73%. $T_m$: 120-122° C.; IR:

n(C—F) 1154 cm$^{-1}$, n(HC=CH$_2$) 971 cm$^{-1}$. $^1$H NMR (acetone-d$_6$, δ): δ 7.6 (d, 2H, $^3$J=8 Hz, Ar—H$_{ortho}$), 7.4 (d, 2H, $^3$J=8 Hz, Ar—H$_{meta}$), 6.7 (dd, 1H, $^3$J=20 Hz (trans), $^3$J$_{1H-1H}$=12 Hz (cis), CH=CH$_2$), 5.8 (d, 1H, $^3$J=20 Hz, CH=CH$_2$-trans), 5.2 (d, 1H, $^3$J=12 Hz, CH=CH$_2$-cis), 4.6 (d, 2H, $^3$J=18 Hz, Ar—CH$_2$), 4.2 (psuedo t, 6H, OCH$_2$), 2.8 (m, 6H, PCH$_2$), 2.1 (m, 6H, CH$_2$CH$_2$CH$_2$). $^{19}$F NMR (acetone-d$_6$, δ) −71.1 (s, 27F). $^{31}$P{H} NMR (acetone-d$_6$, δ) 34.1 (s). MS (ES+, %) 978.2 ([cation]$^+$, 100).

Synthesis of [3b]NTf$_2$

A 20 mL vial was charged with [3b]Cl (0.49 g, 0.48 mmol), lithium bis((trifluoromethyl)sulfonyl)imide (0.27 g, 0.93 mmol) and acetone (8 mL). The mixture was degassed by bubbling N$_2$ through for 10 minutes and then stirred for 4 hours. A small aliquot of the reaction mixture was added to water resulting in the separation of an oil in the lower phase. Analysis of the oil by $^{19}$F{$^1$H}-NMR indicated the completion of the metathesis reaction. The bulk reaction mixture was then worked up by adding to water (20 mL) and stirring vigourously for 5 minutes. The upper aqueous phase was then decanted and the remaining oil was dissolved in ethyl acetate (10 mL), dried (Na$_2$SO$_4$) and rotary-evaporated to dryness. The colourless oil was then dissolved in the minimum amount of Et$_2$O (3 mL) and the volatiles removed under high vacuum (performed twice). Further drying for 12 hours in vacuo afforded a white crystalline solid (0.50 g, 0.4 mmol, 83%); Anal. Calcd for C$_{32}$H$_{27}$F$_{33}$NO$_7$PS$_2$: C, 30.51% H, 2.16% N, 1.11% S 5.09%. Found: C, 30.72% H, 2.13% N, 1.10% S 5.11%. T$_g$: 1.9° C. T$_m$: 106-108° C. IR: n(C—F anion) 1348 cm$^{-1}$, n(C—F) 1154 cm$^{-1}$, n(SO$_2$) 1058 cm$^{-1}$, n(HC=CH$_2$) 971 cm$^{-1}$. $^1$H NMR (acetone-d$_6$, δ) 7.7 (d, 2H, $^3$J=8 Hz, Ar—H$_{ortho}$), 7.4 (d, 2H, $^3$J=8 Hz, Ar—H$_{meta}$), 6.8 (dd, 1H, $^3$J=20 Hz (trans), $^3$J=12 Hz (cis), CH=CH$_2$), 5.8 (d, 1H, $^3$J=20 Hz, CH=CH$_2$-trans), 5.3 (d, 1H, $^3$J=12 Hz, CH=CH$_2$-cis), 4.3 (psuedo t, 6H, OCH$_2$), 4.2 (d, 2H, $^3$J=20 Hz, Ar—CH$_2$), 2.7 (m, 6H, PCH$_2$), 2.2 (m, 6H, CH$_2$CH$_2$CH$_2$). $^{19}$F NMR (acetone-d$_6$, δ) −71.2 (s, 27F), −80.1 (s, 6F). $^{31}$P{$^1$H} NMR (acetone-d$_6$, δ) 34.8 (s). MS (ESI+, %): 1155 ([cation]$^+$, 100). MS (ESI−, %); 1715 ([cation+(anion)$_2$]$^-$, 20).

Superhydrophobic Films Incorporating Nanoparticles

Synthesis

Solution $^1$H, $^{19}$F{$^1$H} and $^{31}$P{$^1$H} NMR spectra were recorded on a Varian INOVA 400 MHz spectrometer ($^1$H; 400.09 MHz, $^{31}$P; 161.82 MHz, $^{19}$F; 376.15 MHz). All samples for $^1$H NMR spectroscopy were referenced to the residual protons in the deuterated solvents ($^1$H: chloroform-d 7.26; acetone-d6 2.05). $^{31}$P{$^1$H} and $^{19}$F{$^1$H} NMR spectroscopic chemical shifts were reported relative to external standards (85% H$_3$PO$_4$: 0.00 ppm and CF$_3$C$_6$H$_5$: −63.9 ppm). Mass spectrometry (MS) measurements were recorded in positive and negative ion modes using an electrospray ionization (ESI) Micromass LCT spectrometer. Infrared spectra were recorded using a Bruker Tensor 27 spectrometer from Bruker Optics Inc. Samples were measured by attenuated total reflectance (ATR) infrared spectroscopy, using a zinc selenide crystal. Melting points were determined using a Gallenkamp Variable Heater in air. [1]Cl and [1]NTf$_2$ were prepared as stated previously.

Film Preparation

The chosen monomer (94.5 w %) and 1-hydroxycyclohexylphenylketone (CPK, 5.5 w %) were mixed with acetone. Nanoparticles (when included) were then added to the solution, the resulting mixture insonated in a sonic bath (Elasmonic E 60H, 100 Watts) for 10 minutes and then applied to polyester sheets (DuPont) with a pipette. #10 grade or #20 grade Meyer rods (Gardco) were used to spread the mixture evenly across the polyester substrate, giving wet thicknesses of 25 μm and 51 μm, respectively. A UV-curing conveyor (UV Process Supply) was set to allow a time exposure of ~3 s (UV-light irradiance over this time frame was measured at 760 mJ/cm$^2$). The substrate with the uncured film was taped to a metal sheet and passed through the UV-conveyor.

Films were then examined by ATR-IR spectroscopy to determine the quality of the cure. For the series containing [1]Cl$^-$ and [1]NTf$_2$, the stretching vibration of the styrene olefin (990 cm$^{-1}$) was no longer present in all of the films. For the acrylate-containing series containing HDDA and F$_6$MA, the (C=C) acrylic olefin stretch at 1635 cm$^{-1}$ also merged with the baseline in the polymerized films. This data, in conjunction with the "tack-free" nature of all of the films indicates total or near-total polymerization of the monomers.

Film Characterization

Scanning Electron Microscope (SEM) images of the surfaces were obtained using a Hitachi S-4500 field emission instrument, operated at an electron beam voltage of 10 kV equipped with a Quartz Xone Energy Dispersive X-Ray Spectroscopy (EDX) system. Atomic Force Microscopy (AFM) was performed on a Park Systems XE-100 in air with a relative humidity of ~40%. The cantilever used had a nominal spring constant of 40 N/m, resonant frequency of 300 kHz and tip apex radius of 10 nm. Dynamic Light Sacttering (DLS) data were obtained using a Zetasizer NanoZS instrument from Malvern Instruments. The pre-curing mixtures were diluted with acetone by a factor of 100 (by weight) to obtain measureable concentrations. Time-of-fight Secondary Ion Mass Spectrometry (TOF-SIMS) measurements were taken using an ION-TOF (Gmbh) TOF-SIMS IV equipped with a Bi cluster liquid metal ion source. A 25 keV Bi$_3$+ cluster primary pulsed ion beam (10 kHz, pulse width 20 ns) was used to bombard the surface to generate secondary ions. The positive or negative secondary ions were extracted from the sample surface, mass separated and detected via a reflectron-type time-of-flight analyser. Depth profiles were obtained by repeating the following cycle: sputtering an area of 500 μm×500 μm on the sample surface with a 3 keV Cs+ ion beam for 0.5 s followed by, with a delay of 2 s, collecting mass spectra at 128×128 pixels with the Bi$_3$+ ion beam over an area of 245 μm×245 μm within the sputtered area. UV-Vis transmittance measurements were done on a diode array UV-VIS spectrophotometer (Bio Logic Science Instruments) with a xenon source and white-light fibre optic cable. Water contact angles were measured on a Kruss DSA 100 with DSA drop shape analysis software. Using an automated dispensing system, static 5 μL droplets of distilled water were deposited in different areas upon the surface. The contact angles were measured on the left and right side of each drop on at least ten droplets, resulting in a minimum of twenty angles per film. The reported contact angle is an average of all measurements. Roll-off angles and hysteresis measurements were determined on the same instrument, using an in-house, motorized tilting table. Static 5 μL droplets were placed on the surface and the instrument table was tilted at a rate of 0.75 degrees/second until the droplet rolled off. Reported angles are the average of eight trials. Hysteresis measurements were obtained at a tilting angle of one degree less than the measured roll-off angle, or 15° (due to software limitations), whichever was lower.

Superhydrophobic Films Incorporating Microparticles

Tris(1H,1H,2H,2H-perfluorohexyl)phosphine was prepared using a the scale-up of a published procedure.[21] [1]Cl, [2]Cl, [1]NTf$_2$ and [2]NTf$_2$ were prepared as stated previously.

Solution $^1$H, $^{19}$F{$^1$H} and $^{31}$P{$^1$H} NMR spectra were recorded on a Varian INOVA 400 MHz spectrometer ($^1$H; 400.09 MHz, $^{31}$P; 161.82 MHz, $^{19}$F; 376.15 MHz). All samples for $^1$H NMR spectroscopy were referenced to the residual protons in the deuterated solvents ($^1$H: chloroform-d 7.26; acetone-d6 2.05). $^{31}$P{$^1$H} and $^{19}$F{$^1$H} NMR spectroscopic chemical shifts were reported relative to external standards (85% H$_3$PO$_4$: 0.00 ppm and CF$_3$C$_6$H$_5$: −63.9 ppm). Mass spectrometry (MS) measurements were recorded in positive and negative ion modes using an electrospray ionization (ESI) Micromass LCT spectrometer. Infrared spectra were recorded using a Bruker Tensor 27 spectrometer from Bruker Optics Inc. Samples were measured by attenuated total reflectance (ATR) infrared spectroscopy, using a zinc selenide crystal. Melting points were determined using a Gallenkamp Variable Heater in air. Scanning electron microscope images of the surfaces were obtained using a Hitachi S-4500 field emission instrument, operated at an electron beam voltage of 10 kV equipped with a Quartz Xone EDX system. AFM was performed on a Park Systems XE-100 in air with a relative humidity of ~40%. The cantilever used had a nominal spring constant of 40 N/m, resonant frequency of 300 kHz and tip apex radius of 10 nm. Water contact angles were measured on a Kruss DSA 100 with DSA drop shape analysis software. Using an automated dispensing system, static 5 μL droplets of distilled water were deposited in different areas upon the surface. The contact angles were measured on the left and right side of each drop on at least ten droplets, resulting in a minimum of twenty angles per film. The reported contact angle is the average of all measurements.

Film Preparation

The general procedure for film preparation and curing was as follows: the chosen phosphonium salt (95%) and 1-hydroxycyclohexylphenylketone (CPK, 5%) were dissolved in acetone. Microparticles (when included) were then added to the solution, the resulting mixture insonated in a sonic bath (Elasmonic E 60H, 100 Watts) for 10 minutes and then applied to pre-treated polyester sheets (DuPont) with a pipette. A #10 wire Meyer rod (Gardco) was used to spread the mixture evenly across the polyester substrate, producing a wet thickness of approximately 25 μm. A UV-curing conveyor (UV Process Supply) was set to allow a time exposure of ~3 s (UV-light irradiance over this time frame was measured at 760 mJ/cm$^2$). The substrate with the uncured film was taped to a metal sheet and passed through the UV-conveyor.

Antimicrobial Properties of Polyelectrolyte Polymer

Nuclear magnetic resonance (NMR) spectroscopy was conducted on a Varian INOVA 400 MHz spectrometer ($^1$H, 400.09 MHz, $^{31}$P{$^1$H} 161.82 MHz). All $^1$H spectra were referenced relative to tetramethylsilane (TMS) (CDCl$_3$; $^1$H δ=7.26 ppm and CO(CD$_3$)$_2$; $^1$H δ=2.04 ppm). The chemical shifts for $^{31}$P{H} NMR spectroscopy were referenced using an external standard (85% H$_3$PO$_4$; δ=0 ppm). Infrared spectra were recorded on a Bruker Tensor 27 spectrometer using attenuated total reflectance mode (ATR) with a ZnSe crystal. Deposition was performed using a 25-micron Meyer Rod purchased from Gardco on pretreated Teijin Melinex 700 gauge films from Dupont. UV curing was performed using a modified UV curing system purchased from UV Process and Supply Inc. with a mercury bulb. Samples were irradiated with an energy density of 1956 mJ/cm$^2$ and an irradiance of 1383 mW/cm$^2$.

Film Preparation

A desired amount of 2-hydrox-2-methy-1-phenyl-propanone (5 wt %), diacrylate crosslinker (EB 130, a cyclic aliphatic diacrylate) and the acrylate-appended phosphonium salt were weighed and combined in screw top vials. The mixture was then insonated at 45° C. for 20 min until the solutions were free of particulate and haze. After cooling to room temperature, the solutions were cast on polyester films and irradiated with UV light three times. Leached films were treated with H$_2$O (Milli-Q) in a wrist action shaker for 4 hours, followed by washing with H$_2$O (2×10 mL) and air drying. Both leached and unleached films were subjected to the antibacterial test (below).

Characterization of Polymer Film

Characterization by FTIR-ATR spectroscopy confirmed the conversion of acrylate functionality post polymerization. Percent cure was determined using a literature procedure. The intensity of the acrylate vibration at 810 cm$^{-1}$ was compared to the C=O vibration at 1750 cm$^{-1}$ both before and after irradiation. By using the C=O as an internal standard, the percent cure was found to be 80%. The density of surface phosphonium cations was determined by UV-vis spectroscopy as described in a literature procedure.

Antibacterial Testing Procedure

The antibacterial activities of the charged surfaces against Gram-negative bacteria *Escherichia coli* and *S. Aureus* were studied using the antibacterial drop-test. *E. coli* precultured in 15 mL of nutrient broth (Difco™ BD) at 37° C. for 24 h, was washed by centrifuging at 4000 rpm for 10 min. After removing the supernatant, the cells were washed with phosphate buffered saline (PBS) twice and re-suspended and diluted to approximately 10$^6$ colony forming units (CFU)/mL in PBS solution. The samples were placed in sterilized Petri dishes. 100 μL of PBS solution with bacteria was added dropwise onto sterilized surfaces until completely covered. The petri dishes were sealed and placed in an incubator at 37° C. with the humidity 46%. After 4 hr, the bacteria were washed from the surface of the sample by using 10 mL PBS in the sterilized Petri dish. From this solution, 100 μL was spread onto solid plate count agar (Difco™ BD). After incubation for 24 h at 37° C., the number of surviving bacterial colonies on the Petri dishes were counted. The results after multiplication with the dilution factor were expressed as CFU per mL. The above experiments were carried out in triplicate for each sample. The percentage of killed bacteria was calculated as [(CFU of initial bacterial suspension−CFUs following surface contact)/CFU of initial bacterial suspension]×100.

Synthesis of tributyl(3-hydroxypropyl)phosphonium bromide[5]Br

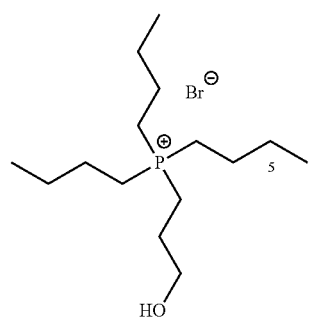 [SMILES: CCCC[P+](CCCC)(CCCC)CCCO ; [Br-]]

A 500 mL pressure round bottom flask was filled with 200 mL of deoxygenated acetonitrile in a nitrogen atmosphere. An emulsion formed upon the addition of tributylphosphine (34.80 g, 172 mmol). To the solution, 0.9 molar equivalents of deoxygenated 3-bromo-1-propanol (21.54 g, 155 mmol) was slowly added followed by heating at 100° C. for 7 hours. After cooling to room temperature, the solution was poured into a 1 L round bottom flask followed by the evaporation of volatiles in vacuo at 40° C. The white emulsion was dissolved in a minimal amount of DCM and then precipitated in diethyl ether. After decanting the ether layer, the precipitation process was repeated five times. The emulsion was then heated in vacuo to remove volatiles resulting in a clear and colourless oil (42.18 g, 80% yield). $T_g$: −65.92° C.; $^1$H NMR (400 MHz, CDCl$_3$): δ 3.68 (t, J=8 Hz, 2H), 2.43-2.56 (m, 2H), 2.23-2.36 (m, 6H), 1.78-1.98 (m, 2H), 1.40-1.59 (m, 12H), 0.92 (t, J=8 Hz, 9H). $^{13}$C{$^1$H} NMR (158 MHz, CDCl$_3$) δ 26.7 (d, J=21 Hz), 24.7 (d, J=6 Hz), 23.9 (d, J=25 Hz), 23.6 (d, J=6.3 Hz), 19.1 (d, J=74 Hz), 16.3 (d, J=77 Hz), 13.4 (5). $^{31}$P{$^1$H} NMR (161.82 MHz, CDCl$_3$) δ 34.0 (s). FTIR-ATR: ν (cm$^-$) 3303 (O—H stretch), 1063 (C—O stretch). TOF-MS-ES+ observed [M-H]$^+$, 260.3. TOF-MS-ES− observed [MA$_2$+2H]$^-$, 421.1.

Synthesis of (3-(acryloyloxy)propyl)tributylphosphonium bromide[4]Br

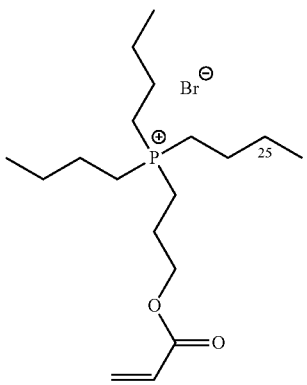 [SMILES: C=CC(=O)OCCC[P+](CCCC)(CCCC)CCCC ; [Br-]]

A 1 L round bottom flask was filled with 200 mL of acetonitrile and tributyl(3-hydroxypropyl)phosphonium bromide (25.69 g, 75.5 mmol). The solution was then cooled to −35° C. prior to the addition of 1.1 molar equivalents of triethylamine (8.40 g, 83.0 mmol). After stirring for 5 minutes, 1.1 molar equivalents of acryloyl chloride (7.51 g, 83.0 mmol) was added dropwise (2 drops/second). The solution was stirred for 1 hour and then left to warm to room temperature over 24 hours. Volatiles were evaporated in vacuo at 40° C. resulting in a yellow slurry. The slurry was then dissolved in 200 mL of DCM and washed with distilled water (25 mL) 5 times. The organic layer was dried with a minimal amount of sodium sulphate, filtered and the volatiles evaporated in vacuo at 40° C. The orange oil was then redissolved in a minimal amount of DCM and precipitated in 150 mL of stirring hexanes. The biphasic mixture was left to sit for 10 minutes before decanting the hexanes layer. The orange emulsion was heated in vacuo to remove volatiles resulting in clear orange oil (5.95 g, 20% yield). *$T_g$: −56.83° C.; $^1$H NMR (400 MHz, CDCl$_3$): δ 6.41 (d, J=16 Hz, 1H), 6.01 (dd, J=12 Hz (trans), J=8 Hz (cis), 1H), 5.84 (d, J=12 Hz, 4H), 4.27 (t, J=4 Hz, 2H), 2.51-1.54 (m, 2H), 2.31-2.52 (m, 6H), 1.80-2.10 (m, 2H), 1.50 (m, 12H), 0.94 (t, $^3$J=8 Hz, 9H). $^{13}$C{$^1$H} NMR (158 MHz, CDCl$_3$) δ 165.8 (s), 131.6 (s), 127.8 (s), 63.5 (d, J=25 Hz), 23.8 (d, J=24 Hz), 23.7 (d, J=7.9 Hz), 21.4 (d, J=6.3 Hz), 19.0 (d, J=74 Hz), 16.3 (d, J=77 Hz), 13.4 (5). $^{31}$P{$^1$H} NMR (161.82 MHz, CDCl$_3$) δ 33.2 (s). FTIR-ATR: ν (cm$^-$) 1718 (C=O stretch), 812 (acrylate C—H bend).

*Through the formation of [HNEt$_3$][Cl], some of the chloride ions exchanged for the bromide forming [PR$_4$][Cl] and [HNEt$_3$][Br]. As a result, elemental analysis could not be conducted.

Synthesis of tributyl(3-hydroxypropyl)phosphonium chloride [5]Cl

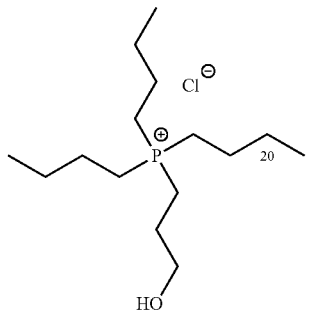 [SMILES: CCCC[P+](CCCC)(CCCC)CCCO ; [Cl-]]

A 500 mL pressure round bottom flask was filled with 200 mL of deoxygenated acetonitrile in a nitrogen atmosphere. Tributylphosphine (25.08 g, 124 mmol) and 1.20 molar equivalents of deoxygenated 3-chloro-1-propanol (14.09 g, 149 mmol) was slowly added to the flask, followed by heating at 100° C. for 24 hours. Volatiles were removed at 60° C. in vacuo. The viscous clear oil was redissolved in a minimal amount of methanol (30 mL) and precipitated in stirring ether (200 mL). This process was repeated two additional times. The oil was heated in vacuo at 60° C. to remove any volatiles, resulting in a clear and colourless liquid. (33.12 g, 90% yield). $T_g$: −58.43° C.; $^1$H NMR (600 MHz, CDCl$_3$): δ 3.69 (t, J=8 Hz, 2H), 2.50-2.58 (m, 2H), 2.28-2.35 (m, 6H), 1.83-1.90 (m, 2H), 1.45-1.56 (m, 12H), 0.94 (t, J=8 Hz, 9H). $^{13}$C{$^1$H} NMR (158 MHz, CDCl$_3$) δ 60.7 (d, J=21 Hz), 24.8 (d, J=8 Hz), 23.9 (d, J=24 Hz), 23.6 (d, J=6.3 Hz), 19.0 (d, J=74 Hz), 16.4 (d, J=77 Hz), 13.4 (s). $^{31}$P{$^1$H} NMR (242.68 MHz, CDCl$_3$) δ 34.0 (s). FTIR-ATR ν (cm$^-$) 3323 (O—H stretch), 1065 (C—O stretch). TOF-MS-ES+ observed [M$_2$A]$^+$, 577.4.

Synthesis of (3-(acryloyloxy)propyl)tributylphosphonium chloride [4]Cl

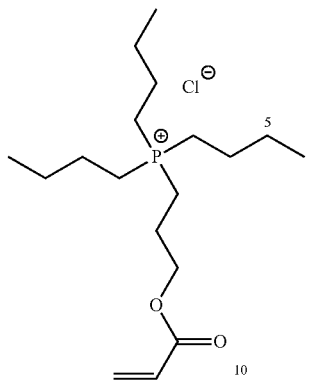 [SMILES: C=CC(=O)OCCC[P+](CCCC)(CCCC)CCCC ; [Cl-]]

A 1 L round bottom flask was filled with 250 mL of acetonitrile and tributyl(3-hydroxypropyl)phosphonium chloride (32.87 g, 111 mmol). The solution was then cooled to −35° C. prior to the addition of 1.05 molar equivalents of triethylamine (11.83 g, 117 mmol). After stirring for thirty seconds, 1.05 molar equivalents of acryloyl chloride (10.59 g, 117 mmol) was added dropwise (1 drops/second). The solution was stirred for 3 hour and then left to warm to room temperature, followed by stirring for 5 days. With gentle heating, the solvent was evaporated in vacuo resulting in a yellow slurry. The slurry was then dissolved in 350 mL of chloroform and washed with distilled water (25 mL) three times. The organic layer was dried with a minimal amount of sodium sulphate, filtered followed by evaporation of solvent with gentle heating in vacuo, resulting in a viscous orange oil (28.77 g, 74% yield). $T_g$: −65.28° C.; $^1$H NMR (400 MHz, CDCl$_3$): δ 6.39 (d, J=16 Hz, 1H), 6.05 (dd, J=12 Hz (trans), J=8 Hz (cis), 1H), 5.82 (d, J=12 Hz, 4H), 4.24 (t, J=4 Hz, 2H), 2.58-1.69 (m, 2H), 2.36-2.50 (m, 6H), 1.90-2.10 (m, 2H), 1.40-1.52 (m, 12H), 0.94 (t, J=8 Hz, 9H). $^{13}$C{$^1$H} NMR (158 MHz, CDCl$_3$) δ 165.8 (s), 131.6 (s), 127.8 (s), 63.5 (d, J=25 Hz), 24.0 (d, J=25 Hz), 23.8 (d, J=7.9 Hz), 21.4 (d, J=6.3 Hz), 18.9 (d, J=74 Hz), 16.2 (d, J=77 Hz), 13.4 (5). $^{31}$P{$^1$H} NMR (161.82 MHz, CDCl$_3$) δ 33.6 (s). FTIR-ATR: ν (cm$^-$) 1720 (C=O stretch), 1635 (acrylate C=C stretch), 812 (acrylate C—H bend). TOF-MS-ES− observed [M]$^+$, 315.2 and [M$_2$A]$^+$, 665.4. TOF-MS-ES− observed [MA$_2$]$^-$, 385.2.

Functionalization of Polyelectrolyte Polymer Surface

NMR spectroscopy was conducted on a Varian INOVA 400 MHz spectrometer ($^1$H, 400.09 MHz, $^{31}$P{$^1$H} 161.82 MHz). All $^1$H spectra were referenced relative to tetramethylsilane (TMS) (CDCl$_3$: $^1$H δ=7.26 ppm and CO(CD$_3$)$_2$: $^1$H δ=2.04 ppm). The chemical shifts for $^{31}$P{H} NMR spectroscopy were referenced using an external standard (85% H$_3$PO$_4$; δ=0 ppm). Infrared spectra were recorded on a Bruker Tensor 27 spectrometer using attenuated total reflectance mode (ATR) with a ZnSe crystal. Sonication of the UV curable formulations was conducted in an E60H Elmasonic sonicator at frequency of 37 kHz and an ultrasonic effective power of 100 W. Deposition was performed using a 25-micron Meyer Rod purchased from Gardco on pretreated Teijin Melinex 700 gauge films from Dupont. UV curing was performed using a modified UV curing system purchased from UV Process and Supply Inc. with a mercury bulb. Samples were irradiated with an energy density of 1956 mJ/cm$^2$ and an irradiance of 1383 mW/cm$^2$. Thermal degradation was determined using Thermal Gravimetric Analysis (TGA) on a Q600 SDT TA instrument. A sample of 5-15 mg was placed in an aluminum cup and heated at a rate of 10° C./min from room temperature to 600° C. under nitrogen atmosphere (100 mL/min). Glass transition temperatures were determined using Scanning Differential calorimetry (DSC) on a DSC Q20 TA instrument. A sample of approximately 10 mg was placed in an aluminum Tzero pan and underwent a heat/cool/heat profile at 10° C./min under nitrogen atmosphere (100 mL/min). Data was acquired from the final heat cycle of the heat/cool/heat profile.

Film Preparation

A desired amount of 2-hydrox-2-methy-1-phenyl-propanone (50 mg, 5 wt %), diacrylate cross-linker (0-1.0 g, EB130 or EB12 at 0-95 wt %), and compound [4]Cl (0-1.0 g, 0-95 wt %) were weighed and combined in screw top vials. The mixture was then insonated at 45° C. for 20 min until the solutions were free of particulate and haze. After cooling to room temperature, the solutions were cast on polyester films and irradiated with UV light three times.

Characterization of Polymer Film

Characterization by FTIR-ATR spectroscopy confirmed the conversion of acrylate functionality post polymerization. The disappearance of the acrylate band at 810 cm$^{-1}$ suggested acrylate conversion after irradiation[22]. The density of surface phosphonium cations was determined by UV-vis spectroscopy as described in a literature procedure[23]. Surface charge density was found to be approximately 1.16× 10$^{16}$ charges/cm$^2$ for films composed of a 1:1 ratio of EB130:compound (2). This assumes a 1:1 ratio of positive and negative charge on the surface. Films containing less than ~50 wt % of compound (2) do not possess accessible surface charges.

Surface Modification with Clay

Dispersions made up of 0.5, 1, and 2 wt % clay in water were prepared by adding the appropriate amount of clay to a stirring beaker of Milli-Q water for 10 minutes. The dispersion was insonated for 30 minutes and used immediately. UV-cured ionic films (2 cm$^2$) were dipped in the mixture (1 second-10 minutes) followed by rinsing in stirring Milli-Q water twice. The films were then left to air dry for 15 minutes.

Surface Modification using tris(diphenylphosphinomethyl) phenyl borate and bis(benzonitrile)palladium(II) chloride A solution of 0.5 wt % of thallium tris(diphenylphosphinomethyl) phenyl borate was prepared in dry deoxygenated THF. UV-cured ionic films (2 cm$^2$) were dipped in the solution (1 second-5 minutes) followed by rinsing in THF, ethanol and drying in air. Films were then immersed in a 0.5 wt % solution of [Pd(PhCN)$_2$Cl$_2$] (1 second-5 minutes) in THF and rinsed with ethanol followed by drying in air.

Suzuki Cross-Coupling Reactions Using Pd Modified Ionic Films

A solution of 4-methoxy boronic acid (1.5 molar equivalents), iodobenzene (1 molar equivalent), and potassium carbonate (2 molar equivalents) were added to 3 mL of dry deoxygenated toluene. A 2 cm$^2$ sample of Pd-modified film was then added to the mixture. Solutions were stirred for 4-72 hours at 23-85° C. Reactions progress was monitored by GC-MS and TLC (1:10 acetone:hexanes) against 4-methoxybiphenyl.

Surface Modification with Au-25

A solution containing 0.5 wt % Au-25 in deoxygenated acetonitrile was prepared by adding 0.016 g of Au-25 in to 3 g of acetonitrile. UV-cured ionic films (2 cm$^2$) were dipped in the solution (1 second-10 minutes) followed by rinsing in fresh deoxygenated acetonitrile. The films were then insonated in deoxygenated toluene for 3 minutes followed by additional rinsing with toluene and air-drying for 10 min.

The synthesis of the [TOA][Au$_{25}$L$_{18}$] was reproduced using the methods reported by Murray et al. and later by Maran et al. with some modification.[24] Chloroauric acid trihydrate and tetraoctylammonium bromide ([TOA][Br]) were dissolved in THF. Then 6 fold of phenylethane thiol was added which gave a colorless solution. NaBH$_4$, dissolved in water and added to the mixture all at once. After completion of the reaction, the solution was gravity filtered and the solvent volume was vacuum evaporated. Excess of NaBH$_4$ and phenylethane thiol were removed by washing. Final product was extracted using acetonitrile to obtain an oil. This was recrystallized to dark-brown needles. The purity was examined using different spectroscopic techniques.

Cross-Linked Ionic Hydrophobic Polymers
Results and Discussion

Phosphonium salts MCl and [3]Cl were synthesized from the commercially available isooctyl primary phosphine while [2]Cl and [3b]Cl required a pressurized $PH_3$ reactor.

Phosphine gas ($PH_3$) is a pyrophoric substance and was manipulated with a custom built pressure-manifold. In the presence of an olefin and a radical source (AIBN), both $PH_3$ and primary phosphines were converted to the corresponding tertiary phosphine in one step. Reaction progress was monitored by $^{31}P\{^1H\}$ NMR spectroscopy and deemed complete upon ~90% conversion to the product. Formation of the quaternary phosphonium salts proceeded through the $S_N2$ reaction of a fluorous phosphine ($P(CH_2CH_2Rf_n)_3$, $Rf_n=Rf_4=C_4F_9$ [2]; $Rf_n=CH_2OC(F_3)_3$ [3b]; $R'P(CH_2CH_2Rf_n)_2$, $R'=C_8H_{17}$, $Rf_n=C_4F_9$ [1]; $R'=C_8H_{17}$, $Rf_n=C_8F_{17}$ [3] with a stoichiometric excess of 4-vinylbenzylchloride at elevated temperature (ca. 80° C.). Reaction progress was monitored by $^{31}P\{^1H\}$ NMR spectroscopy, and deemed complete when a new singlet ($\delta_P$=30-40 ppm) was observed to be at a maximum. Upon work up of the reaction mixture, fluorinated phosphonium salts were isolated in 55-70% yield. Anion-exchange reactions were performed via salt-metathesis of [1-3b]Cl with a stoichiometric excess of lithium bis((trifluoromethyl)sulfonyl)imide ($LiNTf_2$) at room temperature for 24 hours. Ion exchange reaction mixtures were extracted using distilled water to remove the inorganic salt by-product, then volatiles were removed from the organic fraction to isolate the phosphonium $NTf_2$ salts in approximately 50% isolated yield.

The number and architecture of the perfluoroalkyl appendage was varied in order to ascertain a structure-property relationship that would reveal the optimum monomer design facets to obtain high hydrophobicity of the resulting polymer films. Attempts were also made to obtain water repellency with short perfluoroalkyl groups. The $C_8F_{17}$ HFPPS monomer was used as benchmark performance indicator, as it is well known that fluoropolymers containing these long perfluoroalkyl chains exhibit excellent hydrophobicity due to the close stacking of neighbouring $C_8F_{17}$ chains.[26]

Given that the constituent surface tension of the $CF_3$ group (15 mN/m) is lower than the $CF_2$ group (23 mN/m) a monomer that maximizes the number of $CF_3$ moieties was sought.[27] Starting from perfluoro-tert-butanol the desired phosphonium salt, [3b] containing nine $CF_3$ units in the cationic of the salt was obtained.

HFPPS Physical and Chemical Properties

In an effort to fully characterize these unconventional monomers, solubilities of the compounds were evaluated and results shown in Table 1.

TABLE 1

Solubilities of HFPPSs in various polar (protic and aprotic) and non-polar solvents where N = not soluble, Y = soluble, and E = emulsion.

| Solvent | [1]Cl | [2]Cl | [3]Cl | [3b]Cl | [1]NTf$_2$ | [2]NTf$_2$ | [3]NTf$_2$ | [3b]NTf$_2$ |
|---|---|---|---|---|---|---|---|---|
| Water | N | N | N | N | N | N | N | N |
| Methanol | Y | Y | Y | Y | Y | Y | Y | Y |
| Ethanol | Y | N | Y | Y | Y | Y | Y | Y |
| Isopropanol | Y | N | N | Y | E | Y | Y | Y |
| Acetone | Y | Y | Y | Y | Y | Y | Y | Y |
| Acetonitrile | Y | Y | Y | Y | Y | Y | Y | Y |
| DMF | Y | Y | Y | Y | Y | Y | Y | Y |
| DCM | Y | N | Y | Y | Y | N | Y | Y |
| Chloroform | Y | N | Y | Y | Y | N | Y | Y |
| Benzene | N | N | N | N | N | N | N | N |
| Toluene | N | N | N | N | N | N | N | N |
| Diethylether | E | N | N | Y | N | N | N | Y |
| Hexanes | N | N | N | N | N | N | N | N |
| HDDA | N | N | N | N | Y | Y | Y | Y |

While most organic molecules display predictable chemical properties (polar vs non-polar), the solubility of phosphonium salts is dependent on the substitution around the phosphorus core and the counter anion. Upon the addition of fluorocarbon chains, solubility was found difficult to predict. Thirteen common solvents of varying dielectric constants were chosen to further characterize the materials. Solvents such as $H_2O$, hexanes, benzene and toluene were found to be poor solubilizing agents for the salts of cations $1^+$-$3^+$. The fluorocarbon chains may prevent water from hydrating the cation thus preventing disassociation. Hexanes, benzene and toluene were also ineffective at solubilizing these charged species. Polar aprotic solvents such as DMF, acetonitrile, and acetone were capable of dissolving all compounds. Methanol was found to be a satisfactory protic solvent for all compounds tested while ethanol and isopropanol were successively worse in each case. Compounds [1]Cl, [1]NTf$_2$, [3]Cl, [3]NTf$_2$, [3b]Cl, and [3b]NTf$_2$ were soluble in dichloromethane and chloroform while compounds [2]Cl and [2]NTf$_2$ were not. The replacement of an isooctyl chain with a fluorocarbon moeity thus reduces its solubility in low dielectric solvents such as chloroform and dichloromethane. Despite lengthening two fluorocarbon chains from $C_4F_9$ to $C_8F_{17}$, it was still possible to solubilize the compound. In the case of [2], the presence of three $C_4F_9$ chains was sufficient to reduce its solubility. Both [3b]Cl and [3b]NTf$_2$ displayed high solubility in most solvents including diethyl ether. Despite the high fluorine loading, the branched $C_4F_9$ structure along with the allyl ether linkage may impart greater solubility. The decomposition, glass transition, and melting point of these salts were also determined and results shown in Table 2.

TABLE 2

Physical properties of all HFPS used

| HFPPS | Decomposition Point (° C.) | Glass Transition Point (° C.) | Melting Point (° C.) |
|---|---|---|---|
| [1]Cl | 296 | — | 95-96 |
| [2]Cl | 291 | — | 80-81 |
| [3]Cl | 293 | 35 | 73-74 |
| [3b]Cl | 197* | — | 140-142 |
| [1]NTf$_2$ | 367 | — | 88-89 |
| [2]NTf$_2$ | 371 | — | 55-56 |
| [3]NTf$_2$ | 374 | — | 64-69 |
| [3b]NTf$_2$ | 389 | 1.9 | 106-108 |

The observed decomposition, glass transition, and melting points of all compounds follow a general trend characteristic of phosphonium salt structure[28]. Halide salts typically display higher melting points than their NTf$_2$ analogues, which is consistent with results obtained here. The reduction in melting point upon greater degrees of fluorination may be attributed to the lower crystal lattice energy of the substances. The perfluoroalkyl groups exhibit weak intermolecular forces, leading to lower melting points. Both [3b]Cl and [3b]NTf$_2$ exhibited much higher melting points suggesting the branched C$_4$F$_9$ structure had little effect in reducing the crystal lattice energies. An exotherm was observed after the glass transition, but before the melting point in the DSC trace for [3b]NTf$_2$ at approximately 50° C., implying this compound has relatively enhanced crystalline properties. Decomposition temperatures of compounds [1]Cl, [2]Cl, and [3]Cl were approximately 295° C. while compounds [1]NTf$_2$, [2]NTf$_2$, and [3]NTf$_2$ were stable until approximately 370° C. The decreased nucleophilicity of bis(trifluoromethylsulfonyl)imide relative to chloride possibly inhibited the E2 decomposition pathway of the β-hydrogen by which phosphonium salts typically undergo thermal decomposition.[19, 20] The decomposition point of [3b]Cl was found to be exceptionally low in comparison to its analogues. This led us to believe that an alternative decomposition pathway was present. We postulated that the electronegativity of the perfluoro-tert-butoxy group might allow for its displacement in the presence of a nucleophile (such as Cl) at high temperatures. Deprotonation of a β-hydrogen to form perfluoro-t-butanol would result in decomposition.

The plausibility of this mechanism is supported by the relative basicity between chloride and perfluoro-tert-butoxide, with their protonated forms bearing pKa values of −7 and 5.2 respectively. The increase in thermal stability from 198 to 389° C. upon ion exchange with the bulky, non-nucleophilic NTf$_2$ anion also supports this mechanism. We decided to further investigate this phenomenon. Compound [3b]Cl was heated slowly within a mass spectrometer and the fragments of perfluoro-tert-butanol was monitored. After 532 seconds, a positively charged fragment at m/z=197 was observed and attributed to [(CF$_3$)$_3$COH—(HF$_2$)]$^+$. Upon further heating, the signal at m/z=197 was observed at a maximum after 889 seconds. The experiment was repeated under identical conditions using [3b]NTf$_2$ and no signal at m/z=197 was observed until 925 seconds, indicating greater thermal stability. Additionally, there was no evidence for the displacement or cleavage of the styrenal moiety from the phosphonium salt. These results illustrate the significance of anion choice when considering the thermal stability of not only the phosphonium center, but also chemical functionality of the surrounding appendages.

Hydrophobic Surface Modification Using HFPPS

Compounds [1]-[3b]Cl were initially screened for potential use as a fluorinated additive to UV-curable resins (HDDA). Low-surface energy materials (such as fluorocarbons) are known to migrate to the liquid-air interface prior to photopolymerization.[29,30] Initial attempts at solventless polymerization were problematic because of their insolubility in HDDA. Attempts to dissolve the mixture with acetone resulted in the formation of emulsions, translating to hazy films after polymerization. Additional acetone (60-70% by mass) did not remove the emulsion suggesting that changes to the molecular structure of our salts were important to increase compatibility. It is known that solubility of phosphonium salts is dependent on both the anion and cation composition. The hydrophobic bis(trifluoromethylsulfonyl)imide anion was used in conjunction with the fluorinated phosphonium cation.

Figure 1:
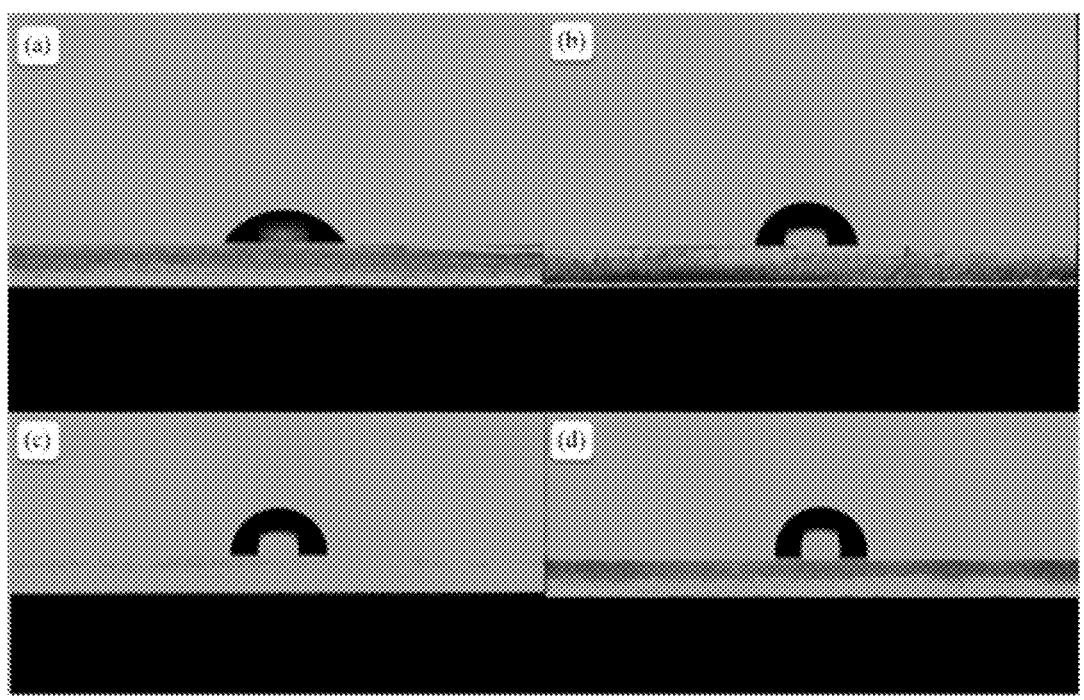
FIG. 1 shows water contact angles (WCAs) of droplets on (a) HDDA (b) 1.5 wt % of [1]NTf$_2$ (c) 1.5 wt % of [2]NTf$_2$ and (d) 1 wt % of [3]NTf$_2$.

Compounds [1]-[3b]NTf$_2$ were highly soluble in HDDA with mild heating and stirring. Upon increasing the concentration of compound [1]NTf$_2$ in HDDA, from 0.1 to 1.5 wt %, the WCA increased from 55° on pristine HDDA films to 87° with 1.5 wt % loading (Table 3, FIG. 1). A WCA increase of 32° with low fluorinated HFPPS loading is indicative of fluorine migration to the surface. To impart a greater degree of hydrophobicity, the isooctyl group of [1] was replaced with an additional perfluorobutyl chain to obtain compound [2]. Upon the addition of [2]NTf$_2$ to HDDA from 0.05 to 1 wt %, the WCA increased from 55° to 92° as shown in Table 3. Despite both [1]NTf$_2$ and [2]NTf$_2$ having similar performances at higher loadings, the onset for increasing WCA was shifted significantly, with less material required to attain similar contact angles for [2]NTf$_2$. These results show that the replacement of the isooctyl group with a perfluorobutyl chain did not greatly alter the peak hydrophobic effect, but rather shifted the onset as to when it occurred. By comparing the 1 wt % loading of [1]NTf$_2$ and the 0.1 wt % loading of [2]NTf$_2$, it can be seen that they have similar contact angles but possess different fluorine economies. Formulations containing [1]NTf$_2$ require eight times as many fluorine atoms as [2]NTf$_2$ to obtain similar hydrophobic effects. This indicates a structure-activity relationship between the phosphonium salt and the properties it imparts in photopolymer systems. Passivation of polymer surfaces with fluorocarbons depends not only on fluorine content, but also molecular architecture imparting fluorocarbon behavior. Very small amounts of fluorinated salts, despite bearing charges, have the capability to decrease the wettability of photopolymerized surfaces.

TABLE 3

Water contact angles for [1]NTf$_2$, [2]NTf$_2$, [3]NTf$_2$, and [3b]NTf$_2$ as a function of wt % in HDDA

| Wt % | [1]NTf$_2$ | [2]NTf$_2$ | [3]NTf$_2$ | [3b]NTf$_2$ |
|---|---|---|---|---|
| 0 | 55 | 55 | 55 | 55 |
| 0.01 | — | — | 91 | 73 |
| 0.05 | — | 80 | 98 | 90 |
| 0.1 | 82 | 89 | 98 | 94 |
| 0.5 | 84 | 91 | 100 | 97 |
| 1 | 87 | 92 | — | 95 |
| 1.5 | 87 | 92 | — | 93 |

Despite these findings, the hydrophobic performance of [1]NTf$_2$ and [2]NTf$_2$ were lower than other fluorinated materials on smooth surfaces such as Teflon (WCA=115°), or compared to other hydrophobic UV-cured systems.[29] This could be the result of reduced crystallization of the perfluorobutyl groups at the interface. It is known that longer fluorocarbon chains are capable of undergoing side-chain crystallization at the surface, resulting in much higher degrees of hydrophobicity.[26] Reduced ordering of the perfluoroalkyl chains allows water to permeate around the fluorocarbon groups, thus lowering the WCA. For greater performance, we decided to test the efficacy of Compound [3], containing two perfluorinated octyl chains on the phosphonium ion was used as a model system. The WCA increased from 55° for pristine HDDA, to 91° with only a 0.01 wt % loading of [3]NTf$_2$. Further addition raised the WCA to 101° at 1 wt % as shown in Table 3. Attempts to add additional compound resulted in phase separation and poor quality films. In comparison to [1]NTf$_2$ and [2]NTf$_2$, higher degrees of hydrophobicity with a steeper onset was observed when using [3]NTf$_2$. These results indicate that phosphonium salts with longer fluorocarbon chains impart enhanced anti-wetting properties to photopolymerized films, consistent with previous hydrophobic phosphonium studies.[31] The properties of phosphonium ions containing branched perfluoroalkyl groups for hydrophobic applications were examined. It was postulated that the hydrophobicity and steric encumbrance of a phosphonium salt bearing nine —CF$_3$ groups would passivate the surface and exhibit similar performance to the perfluorooctyl moieties. Upon addition of 0 to 1.5 wt % of [3b]NTf$_2$ to HDDA, a pronounced increase in the WCA, surpassing that of [1]NTf$_2$ and [2]NTf$_2$, and with similar performance to [3]NTf$_2$, was observed. Increased solubility of [3b]NTf$_2$ compared to [3]NTf$_2$ was also observed allowing for loadings greater than 1 wt %. Using this compound, bioaccumulation issues associated with perfluorooctyl groups are ameliorated with simultaneous boosting of fluorine economy. Similar WCAs were obtained using 27 fluorine atoms per cation ([3b]$^+$) as opposed to 34 ([3]$^+$).

To determine the mechanism of increased hydrophobicity, the nature of the interface was investigated to gain insight into whether or not the fluorinated salt migrates to the surface. Depth-profiling time-of-flight-secondary-ion-mass-spectrometry (TOF-SIMS) was employed to examine the composition of the surface material.

A photopolymerized HDDA film containing 1 wt % of [1]NTf$_2$ was analyzed using the procedure discussed in the experimental section. Elements and fragments of interest (C, C—H, O, CF, and NTf$_2$) were monitored in negative-ion mode as subsequent layers of the film were ablated.

Figure 2:
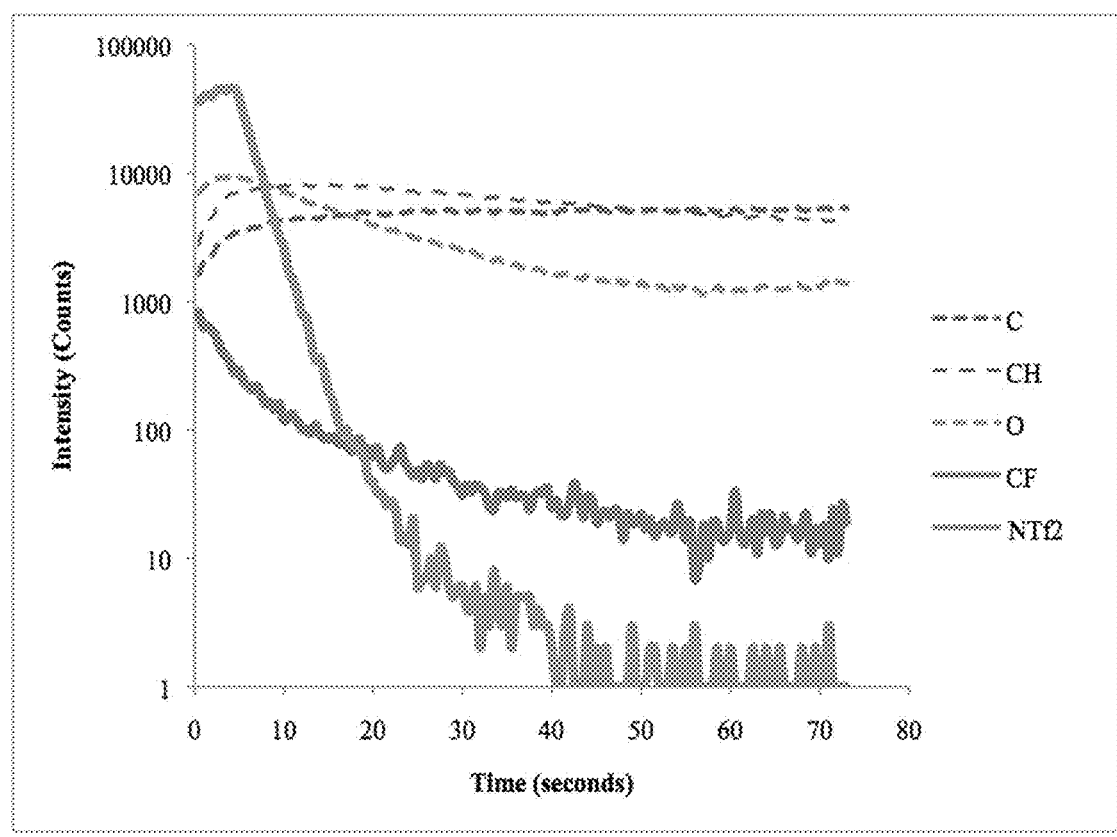
FIG. 2 shows TOF-SIMS(−) data showing the frequency of detected ions over repeated ion beam bombardment of the surface a photopolymerized HDDA film containing 1 wt % of [1]NTf$_2$ with time. Upwardly along the y-axis, the order of the ion plots is: CF, C, CH, O, NTf$_2$.

In the two seconds following the first bombardment, a strong signal with a m/z ratio of 281, indicative of the [NTf$_2$]$^-$ ion, was detected (FIG. 2). Upon continued ablation up to 40 cycles, the signal for the anion dropped dramatically (from 2500 counts/second to less than 1 count/second, FIG. 2). The [CF$^-$] ion fragment was also detected at high concentrations in the first bombardments, and its detection rate dropped off completely, with a similar time frame for the [NTf$_2$]$^-$ anions. These severe reductions in ion detection not only confirm that the NTf$_2$ containing HFPPS was more concentrated at the top of the film, but that there were essentially no detectable fluorine fragments beneath the surface. In contrast, ion fragments associated with both the polyacrylate and HFPPS ablated under the same conditions ([C]$^-$, [CH]$^-$, and [O]$^-$) remained relatively constant throughout the experiment.

An array of HFPPS were thus synthesized and characterized for their physical and chemical properties. Exchanging the chloride for bis(trifluoromethylsulfonyl)imide resulted in improved solubility in HDDA for all phosphonium cations. Through the alteration of the phosphonium salt, either with increased fluorine loading, or through architecture manipulation, a structure-activity relationship was observed. Greater degrees of fluorination increased both the maximum attainable contact angle, along with its onset. [3b]NTf$_2$ imbued films with water repellent properties with similar efficacy to its perfluorooctyl analogue without the bioaccumulation issues. TOF-SIMS confirmed the presence of HFPPS at the surface, and demonstrated for the first time that charged species could be selectively directed to a desired location in photopolymerizable systems. The fluorocarbon appendages acted as a shuttle for the charged molecules forcing the ions to the polymer/air interface.

Superhydrophobic Films Incorporating Nanoparticles

The effects of the choice of monomer and of the surface roughness imparted by the particles was examined in these superhydrophobic films. The feasibility of preparing superhydrophobic coatings comprising covalently a linked phosphonium moiety via a photocuring process was thus established.

Two approaches were taken to increasing hydrophobicity and transparency of films. Variation of the monomer and the amount of surface-passivated silica nanoparticles incorporated into the films were investigated. The monomers ([1]Cl, [1]NTf$_2$, hexanediol diacrylate (HDDA), 2,2,3,4,4,4-hexafluorobutylmethacrylate (F$_6$MA)) were UV-cured in order to obtain polymeric thin films. The monomers were mixed with 5.5 w % of the photoinitiator (CPK) in acetone. This pre-curing mixture was then coated onto a polyester substrate and exposed to UV light, to form a polymeric coating. Two phosphonium salts ([1]Cl, [1]NTf$_2$) and two commercially available monomers (HDDA, F$_6$MA) were selected for comparison, to better understand effects of using phosphonium salts and/or fluorinated carbon chains. The phosphonium salts had previously been seen to have water-repelling qualities when combined with non-transparent surface roughness.[31] HDDA was selected as it is used in UV-cured industrial coatings. F$_6$MA was chosen in order to compare the fluorinated phosphonium salts with a phosphine-free low free-energy fluorous group in the films.

SCHEME 1

Film-forming monomers, [1]Cl, [1]NTf$_2$, HDDA, 2,2,3,4,4,4,-hexafluorobutylmethacrylate (F$_6$MA), and the general scheme for the photoinitiated radical polymerization:

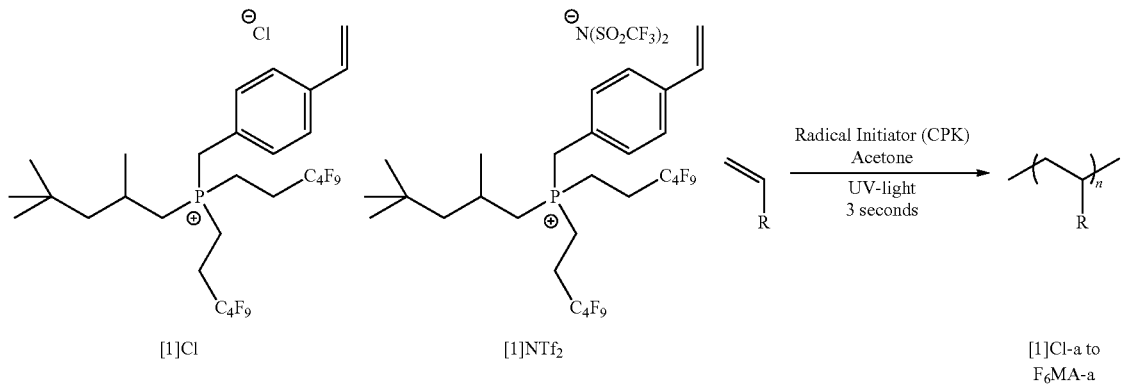

-continued

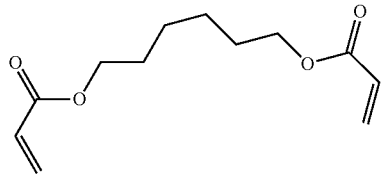

HDDA

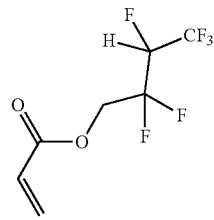

F₆MA

Hydrophobic silica nanoparticles were utilized to impart surface roughness to the films and their passivation with polydimethylsiloxane (PDMS) provides them with a low free-energy coating. The size of the particles (advertised as 10-20 nm, measured by DLS to have an average diameter of 13 nm) is such that they should not interfere dramatically with visible light passing through the films, rendering them transparent or translucent. The incorporation of silica nanoparticles in polymeric films has also been seen to increase film hardness and scratch resistance.[32,33] The fraction of nanoparticles was varied with each monomer from 0 to 50 weight percent, in order to ascertain the role of the particles in the final coatings as shown in Table 4.

[1]Cl and HDDA) had higher contact angles (than series [1]NTf$_2$ and F$_6$MA) at higher loading. This is consistent with the idea that low-free energy surfaces are important for hydrophobic surfaces, but play a smaller role in superhydrophobic surfaces.[34]

Figure 4:
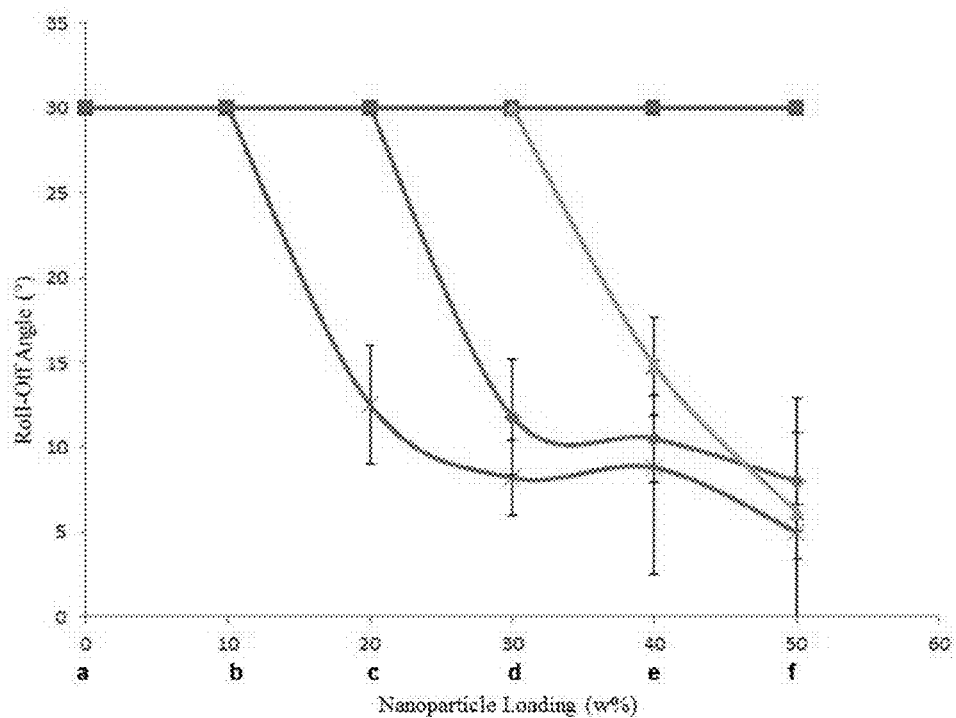
FIG. 4(a) shows roll-off angles for each series of films listed in Table 4. The maximum measurable angle on the instrument is 30°, so values shown as 30° represent values 30° or greater.
FIG. 4(b) shows hysteresis data. The color scheme for the data, shown at the right of FIG. 4(b), is the same for both figures.
Figure 4:
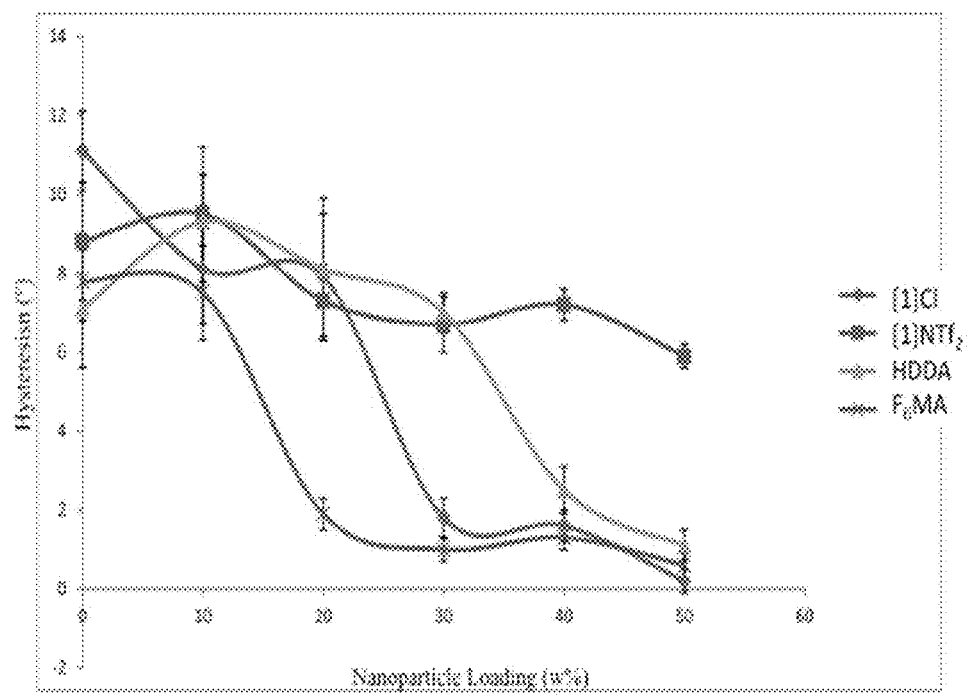

Another measure of superhydrophobicity of a surface is roll-off angle. This is the angle to which a surface must be tilted in order for a droplet on the film to overcome the static coefficient of friction and fall off the surface. As the wt % of nanoparticles in the coatings increases, the angle at which a droplet of water rolls off the surface decreases. Results are shown in FIG. 4(a). This was true except for the series of

TABLE 4

Nanoparticle loading of the films. In all cases the remainder of the composition consists of the post-polymerization HDDA monomer/photoinitiator (95:5) mixture

| Nanoparticle Loading (w %) | [1]Cl | [1]NTf$_2$ | HDDA | F$_6$MA |
|---|---|---|---|---|
| 0  | [1]Cl-a | [1]NTf$_2$-a | HDDA-a | F$_6$MA-a |
| 10 | [1]Cl-b | [1]NTf$_2$-b | HDDA-b | F$_6$MA-b |
| 20 | [1]Cl-c | [1]NTf$_2$-c | HDDA-c | F$_6$MA-c |
| 30 | [1]Cl-d | [1]NTf$_2$-d | HDDA-d | F$_6$MA-d |
| 40 | [1]Cl-e | [1]NTf$_2$-e | HDDA-e | F$_6$MA-e |
| 50 | [1]Cl-f | [1]NTf$_2$-f | HDDA-f | F$_6$MA-f |

Hydrophobicity

Figure 3:
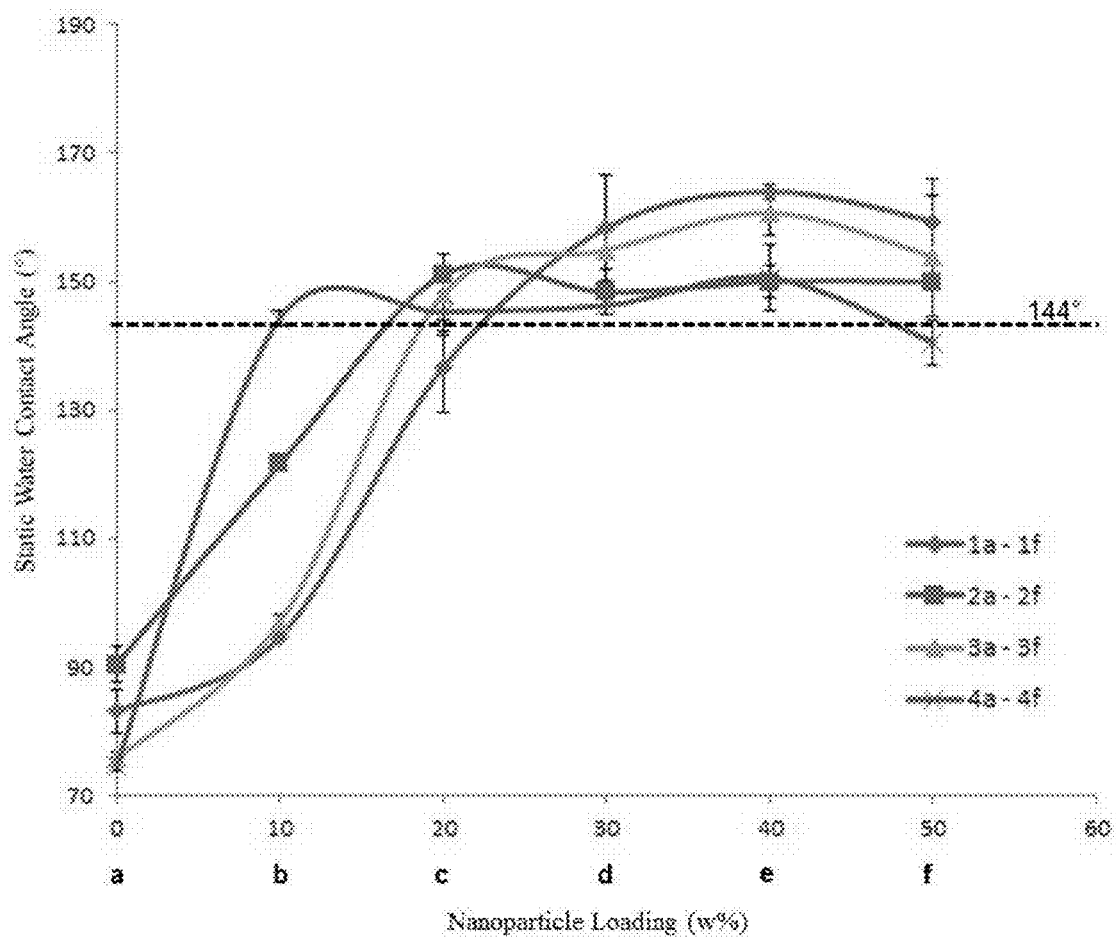
FIG. 3 shows a comparison of static water contact angles vs. nanoparticle loading for each of polymeric films having the loadings listed in Table 4. For comparison, the superhydrophobic particles, when coated on the polyester substrate, having a static contact angle of 144±3° is shown by the dashed line.

Static water contact angles were used as a measure of hydrophobicity of HDDA films with results shown in FIG. 3. Films without silica nanoparticles ([1]Cl-a, [1]NTf$_2$-a, HDDA-a, F$_6$MA-a) exhibited water contact angles between 75° and 90°. With the addition of 10 w % of nanoparticles, the contact angles markedly increased for the films comprised of the fluorous acrylates (F$_6$MA-b) and the phosphonium salt with the bistriflamide anion ([1]NTf$_2$-b). Further increasing the nanoparticle loading to 20 w % resulted in surfaces made with all monomers (series [1]Cl and HDDA) realizing an increased in contact angle. It was observed that films that performed less well at 10 w % loading (series films formed from ionic monomer [1]NTf$_2$. These films did not exhibit appreciable roll-off at any level of nanoparticle loading.

The ease of which a droplet rolls off a surface is related to the strength of the interaction between the trailing edge of the droplet and the surface as it tilts. This can be measured by examining the difference in contact angle of droplets on the tilted surface, or hysteresis. The advancing edge of a droplet on a tilted surface will have a higher contact angle than the receding edge. The difference between these two values, when measured just prior to the droplet rolling, provides information about the hydrophobicity of a surface. When the hysteresis is low, droplets roll off easily. The hysteresis data shown in FIG. 4(b) fit well with the measured roll-off angles—droplets that do not have measurable roll-off angles also have higher hystereses than the low roll-off angle surfaces. Series [1]NTf$_2$ films have superhydrophobic or near-superhydrophibic contact angles, but also a high relatively hysteresis, an example of the "rose-petal effect".[35,36] Despite the small contact area between the droplet and the film, the water adheres strongly to the surface. In contrast, films made from compound [1]Cl have very low hysteresis values (at particle loadings of 30% and higher) and are candidates for UV-cured, self-cleaning surfaces.

Surface Imaging

Figure 5:
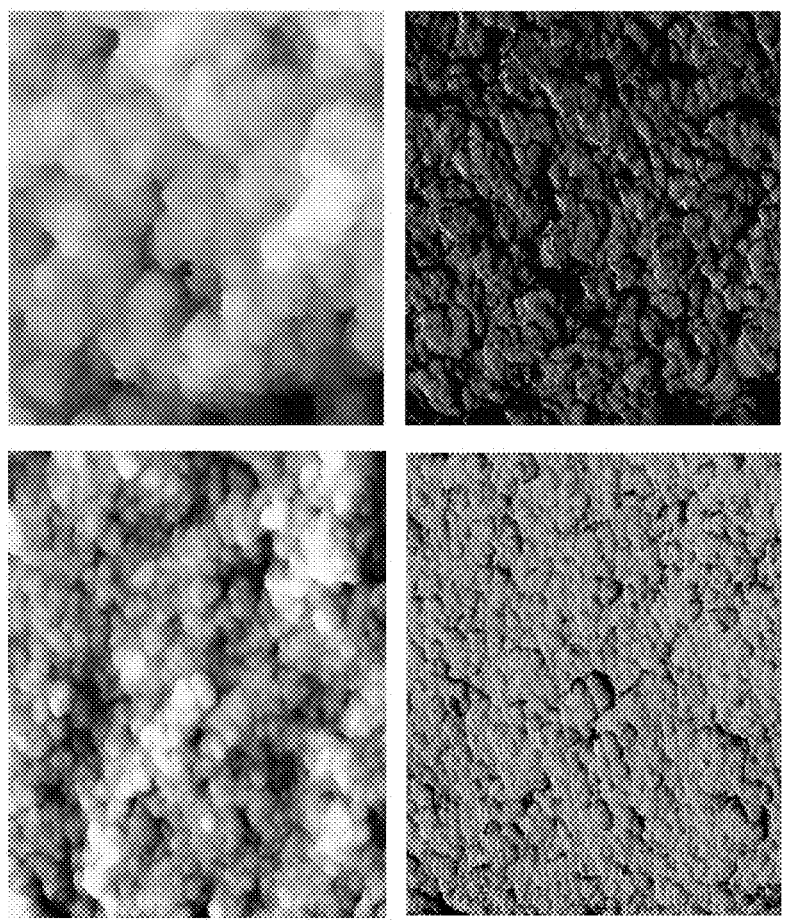
FIG. 5 depicts AFM topography (at left) and phase (at right) images of the surface of films [1]Cl-e (top pair) and F$_6$MA-b (lower pair) of Table 4. The lack of variation of the phase image from the topography image in each pairing indicates that there is only one tip interaction at these surfaces. All images are 5×5 microns.

Atomic Force Microscopy (AFM) images (FIG. 5, left images) provide an indication of the degree of surface roughness due to the particles. The phase images (FIG. 5, right images) show that the probe tip is having a similar degree of interaction with all areas of the surface. This indicates that the immediate surface of the films is of uniform composition: either the polymeric matrix completely coating the nanoparticles or the nanoparticles overlaying a polymer base.

Figure 6:
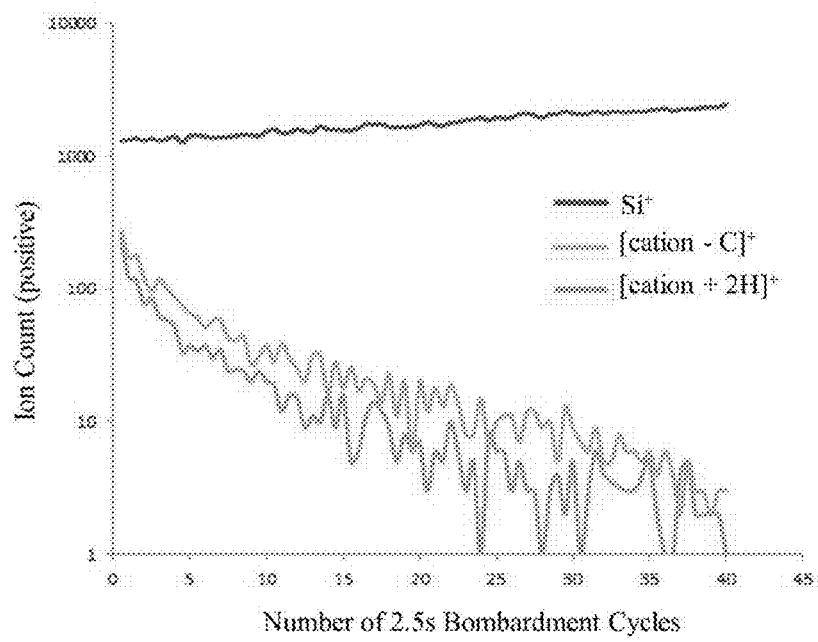
FIG. 6(a) and (b) show TOF-SIMS bombardment over time studies with FIG. 6(a) showing a plot of ion count (positive) versus number of 2.5 s bombardment cycles and FIG. 6(b) showing a plot of ion count (negative) versus number of 2.5 s bombardment cycles. These plots show that the frequency of ion fragments associated with compound MCI decrease with respect to silicon ions. Y-axes are logarithmic and the bombardment cycles consist of 0.5 s bombardment with $^{131}$Cs, followed by 2 s of ion collection. Data shown are for film [1]Cl-c described in Table 4.
Figure 6:
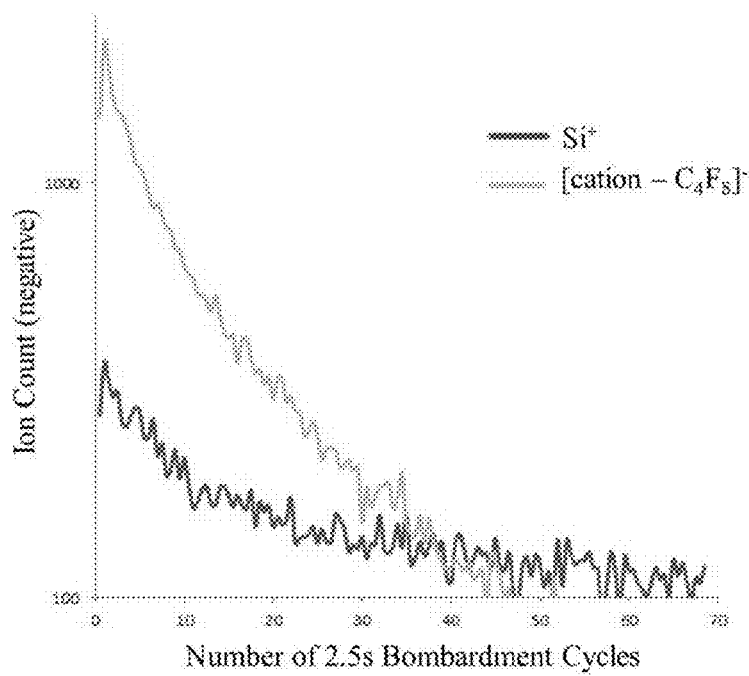
Figure 7:
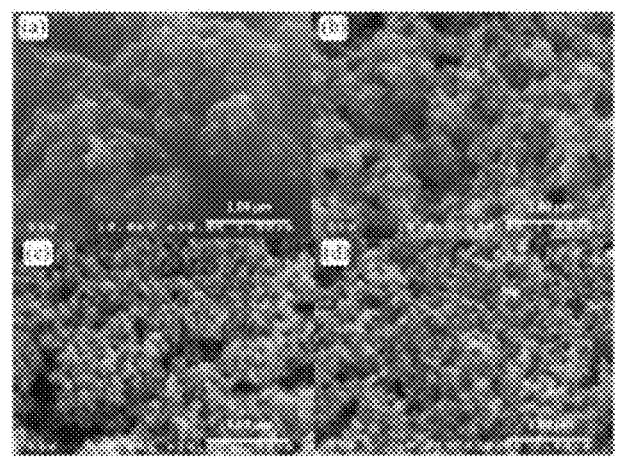
FIGS. 7(a)-(d) show SEM images of [1]Cl films with (a) 10, (b) 20, (c) 30, and (d) 40 wt % nanoparticle loading respectively. All magnifications are 30,000 times and the ten white dots in the lower right corner of the images represent a distance of one micron.
Figure 8:
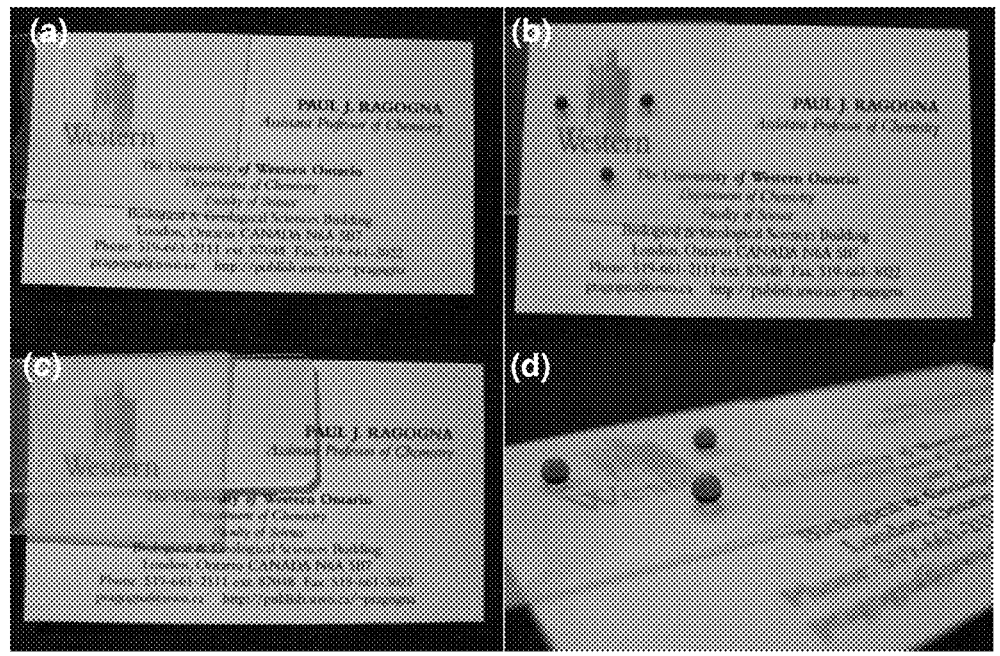
FIG. 8 shows images of film HDDA-f, 50 wt % nanoparticles. On the left, (a) and (c), are images showing the visible difference in transparency when the coating is further from the surface viewed. On the right, (b) and (d), are images showing 15 μL droplets of water on the surface (WCA=154±3°)

Time of Flight Secondary Ion Mass Spectrometry (TOF-SIMS) was used to evaluate the composition of the film near the surface. It was found that the concentration of detected ions related to known fragments of the phosphonium salt decreased over time with respect to silica-containing ion fragments (FIGS. 6(a) and (b)). This indicates that the topmost layer of the surface of the films is composed of more polymer than nanoparticle and (in conjunction with the AFM studies) that the polymeric matrix is covering the nanoparticles.

Coatings composed of monomer F$_6$MA also demonstrated only one phase at the surface (FIG. 5), however different behavior was observed when the surface was examined with TOF-SIMS. The ablated ions for this series of films are characteristic of PDMS and indicate that the surface is composed of the passivated silica nanoparticles. With 60 second ablation, coating F$_6$MA-b produces some ions relating to monomer F$_6$MA, while coating F$_6$MA-c does not show the presence of any mass fragments relating to the parent monomer. ATR-IR data shows that the films have a C—F stretch at 1195 cm$^{-1}$, corresponding to the C—F stretch of the monomer (1187 cm$^{-1}$). This indicates that monomer F$_6$MA is present in the films, but not at the surface. It is possible that the pre-curing mixture is slightly volatile under curing conditions and does not properly form a polymeric film at the surface. The reduced volatility of the phosphonium salts thus appears to contribute to formation of films containing flourous groups and high loadings of nanoparticles.

The high contact angles observed for all of the films suggested that the roughness at the surface was greater than fully dispersed nanoparticles would provide. This may be due to clumping of particles in the pre-curing mixture or aggregation of the particles during the curing process. Scanning Electron Microscopy (SEM) was used to image the surfaces and determine the extent of clumping. Images of the films made using compound [1]Cl showed an increase in the roughness of the surface as the amount of particle loading increases (FIG. 7(a)-(d)). The polymer matrix is clearly visible in films [1]Cl-b and [1]Cl-c, but is obscured by the particles in films [1]Cl-d through [1]Cl-f, with particles dominating the surface. As the images have no visible 'clumps' it seems that hydrophobicity results from very high level of nanoscale roughness visible on the surfaces.

Film Transparency

As there was no clumping of particles in the films (by SEM), it was determined that the translucent (as opposed to transparent) nature of the films was a result of the heavy levels of particle loading and film thickness. Visual haziness of images viewed through the films (FIGS. 8(a)-(d)), increases when a microscope slide (1 mm thickness) is placed between the film and the surface being viewed. This is a result of the increased path length accentuating the scattering effect of the particles.

Figure 9:
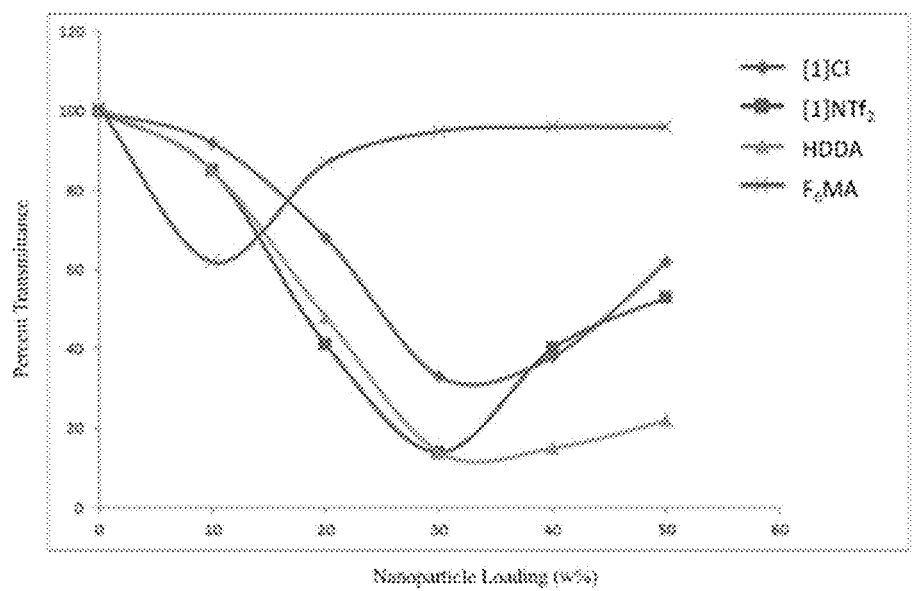
FIG. 9 shows a comparison of the average optical transparency in the visible region (400 nm to 770 nm) of the films. All series in (a) were made with the #10 Meyer rod, series in (b) were made with the #20 Meyer rod. All films were more transparent at longer wavelengths and less transparent at shorter wavelengths.
Figure 9:
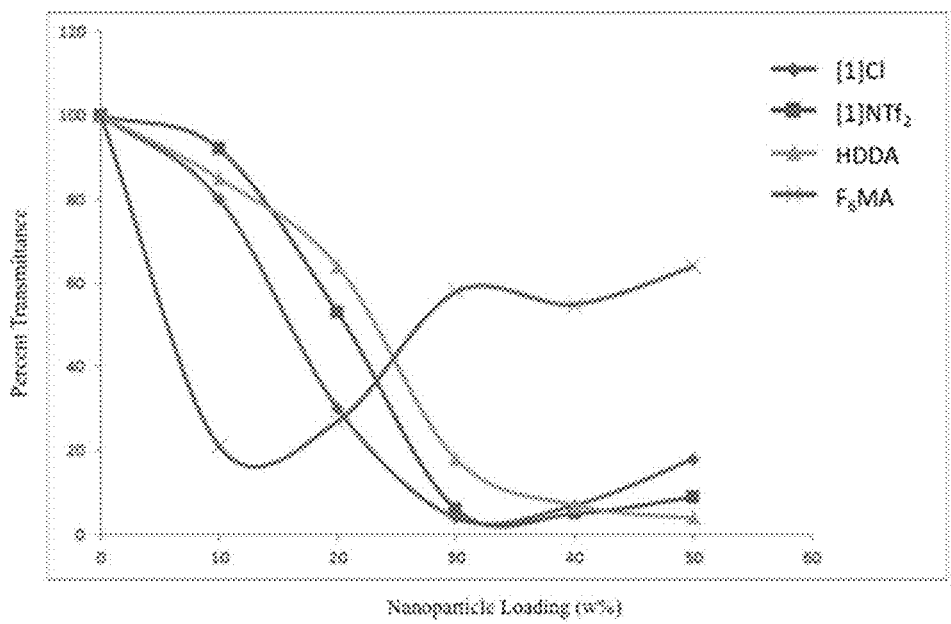

UV-Vis spectrometry was used to measure the optical transparency of the films (FIG. 9(a)). The minimum value for most series occurred at 30 w % particle loading (d series), with an increase in transparency at both 40 w % and 50 w % (e and f series). This corresponds well with SEM images of cross-sections, which indicated that the transparency was a result of two competing factors, particle loading and film thickness. The d series films are thicker (≈3 microns) than either the e series (≈2 microns) or the f series (≈1 micron). This is a result of the increased volume of acetone in the pre-curing mixtures, used as a thinner to provide appropriate viscosities to spread the mixture with the Meyer rods.

In order to confirm that film thickness contributed to transparency, all of the series of films were made using a #20 Meyer rod. This produced thicker films (≈5 microns on average, measured by SEM cross-sectioning) that had comparable roll-off and water contact angles but were not as optically transparent (FIG. 9(b)). The only exception to this behavior is for films made with compound F$_6$MA. Cross-sections of these films revealed (by SEM) that there is very little (F$_6$MA-b) or no (F$_6$MA-c to f) visible polymeric matrix and that the majority of the "film" consisted of nanoparticles deposited on the substrate. This is consistent with the fluorous acrylate (F$_6$MA, bp=158° C.) evaporating from of the surface of the particles when the mixture undergoes UV-curing. The contact angle of the nanoparticles deposited on the polyester substrate with acetone was found to be about 144°.

A suitable amount of nanoparticles for films formed using the test monomers was thus found to be between 30 and 40 wt %. Films with these values show the highest static water contact angles, among the lowest roll-off and hyseteresis angles and comparable transparency.

Superhydrophobic Films Incorporating Microparticles

Through the combination of highly-fluorinated photopolymerizable phosphonium salts with alumina microparticles, it was demonstrated that it is possible to create robust superhydrophobic surfaces in a way that is fast, efficient and scalable.

A series of phosphonium salts was designed with the intention of including a photopolymerizable group on each molecule, while maintaining high levels of fluorine loading (Scheme 2). Initial phosphine preparation was achieved by the radical addition of PH$_3$ to a fluorous olefin, followed by quaternization with 4-vinylbenzylchloride to yield the desired phosphonium salt.

SCHEME 2

Synthesis of phosphonium salts from phosphine and PH$_3$ starting materials.

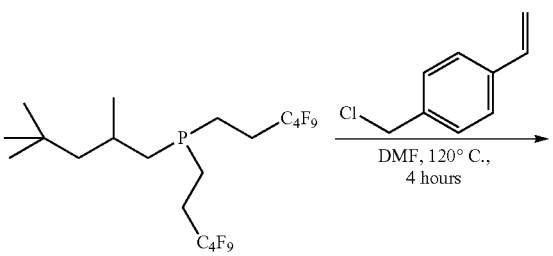

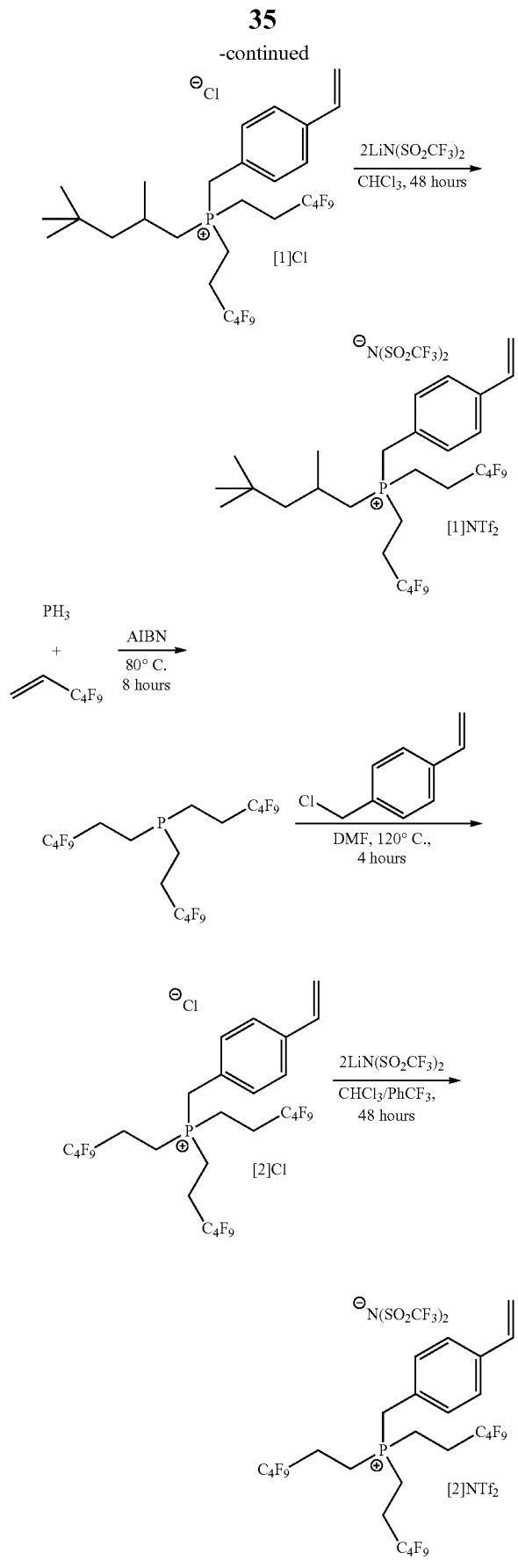

SCHEME 3
General scheme for the photopolymerization of phosphonium salts:

Two different tertiary phosphines (isooctylbis(1H,1H,2H, 2H-perfluorohexyl)phosphine and tris(1H,1H,2H,2H-perfluorohexyl)phosphine) were stirred with vinylbenzylchloride, forming air-stable phosphonium salts (compounds [1]Cl and [2]Cl). To examine possible effects of the counterion, the chloride anion was replaced with the fluorine-rich bis(trifluoromethylsulfonylyl)imide ($NTf_2^-$) anion via an anion exchange reaction to obtain compounds [1]$NTf_2$ and [2]$NTf_2$.

Both positive and negative ESI MS were used to examine the salts, with $ESI_+$ major peaks representing the phosphonium cations and ESI-peaks appearing for the [cation+ $(anion)_2$]$^-$ species as well as the $NTf_2^-$ anion for compounds [1]Cl and [2]$NTf_2$. For anion exchange products, [1]$NTf_2$ and [2]$NTf_2$, no species appeared representing [cation+ $NTf_2$+Cl]$^-$ or [cation+2Cl]$^-$, indicating that the anion exchange reaction and work-up procedure had isolated the chloride-free $NTf_2^-$ salts of the phosphonium cations.

In order to form polymeric films with these phosphonium salts, they were mixed with 5 w % of 1-hydroxycyclohexylphenylketone (CPK) in acetone. By coating a polyester substrate with the formulation and exposing the material to UV light, a durable polymeric coating was rapidly formed as shown in Scheme 3. The monomers and the resulting polymeric films were analyzed by ATR-FTIR spectroscopy. Compounds [1]Cl and [2]Cl showed characteristic vibrations for C—F (1200 cm$^{-1}$) and vinyl (990 and 775 cm$^{-1}$) functional groups. The $NTf_2^-$ monomers ([1]$NTf_2$ and [2]$NTf_2$) showed two additional absorbances with energies of 666 cm$^{-1}$ for the S=O and 777 cm$^{-1}$ for the $CF_3$ group. In the spectra of the polymeric films, no vinyl stretching vibration at 990 cm$^{-1}$ was present, indicative of complete polymerization[16].

These films were examined for hydrophobicity through static water contact angle measurements. WCA angles measured for these films gave values of θ≈80° for compounds with chloride anions ([1]Cl and [2]Cl) and θ≈90° for compounds containing bistriflamide anions ([1]Cl and [2]$NTf_2$). The $CF_3$ groups on the bistriflamide anion were effective at improving the liquid water repellency of these films, improving θ values by approximately 10°.

Figure 10:
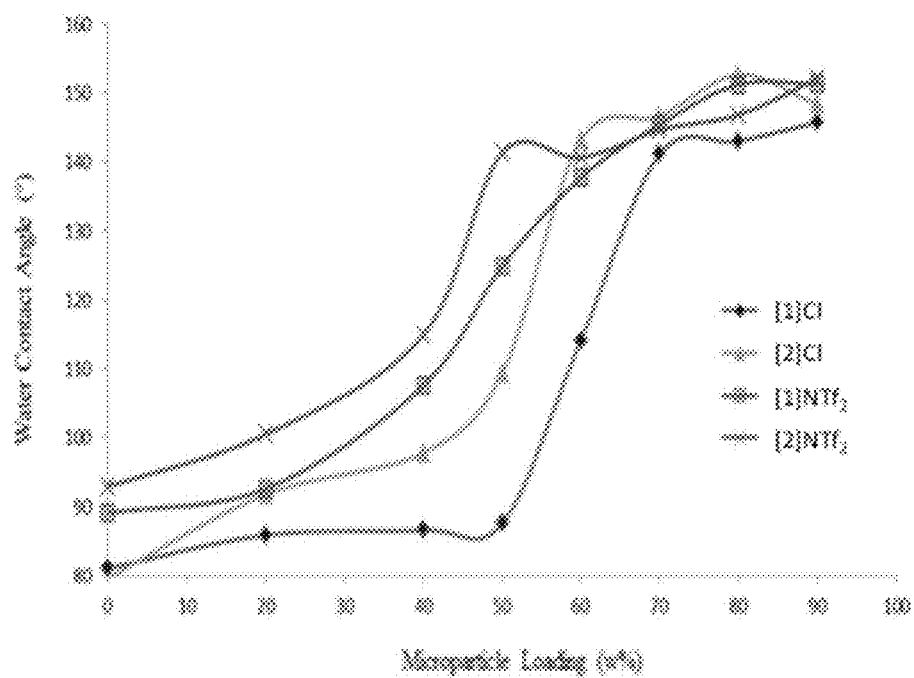
FIG. 10 shows a comparison of water contact angles vs. microparticle loading for the polymers of [1]Cl, [2]Cl, [1]NTf$_2$, and [2]NTf$_2$. The order of the curves at 50% microparticle loading is, from lowest to highest, [1]Cl, [2]Cl, [1]NTf$_2$, and [2]NTf$_2$.

Surfaces with a high degree of roughness are essential to obtain superhydrophobicity (WCA>150°). In order to incorporate surface roughness into the films, alumina microparticles (1.5-3.5 μm) were dispersed in the mixture by insonation. The microparticle-containing mixture was then coated on a polyester substrate and irradiated in a process identical to the previously formed (particle-free) films. The resultant films demonstrated an improvement in WCA as the weight percent (wt %) of microparticles was increased as shown in FIG. 10. This represents a convenient method for producing superhydrophobic films with comparable hydrophobicity to similar, less facile methods.

The effect of fluorine loading in the phosphonium salt is more apparent in films with microparticles. Each of the four films (cured from monomers [1]Cl, [2]Cl, [1]NTf$_2$ and [2]NTf$_2$) with 50 w % of Al$_2$O$_3$ microparticles have considerably different (from each other) water contact angles. The WCA's of the films range from 88° to 141° (±3) as the fluorine loading in the monomer increases from 43% without bistriflamide (compound [1]Cl) to 54% with bistriflamide and three fluorous tails (compound [2]NTf$_2$). Films containing bistriflamide anions still showed improved repellence compared to the films with chloride anions. The WCA of the microparticles coated in a polyester sheet without any phophonium salt was measured to be 64±1°. Thus the presence of the phosphonium salt, even in low concentrations such as 10 wt % is important in obtaining highly hydrophobic or superhydrophobic surfaces.

Figure 11:
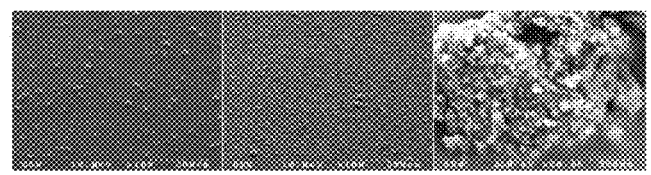
FIG. 11 shows SEM images of two films made from compound [1]Cl containing different amounts of microparticle loading: (a) 20 w %, (b) 80 w %. The image of (c) shows a single microparticle.

Surface microscopy permits visualization of the roughness that is imparted to the films by the microparticles. FIG. 11 shows scanning electron microscopy (SEM) images of the surfaces at 100× magnification. A film with 20 wt % loading (FIG. 11(a)) shows areas of (relatively) flat surface as compared to a film with 80 wt % microparticles (FIG. 11(b)). This increased roughness results in higher WCA's, as described by either the Wenzel or Cassie-Baxter models. Roughness is also present at the nanoscale due to the shape of the microparticles (FIG. 11(c)), providing both micro- and nanoscale roughness.

Figure 12:
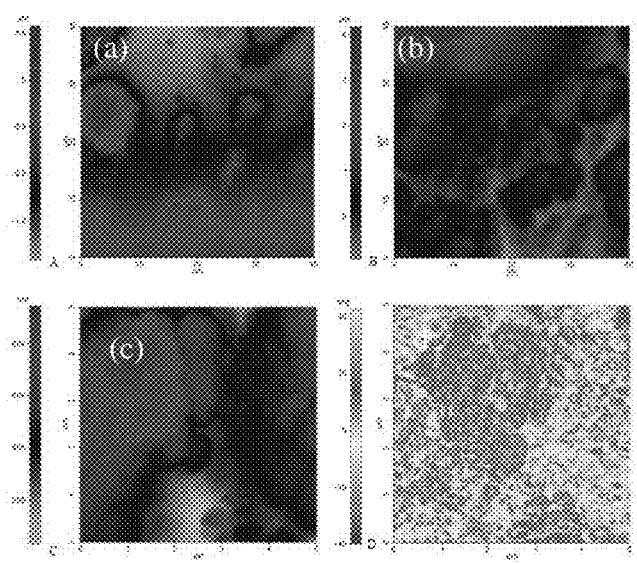
FIG. 12 shows AFM images of films with (a) 20 wt % (upper left) and (b) 80 wt % (upper right) microparticle loading.

Atomic Force Microscopy (AFM) images (FIGS. 12(a)-(d)) also demonstrate the increasing degree of surface roughness as the concentration of particles increases. Flat areas, seen in the center top of the image of FIG. 12(a) are present on the surface of a film with 20 w % particle loading, while the surface of a film with 80 w % microparticles has no such areas, the low areas (an example is in the bottom right of image B) still have considerable roughness features. The depth of field is also indicative of the greater roughness, with the 80 w % film image (FIG. 12(b)) having surface features an order of magnitude higher than the image corresponding to the 20 w % film. The phase image of FIG. 12(d) shows that the probe tip is having different interactions with areas of the surface shown in FIG. 12(c). This indicates that the particles have erupted through the surface. These phase differences only occur in films where the WCA is elevated (θ>130°), suggesting that the varying surface morphology contributes to the hydrophobicity.

Antimicrobial Properties of Ionic Polymer

Through the incorporation of acrylate-appended phosphonium salts with crosslinking agents, robust coatings were fabricated within seconds on plastic substrates and displayed antimicrobial activity towards E. coli and S. Aureus bacteria.

Results and Discussion

Figure 13:
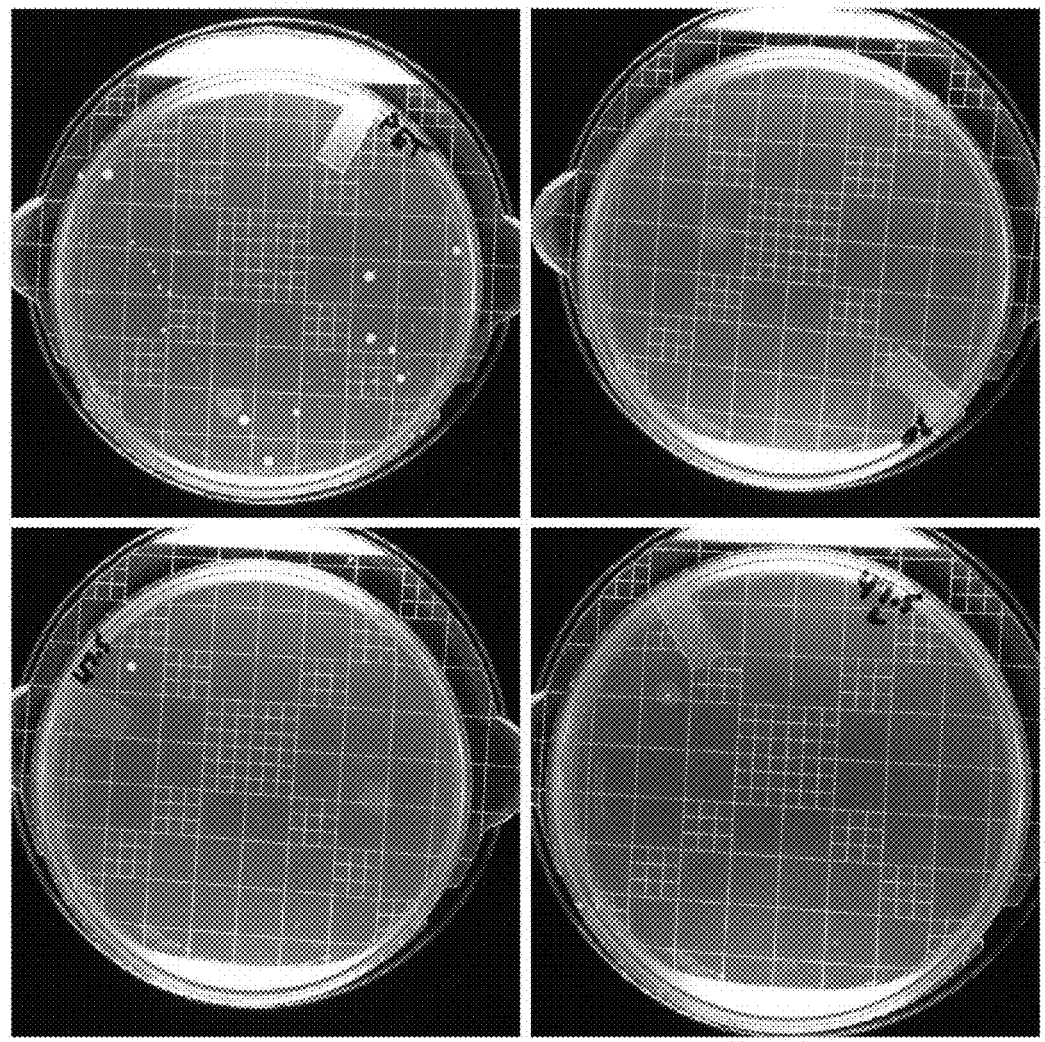
FIG. 13 shows antibacterial activity of 30 wt % and 47.5 wt % [4]Br UV-cured films against S. Aureus. Clockwise from upper left: Control; 30 wt % unleached; 47.5 wt % unleached; 47.5 wt % leached film.

For a polymer surface to exhibit contact-killing properties, there must be accessible surface cations at the polymer/air interface. It is well established that greater cation density promotes the contact-killing process and prevents further bacterial proliferation. UV-cured coatings from the diacrylate EB 130 containing an acrylyl derivative of tributyl(3-hydroxypropyl)phosphonium bromide ([4]Br) were prepared with the goal of creating a highly charged interface. Both the antibacterial efficacy and charge density were measured for films with varying amounts of phosphonium salt and results summarized in Table 5, FIG. 13.

TABLE 5

Correlation between phosphonium content within the curing formulation and both the surface charge density and antimicrobial efficacy ([4]Br—[Bu$_3$Pacryl]Br)

| Compound [4]Br Content (wt %) | Charge/Unit area (×10$^x$ Y$^+$/cm$^2$) | % E. coli killed (unleached) | % S. Aureus killed (unleached) | % S. Aureus killed (leached) |
|---|---|---|---|---|
| 0% | 0 | No activity | No activity | No activity |
| 25% | 0 | No activity | | |
| 30% | 1.47 × 10$^{15}$ | 30 ± 5 | 100 ± 2 | |
| 37.5% | 8.18 × 10$^{15}$ | 46 ± 7 | | |
| 47.5% | 1.42 × 10$^{16}$ | 82 ± 9 | 100 ± 2 | 100 ± 2 |

Films containing up to 25 wt % phosphonium salt displayed zero efficacy towards bacterial death. They also displayed an absence of cations at the air/polymer interface. Activity was first observed with films possessing 30 wt % phosphonium salt. As phosphonium content in the films increased, both an increase in surface charge density and bacterial activity was observed. Coatings with 47.5 wt % displayed both the highest surface charge density and antimicrobial activity, consistent with literature precedent for other cationic surfaces. The pronounced difference in films containing 25 and 30 wt % is believed to be due to differences in surface energy between EB 130 and the phosphonium salt. The non-polar nature of the crosslinking agent has lower surface energy than that of the phosphonium salt. This results in a preferential migration of EB 130 to the surface preventing bacteria from interacting with the cationic charges. Upon the addition of sufficient phosphonium salt, cations became present at the surface, as detected by the fluorescein dye experiment and exemplified by the increase in antibacterial efficacy. While films containing 47.5 wt % of the active compound only resulted in approximately 82% bacterial death, it was thought that increased phosphonium loadings should result in greater activity. In an effort to address this issue, in conjunction with the low yields of the active compound, tributyl(3-hydroxypropyl)phosphonium chloride ([4]Cl) which had much greater yields (68% as opposed to 15% with the bromide version), was prepared. Films were prepared and analyzed following the same procedure. Results are summarized in Table 6.

TABLE 6

Correlation between phosphonium content within the curing formulation and both the surface charge density and antimicrobial efficacy ([4]Cl, [Bu$_3$Pacryl]Cl)

| Compound [4]Cl Content (wt %) | Charge/Unit area (×10$^x$ Y$^+$/cm$^2$) | % Bacteria killed |
|---|---|---|
| 0% | 0 | 0 |
| 15% | 0 | 18 |
| 20% | 5.6 × 10$^{14}$ | 18 |
| 25% | 3.46 × 10$^{15}$ | 71 |
| 30% | 9.07 × 10$^{15}$ | 71 |
| 37.5% | 1.24 × 10$^{16}$ | 75 |
| 47.5% | 2.54 × 10$^{16}$ | 100 |

A standard viable, plate count method was used to quantitate the biocidal efficacy of a film surface against Escherichia coli (E. coli) and Staphylococcus Aureus (S. Aureus) bacteria. Results are summarized in Table 7.

TABLE 7

Effect of surface on colony formation
of E. coli and S. Aureus bacteria

| # CFU's expected on a non biocidal surface | # of surviving CFU's |
|---|---|
| $10^5$ | 19 ± 15 |
| $10^4$ | 0 |
| $10^3$ | 0 |
| $10^2$ | 0 |

Figure 14:
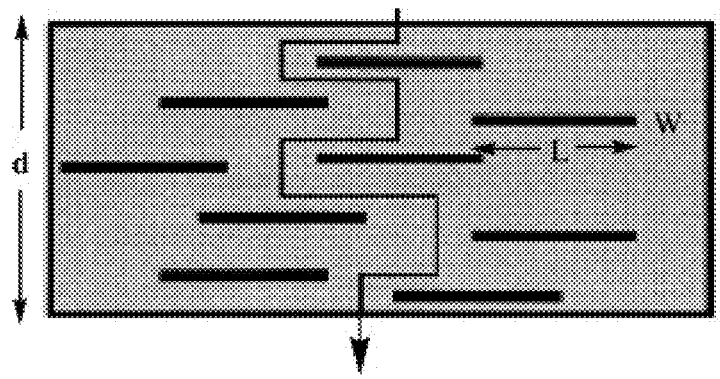
FIG. 14 is a schematic of a "tortuous pathway" created by multiple anionic and cationic layers. In the illustrated example, gas molecules diffuse around high aspect ratio clay platelets to reach the opposite end, thus increasing its path length.

Functionalization of polyelectrolyte polymer surface via Anion Exchange Surface Modification using Clay Platelets Recently, Grunlan et al. has developed a process for the deposition of clay platelets on cationic polyethylenimine polymer in order to fabricate barrier coatings towards gases such as oxygen and water.[37,38] The deposition of several polymer-clay bilayers led to films with gas barrier properties that surpass industry requirements. Oxygen permeabilities under 0.005 g/m²/day at ambient pressures using films with a thickness less than 200 nm were reported.[37] The superior results are attributable to the impermeability and high aspect ratio of clay. When layered clay lies flat on a surface, gas molecules diffuse around each clay platelet along a "tortuous" to reach the opposite side, as shown schematically in FIG. 14.

Figure 15:
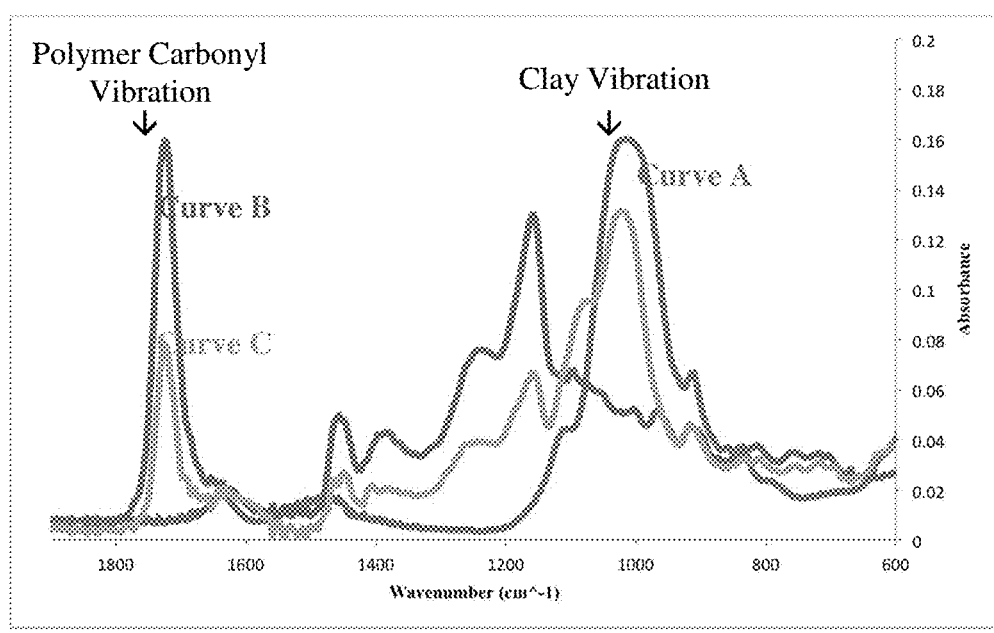
FIG. 15 is an FTIR-ATR spectra of (a) clay powder (curve having greatest maximum height at about 1050 cm$^{-1}$) (b); unmodified polymer (phosphonium:EB 130=1:1; curve having greatest maximum at about 1750 cm$^{-1}$); (c) polymer coated with clay after dipping for 5 min in a 1 wt % clay dispersion (curve having significant peaks at both 1050 cm$^{-1}$ and 1750 cm$^{-1}$)

Gas permeability decreases with increasing path length. Introduction of cross-linkers improve gas barrier properties but integrity was found lacking under harsh conditions.[10] FTIR-ATR was used to determine the presence of clay at approximately 1050 cm$^{-1}$. See FIG. 15.[39]

Figure 16:
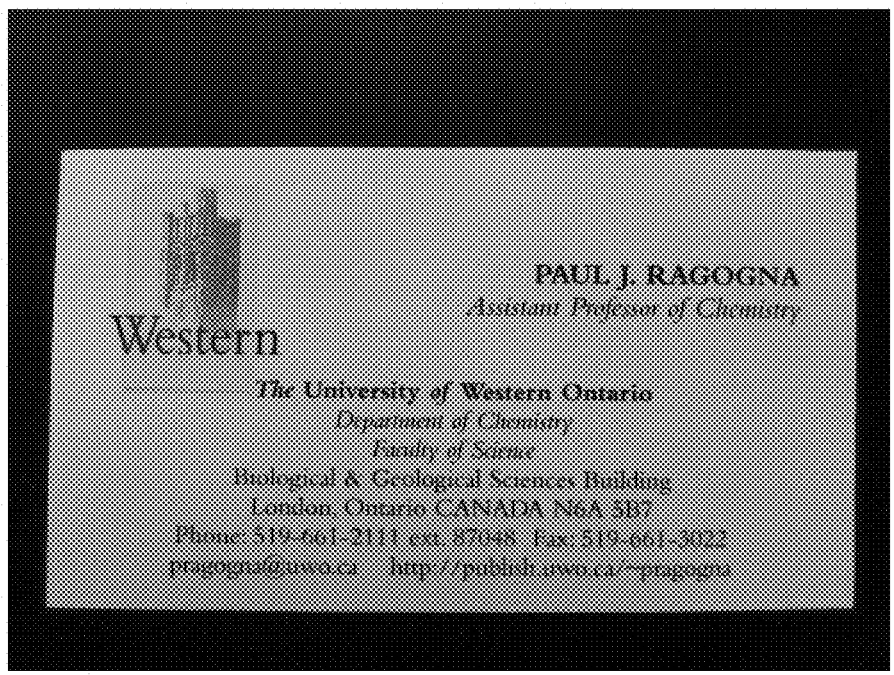
FIG. 16 shows a printed paper coated with a phosphonium/EB 130 polymer overcoated with a layer of clay.

The decrease in absorbance of the C=O bond at approximately 1750 cm$^{-1}$ and C—O bond at 1175 cm$^{-1}$ is attributable to the formation of a clay layer between the polymer and ATR crystal. This reduced the amount of polymer interacting with the IR beam, thus contributing less to the signal. Similar results were found for polymers formed using each of the triacrylate EB12 and EB130. Modified surfaces were optically clear with minimal hazing or discoloration as illustrated in FIG. 16.

Figure 17:
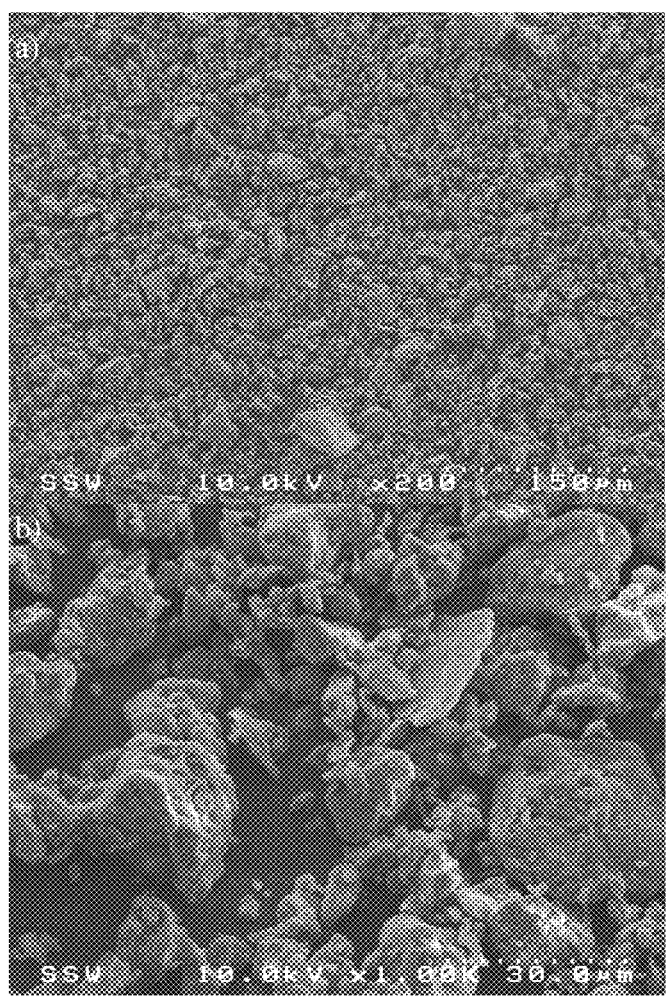
FIG. 17 is an SEM image of clay powder before dispersion in water. (a) 200× magnification and (b) 1000× magnification.

Morphology and structure of the modified surface were examined by SEM analysis. FIGS. 17(*a*) and (*b*) show clay powder before dispersion in water.

Figure 18:
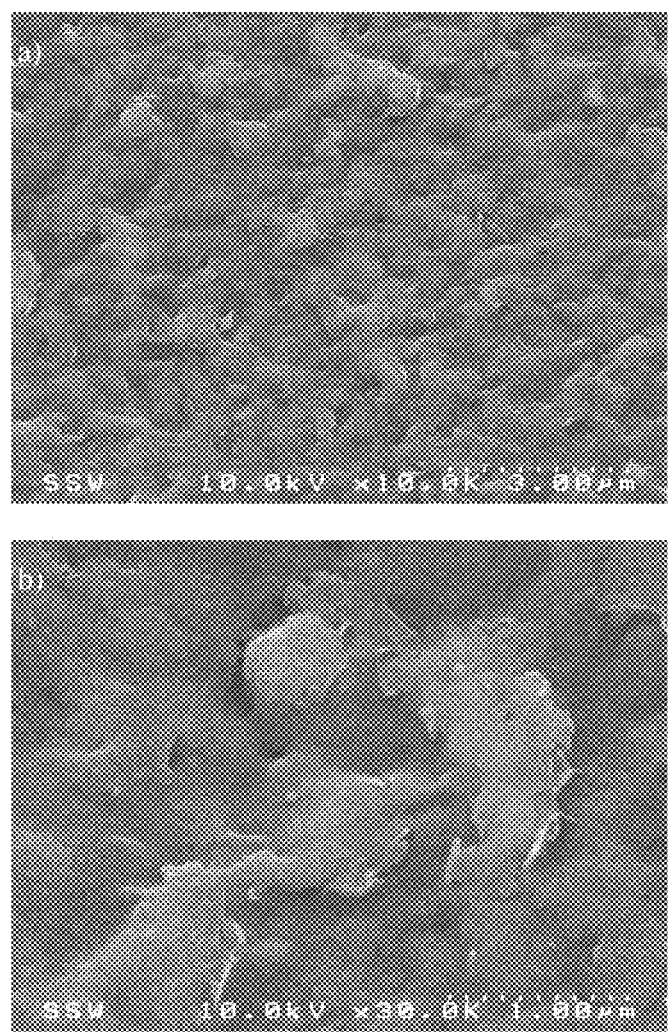
FIG. 18 shows SEM images of clay platelets on the surface of a polymer composed of a 1:1 ratio of EB 12 and [4]Cl (a) 10000× magnification and (b) 30000× magnification.

The layered structure of clay has allowed for the fabrication of polymer-clay nanocomposites. Each clay layer is bound electrostatically at the basal 001 interface.[40] High shear forces in polar media have been known to promote exfoliation of these layers[41]. The resulting clay platelets are typically on the order of several nanometers in thickness, and several microns wide.[42] Each platelet is surrounded by negative charge with labile sodium cations. FIGS. 18(*a*) and (*b*) show the structure of the modified surface after immersion in a clay dispersion.

Anions on the surface of the polymer film underwent an exchange with the anionic clay to form an ordered layer. FIG. 18 suggests that each clay platelet lies flat on the surface as opposed to a random orientation. Despite full coverage of the surface with clay, these films were found to be transparent. This suggests that phosphonium-based UV-cured films can be used in e.g., an ultra-barrier in food packaging or for applications in modern electronics. The high cross-linking nature of photopolymerized coating can attenuate problems associated with LbL assemblies.

Surface Mediated Suzuki-Cross Coupling Using Modified Ionic Films

Figure 19:
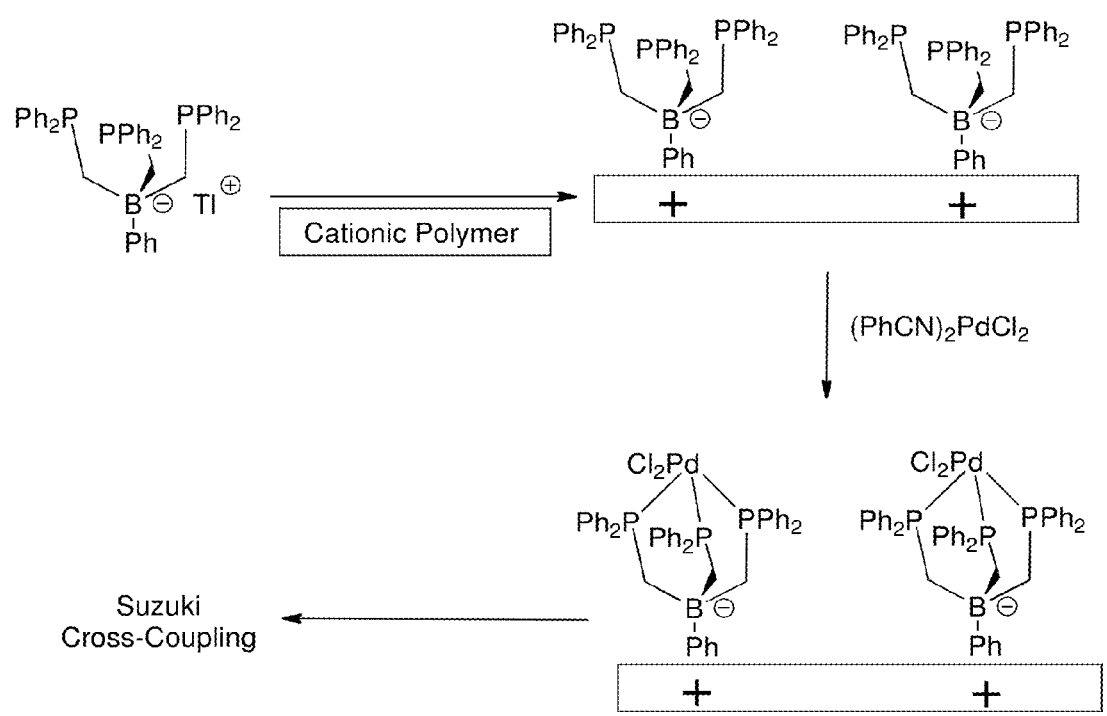
FIG. 19 shows a synthetic scheme for the preparation of a catalyst-modified surface using phosphonium-based UV-cured films.

A problem exists with recovery of catalysts from homogenous reaction mixtures.[20] To improve recovery, catalysts can be immobilized on a substrate such as silica or carbon.[43] This permits isolation of the catalyst by filtration, and purification by rinsing. Here, a catalyst was immobilized on the surface of a polyelectrolyte polymer. As a polyelectrolyte polymer can be deposited on surfaces of various shapes and profiles, stir-bars, polymer beads or other laboratory equipment can be coated and modified to include an active catalyst on its surface. Using negatively charged phosphinoborate ligands, a polymer surface was modified with active sites for bonding with metal centers. The catalytic properties of the catalyst-modified coatings was assessed by performing Suzki-coupling reactions as illustrated in FIG. 19.

Figure 20:
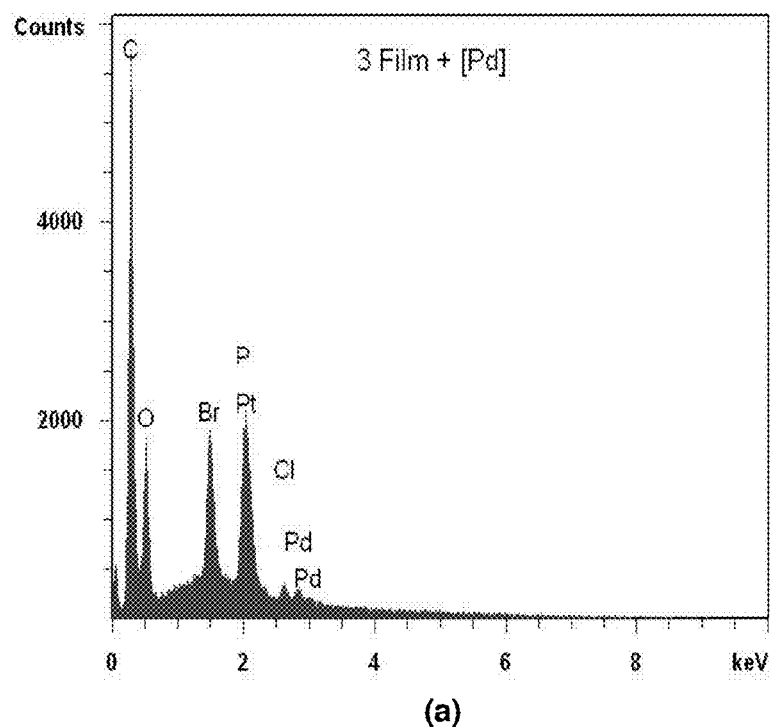
FIG. 20 shows (a) EDX of ionic film of EB 130 and compound [1]Cl dipped in a 0.5 wt % solution of bis (benzonitrile)palladium(II) chloride; and (b) EDX of ionic film dipped in a 0.5 wt % solution of thallium trisphosphinoborate followed by dipping in a 0.5 wt % solution of bis(benzonitrile)palladium(II) chloride.
Figure 20:
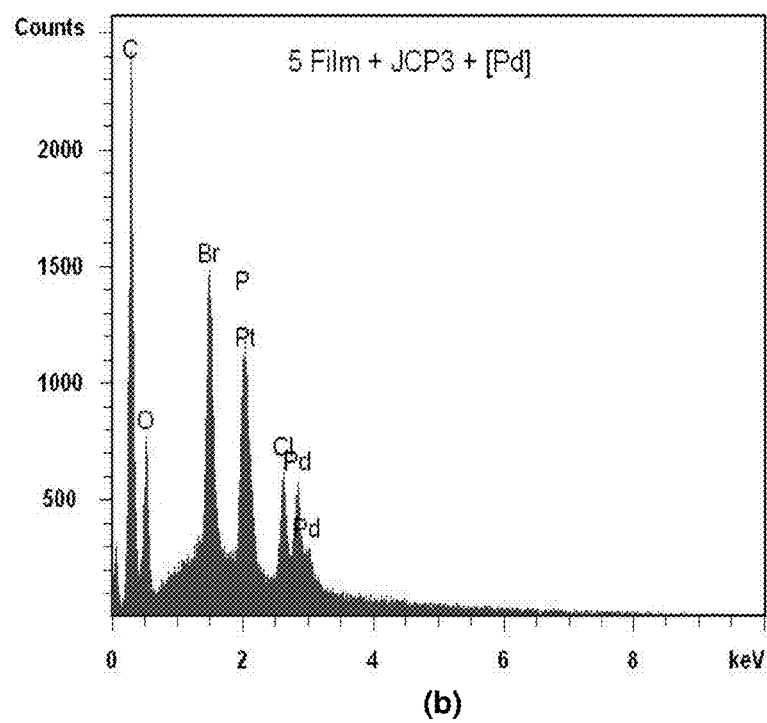

Films were prepared using EB 130 as described above. After immersing the film in a solution of thallium tris (diphenylphosphinomethyl) phenyl borate, a white hazey powder formed on the surface of the film. The haze was confirmed to be thallium bromide by EDX and SEM, as expected from a succesful anion exchange. After rinsing with THF and ethanol, the haze was removed resulting in a clear and colourless film. A control using a film composed of only EB 130 and was also immersed in a solution of the borate solution. No haziness was observed, consistent with the absence of a salt exchange. The borate-modified film was then immersed in a solution of bis(benzonitrile)palladium (II) chloride. After rinsing with THF and ethanol, the film possessed a dark orange suggesting the presence of palladium. Several control studies were done to determine whether palladium was complexing with the borate ligand as opposed to adsorbing to the polymer. Bare Teijin substrates and films composed of either EB 130 or unmodified ionic film were immersed in to the solution. Ionic films possessed a slight orange colour after dipping, despite the absence of the phosphino-borate ligand. EDX was used to confirm if the orange colour was due to the presence of palladium (FIGS. 20(*a*) and (*b*)).

The presence of the borate ligand on the surface of the film resulted in a 7 fold increase in the intensity of the palladium signal compared to the bare ionic film after dipping. These results indicate the role of the phosphinoborate moeity in facilitating additional palladium deposition. Films were then tested for their catalytic ability as described above. After reacting for 36 hours at room temperature, the product 4-methoxybiphenyl was detected by GC-MS analysis in small amounts. After 72 hours at at 40° C., a large increase in product signal was observed. These results indicate that the palladium moieties on the surface of the films were catalytically active and illustrate the immobilization of catalysts.

Surface Modification Using Negatively Charged $Au_{25}L_{18}$ Nanoclusters

Polyelectrolytes have received significant attention within the past decade. The majority of the current research focuses on layer-by-layer (LbL) assemblies and polymerizable ions or ionic liquids (ILs) to generate new materials for a variety of applications. Examples include membranes,[44] gas barriers,[10,37] protective coatings,[11] and antibacterial surfaces.[45] Given these, there is a desire for new fabrication techniques to generate charged surfaces that exhibit beneficial properties. Currently, LbL assemblies dominate the polyelectrolyte coatings literature. This is due to their excellent control over thickness and surface functionality.[46] However, poor mechanical properties, susceptibility to humidity, and morphological changes under acid/basic conditions can be limiting factors in their application.[37,47] The utilization of polymerizable ions presents a new strategy for the generation of mechanically robust, charged surfaces with the capability to perform surface chemistry.

Within the polymerizable ionic liquid field, the bulk of research has focused on nitrogen-based systems. Some of the earliest examples include work by Ohno et al. in 2002 and 2004 with the polymerization of vinyl functionalized imidazolium salts.[48,49] Phosphonium salts however have received much less attention.[18,31] Some examples include work by Long et al. where free radical polymerization was used to form ABA tri-block copolymers,[50] and earlier work by Mcgrath et al. with the formation of poly(arylene ether) phosphonium ionomers.[51] There are very few examples of the photopolymerization of ILs. Some examples include the work by Veith,[52] Gin,[53] Pojman,[54] and a more recent report outlining the utility of our polymerizable phosphonium-borates in a photopolymeric system.[55] The benefits of photopolymerization have been discussed in detail elsewhere.[56] Briefly, they include control over the spacial and temporal polymerization process, reactions that are both solventless and fast, tunable chemistry, and good mechanical properties. However, photopolymer coatings using low-melting point phosphonium salts and their potential applications in materials science have gone unrecognized. This combination may provide the utility of a charged surface to do chemistry upon, possessing all the benefits of the photopolymerization method, without the issues that typically hinder use of LbL assemblies.

Anion-exchange reactions are a convenient and widely used technique to tune the physical and chemical properties of ammonium/phosphonium salts. The system described herein provides an ion-exchange process as a means of surface functionalization of crosslinked phosphonium-acrylate photopolymers. This facile and relatively low energy reaction pathway serves as an excellent method for deposition of a desired anion on to a surface. Given the recent interest in "atomically precise" nanoparticles, the anionic gold nanocluster (AuNC), [TOA][$Au_{25}L_{18}$] (TOA=tetraoctylammonium bromide), hereafter referred to simply as [$Au_{25}L_{18}$]$^-$, has been used here as a model for demonstrating the utility of a polyelectrolyte of the current invention. By means of anion-exchange, [$Au_{25}L_{18}$]$^-$ clusters replaced the anions bound to the covalently linked cationic polymer. [$Au_{25}L_{18}$]$^-$ clusters are known for their solution phase optical absorptivity,[57] photoluminescent,[58] magnetic,[59] and redox properties, and their applications in organic reactions, catalysis,[60,61] optics[62,63] and as nanosensors[64]. Their characteristic, yet sensitive physical features also provide a route to understanding chemistry occurring at the polyelectrolyte surface. It has been found possible through process of this invention to obtain robust and flexible AuNC films on a phosphonium polymer substrate after repeated solvent rinsing, sonication, and exposure to atmosphere. The material has been found to retain its physical properties after controlled deposition to the solid state. The total processing time from application of the pre-polymer formulation, polymerization, and post modification of the surface with [$Au_{25}L_{18}$]$^-$ can be accomplished in a few minutes and is amenable to roll-to-roll processing. In concentrated solutions of [TOA][Br], the deposited AuNC were removed from the surface within a few seconds. The stripped clusters retained their properties from the solid state back into solution, demonstrating the benign nature of the controlled deposition/stripping process. The coating showed no signs of degradation when refunctionalized with fresh [$Au_{25}L_{18}$]$^-$ after repeated cycles. The strong ionic interaction between the cluster and the polymer rendered the AuNC "glued" on to the surface in the absence of any other ions, resulting in excellent adhesion. This illustrates the unique role ion-exchange systems possess as a method for surface functionalization as opposed to covalent systems.

The chemistry involved in LbL assemblies, ionic liquids, and photopolymerization can be said to represent three non-overlapping disciplines. Within 90 seconds, robust polyelectrolytes were synthesized and then used for the controlled deposition of [$Au_{25}L_{18}$]$^-$ through anion-exchange. This benign chemistry is demonstrated using sensitive [$Au_{25}L_{18}$]$^-$ nanoclusters while its properties are harnessed in the solid state.

The phosphonium salt monomer was prepared using a simple $S_N2$ reaction of a slight stoichiometric deficiency of 3-bromo-1-propanol with (n-Bu)$_3$P at elevated temperature. Aliquots of the reaction mixture were sampled at 1 hour intervals and each sample was analyzed by $^{31}P\{^1H\}$ NMR spectroscopy, where singlet at $\delta_P$=34 ppm, indicative of the phosphonium bromide[5]Br product, was observed to be at a maximum. Upon work up of the reaction mixture, the alcohol appended phosphonium salt was isolated in 80% yield. To convert the alcohol to the acrylate, an excess of acryloyl chloride was added dropwise to a mixture of [5]Br and Et$_3$N at −35° C. After stirring at low temperature for 1 hour, and then at room temperature for a further 24 hours a sample of the reaction mixture was obtained, which revealed a slight upfield shift in the $^{31}P\{^1H\}$ NMR spectrum ($\delta_P$=33 ppm). The reaction mixture was worked up via methylene chloride extraction followed by a series of aqueous washes. Upon drying of the volatiles in vacuo, the product [4]Br was isolated in approximately 20% yield.

To prepare crosslinked phosphonium-based polyelectrolyte films (PPF), pre-polymer mixtures with desired photoinitiator (HDMAP), crosslinker (EB 130), and (3-(acryloyloxy)propyl)tributylphosphonium chloride [4]Cl content were deposited on Melinex 725 Teijin PET substrates and metered to a 25 micron thickness using a Meyer rod. The wet film was then irradiated under UV-light for two seconds with 430 mJ/cm$^2$ and an irradiance of 356 mW/cm$^2$, resulting in a transparent, tack-free polymer coating (polymer can also be deposited on glass and peeled off to produce a free standing film). To determine the cure percentage, a comparison of the intensity of the acrylate CH$_2$=CH vibration of the acrylate phosphonium salt (810 cm$^{-1}$) before and after irradiation relative to an internal standard (C=O stretch, 1750 cm$^{-1}$) using FTIR-ATR spectroscopy was performed.[65] The reduced relative intensity of the peak at 810 cm$^{-1}$ is indicative of acrylate conversion during polymerization, where the cure percentage was consistently determined to be 80%.

Before deposition of [$Au_{25}L_{18}$]$^-$, the number of accessible charges on the PPF was quantified. A known protocol utilizing fluorescein dye was employed to determine the value for the above system and to relate this quantity back to the percentage of phosphonium monomers that were included in the original formulation.[23] This procedure is commonly used as a characterization technique for films containing surface-bound quaternary salts. No surface charges were detected for films containing between 1 and 25 wt % of phosphonium salt. At 30 wt %, a dramatic increase in the number of quaternary charges was observed (1.5×10$^{15}$ cations/cm$^2$). Increasing the salt content to 37.5 and 47.5 wt % yielded surfaces with 8.2×10$^{15}$ and 1.4×10$^{16}$ cations/cm$^2$, respectively. Attempts to incorporate more than 47.5 wt % of the electrolyte source resulted in delamination of the film during work up. Coatings with ≤47.5 wt % phosphonium salt displayed excellent adhesion to the substrate as well as maintained a high level of flexibility. These results indicate that a relatively high salt content (>30 wt %) was necessary to cover the surface with quaternary ions when using EB 130 as the cross-linker. Use of low melting phosphonium salts permits formation of a formulation having low viscosity despite the high ion content, allowing for ease of handling and deposition. Use of high melting point organic salts in a similar fashion generates formulations with relatively high viscosities or significant solubility issues, which manifest themselves in poor films. Advantages of the phosphonium-based acrylate monomer in the fabrication of the charged surfaces can thus be seen. To demonstrate the utility of these new materials, films containing 47.5 wt % phosphonium salts were used in studies for the incorporation of $[Au_{25}L_{18}]^-$ onto the polymer.

The synthesis of $[TOA][Au_{25}L_{18}]$ ($L=SCH_2CH_2Ph$) was accomplished using methods reported by Murray[66] and later by Maran[67,68] and their coworkers with some modification.[69] While there has been work done on the characterization of these new materials, the charged nature of the $[Au_{25}L_{18}]^-$ has yet to be taken advantage of in device fabrication. Given the well-understood chemistry associated with ion exchange processes, it was postulated that the bromide anions on the surface of PPF would undergo an anion exchange with $[TOA][Au_{25}L_{18}]$ in solution, to give $[TOA][Br]$ as a metathesis by-product, and a $[Au_{25}L_{18}]^-$ modified phosphonium-based polyelectrolyte film ($Au_{25}$-PPF). This exchange process allows for convenient preparation of solid-state films of $[Au_{25}L_{18}]^-$, while targeting the retention of their solution phase physical properties (F).

Deposition of $[Au_{25}L_{18}]^-$ proceeded by a single "dip-and-rinse" approach. Freshly prepared PPF were cut in to 0.75× 2.5 cm strips and then immersed in a concentrated (0.5 wt %, 5.7 mM) solution of $[TOA][Au_{25}L_{18}]$ in acetonitrile. Upon removal of the films from solution, each sample was rinsed and insonated in toluene to ensure the expulsion of $[TOA][Br]$.

The resulting product possessed an orange color similar to dilute solutions of $[TOA][Au_{25}L_{18}]$ (FIG. 21), although the color intensified/weakened with longer/shorter immersion times. Control experiments using the PET substrate with a cured film of only the crosslinker EB 130 and photoinitiator did not display any colour change after immersion into a solution containing $[Au_{25}L_{18}]^-$, nor did the immersion of a blank PET film. This confirms that the deposition requires the phosphonium salt and that the electrostatic forces between the phosphonium cation and the $[Au_{25}L_{18}]^-$ cluster are critical for the self-assembly.

Figure 21:
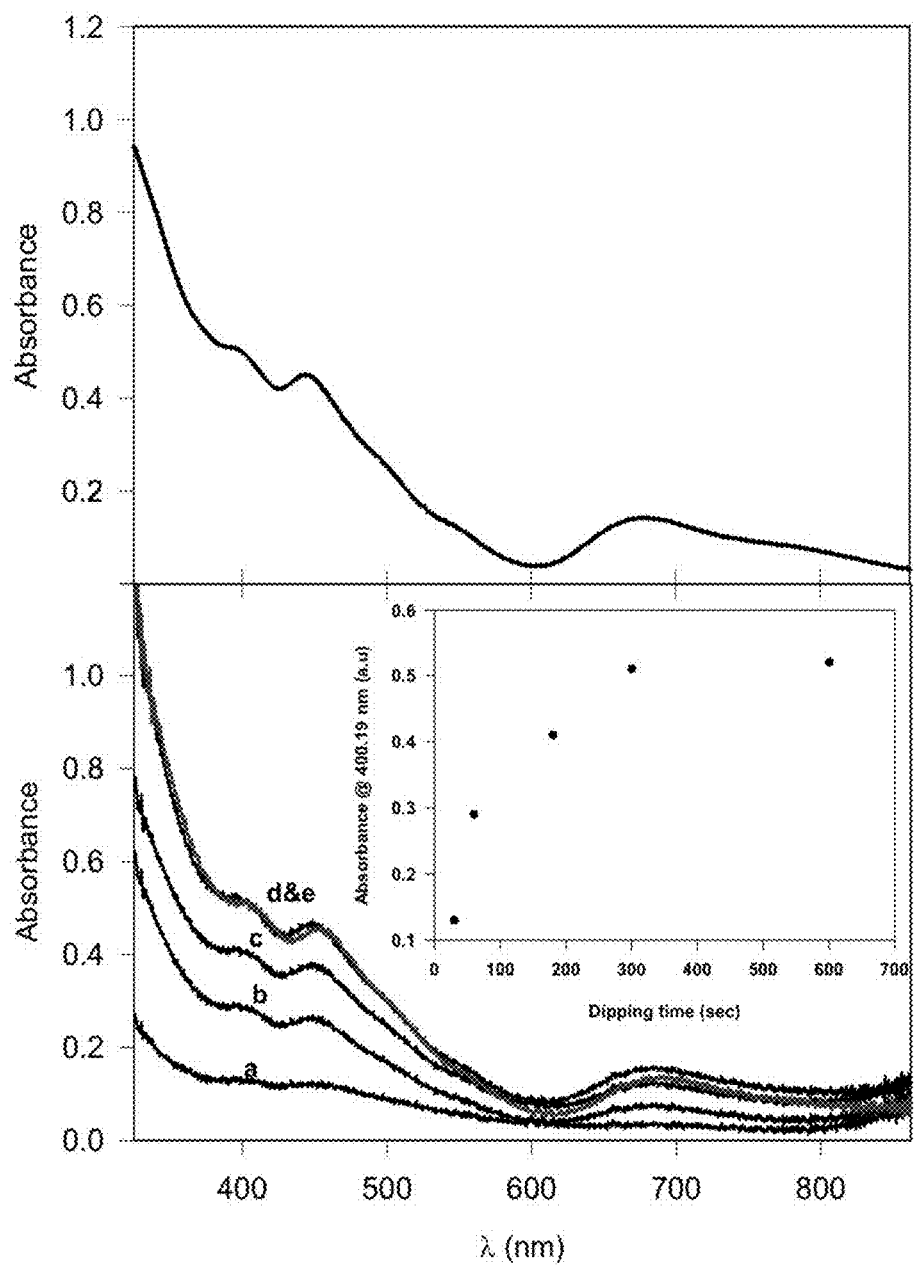
FIG. 21 are UV-vis spectra of Au-25 coated polymer of EB 130 and compound [1]Cl as a function of dipping time in a 5 mg/mL solution of nanocluster in acetonitrile versus absorbance of Au$_{25}^-$ at 400.19 nm. Dipping time at (a) 10 seconds, (b) 1 minute, (c) 3 minutes, (d) 5 minutes, and (e)

The distinctive absorbance of $[Au_{25}L_{18}]^-$ in the UV-vis spectrum can be used in characterization of these $[Au_{25}L_{18}]^-$, and can serve as an indicator for their presence. FIG. 21 shows the UV-vis spectrum of a 0.025 mM solution of $[TOA][Au_{25}L_{18}]$ dissolved in acetonitrile (spectrum a in FIG. 21(b)), along with spectra obtained by dipping the polyelectrolyte film in a 1.9 mM solution of $[TOA][Au_{25}L_{18}]$ for varying amounts of time (spectrum b in FIG. 21(b)). The dilute solution was used to monitor changes in the UV-vis spectrum as a function of immersion time. The increased number of installed $[Au_{25}L_{18}]^-$ on the $Au_{25}$-PPF is evident by the increase in the characteristic absorbance that correlate to the solution UV-vis spectrum of $[TOA][Au_{25}L_{18}]$ ($\lambda_{max}$=410, 460 and 670)[24,67]. In $Au_{25}$-PPF, the peak maxima are slightly shifted to larger wavelength (red shift), consistent with light scattering in the solid state.[70] It should be noted that if the $[Au_{25}L_{18}]^-$ aggregated significantly or decomposed upon incorporation onto the PPF, then the UV-vis spectral features attributable to $Au_{25}NC$ would be absent.[71] After 5 minutes of immersion, no further increase in the absorbance maxima were detected indicating a saturation of exchangeable sites. See the inset of FIG. 21(b).

Successful incorporation of the $[Au_{25}L_{18}]^-$ onto the polymer film was also probed using Energy-dispersive X-ray spectroscopy (EDX; FIG. 22) and powder X-ray Diffraction (PXRD; FIG. 23). EDX analysis of samples before and after dipping in the solution of $[Au_{25}L_{18}]^-$ revealed intense signals for the presence of Au at 2.1205 KeV ($M_a$) and for sulfur at 2.3075 KeV ($L_a$), indicators that the necessary atomic components were present. The persistence of the Br signal before and after immersion is likely a result of the sub-surface bromide anions that were not capable of exchanging, and is consistent with only an outer layer being exposed to solution. Wide-angle PXRD also confirmed the presence of $[Au_{25}L_{18}]^-$ at 2 sin($\theta$) values of 5.2 and 8.2, consistent with the diagnostic fcc-Au configuration already documented in the literature.[72]

The above analysis confirms incorporation of $[Au_{25}L_{18}]^-$ onto the polymer surface. Maintenance of the desired physical properties for potential application was tested to establish usefulness. The solid-state UV-vis spectra supported this, however further experimentation was performed to verify these results. The inherent nature of ionic bonding allows for unique probing methods that are both fast and convenient. $Au_{25}$-PPF was immersed and shaken in a [TOA][Br] solution for several seconds (THF, 20% w/w) in an attempt to strip the surface of $[Au_{25}L_{18}]^-$, and regenerate native PPF. As soon as the film was immersed, the characteristic color of the $[Au_{25}L_{18}]^-$ transferred to solution, which was then analyzed using UV-vis spectroscopy. It was found that the ion-exchange product possessed identical spectral features to $[TOA][Au_{25}L_{18}]$. This not only confirmed that the surface-bound gold was indeed $[Au_{25}L_{18}]^-$, but also supported our assertion that $[Au_{25}L_{18}]^-$ did not decompose or aggregate irreversibly while residing on the polyelectrolyte surface. The UV-vis spectrum of the remaining film was featureless. Similar to the fluorescein dye experiment, one can utilize the solution UV-vis absorption data of the $[Au_{25}L_{18}]^-$ that was exchanged off of the PPF to quantify the number of $[Au_{25}L_{18}]^-$ clusters that were originally on the surface of the film. Using the extinction coefficient of $[TOA][Au_{25}L_{18}]$ in THF ($4.3\times10^4$ $M^{-1}$ $cm^{-1}$ at 400 nm), the effective surface density was determined to be $6.4\times10^{15}$ $[Au_{25}L_{18}]^-$ anions/$cm^2$. This value is within a factor of two relative to the fluorescein dye experiment ($1.4\times10^{16}$), which was taken as agreement and implies that a large majority of the available bromide exchange sites have been occupied. The small difference may be attributed to the slightly larger size of the $[Au_{25}L_{18}]^-$ compared to the fluorescein dye. A possible explanation is that the mechanism for polymer functionalization occurs through swelling of the polymer in acetonitrile, followed by anion-exchange with $[Au_{25}L_{18}]^-$. This process would explain the high charge density observed in the experiments.

Water contact angle (WCA) measurements were conducted to confirm passivation of $Au_{25}$-PFF, as the $[Au_{25}L_{18}]^-$ anion would be expected to be more hydrophobic than halogen anions due to the protecting ligands. While pristine PPF samples exhibited near complete wettability, $Au_{25}$-PPF possessed contact angles slightly below 90°, providing evidence for the formation of a highly passivated surface.

These experiments gave a quantitative indication of $[Au_{25}L_{18}]^-$ loading on the PFF, however they gave little information on the efficacy of the regeneration of the process and the stability of the polyelectrolyte films themselves. An experiment was designed to test the ion-exchange efficacy of the polymer film after multiple exchanges. Freshly prepared PPF were repeatedly functionalized using [TOA][Au$_{25}$L$_{18}$] and stripped using [TOA][Br]. After each functionalization and stripping procedure, a UV-vis spectrum of the film was obtained. By comparing the intensity of the [Au$_{25}$L$_{18}$]$^-$ absorbance after each functionalization/stripping step, we can monitor any changes in the ion-exchange capability of the film. It was found that even after eight cycles, there was no loss in the exchange capability of the surface, as the absorbance values at both 400 and 683 nm remained essentially identical throughout the experiment (FIGS. 24(a) and (b)). These results highlight the efficient chemistry of the ion-exchange process and the reusability of our films.

While these films are capable of withstanding repeated exposure to organic solvents and ion-exchange reactions, the film's mechanical resilience is also notable. Upon the repeated application and removal of Scotch-Tape™ to Au$_{25}$-PPF, no evidence for removal of the gold or damage to the polymer itself was observed. This mechanical strength is attributed to the strong ionic interactions between the gold clusters and the polymer substrate. The crosslinked nature of the polyelectrolyte resulted in physical toughness and resistance to sonication in solvents such as water, acetone, THF, toluene, and acetonitrile, a highly desirable feature not often shared by LbL systems.

To further demonstrate the retention of the solution photophysical properties on Au$_{25}$-PPF, the near-IR photoluminescence (Near-IR PL) spectra of the decorated film were recorded (FIG. 25). A 0.3 mM solution of [TOA][Au$_{25}$L$_{18}$] in acetonitrile and Au$_{25}$-PPF was subjected to excitation at 467 nm, and a peak at 1086 nm was observed for both. The higher occupied molecular orbital (HOMO) and lower unoccupied molecular orbital (LUMO) energy gap are in line with the work published by Murray et al.[58,73,74] The corresponding spectrum collected using the Au$_{25}$-PPF (after 10 minutes dipping in a 1.9 mM solution of the Au$_{25}$$^-$) revealed identical emission peaks indicating [Au$_{25}$L$_{18}$]$^-$ incorporated onto the surface where it maintains its physical properties.

A new class of photopolymerized anion-exchange coatings has thus been fabricated using an acrylate-appended phosphonium salt. The materials for the polymer can be prepared in bulk, while the anion-exchange process is straightforward and takes only a few of seconds. The number of exchangeable anions on the polymer film was quantified and replaced with [Au$_{25}$L$_{18}$]$^-$ nanoclusters. The integrity of the solution phase properties of the nanocluster was maintained in the solid-state as a thin film. Both PPF and Au$_{25}$-PPF were robust, stable in aqueous and organic solvents, and showed excellent mechanical resiliency. Meanwhile, they can be easily reversed and the functional anion recharged simply in a dip-to-dip process. The ability to maintain the properties of the [Au$_{25}$L$_{18}$]$^-$ nanocluster, such as the optical and NIR photoluminescence in a well defined film, coupled with a convenient and fast deposition technique, provides multiple avenues for their exploitation in functional materials. It is contemplated that system is suited for preparing solid-supported [Au$_{25}$L$_{18}$]$^-$ reaction vessels for catalytic reactions, optical devices, and sensors. The phosphonium based polyelectrolyte itself may also serve as a permanently charged, robust substrate on which to perform ionic contact printing or LbL assemblies for onwards chemistry.

Although the foregoing invention has been described in some detail by way of illustration and example for purposes of clarity of understanding, it is apparent to those skilled in the art that certain minor changes and modifications will be practiced. Therefore, the description and examples should not be construed as limiting the scope of the invention.

All references, publications, patents, and patent applications disclosed herein are hereby incorporated by reference in their entirety.

REFERENCES (1) Hutchison, J. B.; Haraldsson, K. T.; Good, B. T.; Sebra, R. P.; Luo, N.; Anseth, K. S.; Bowman, C. N. *Lab on a Chip* 2004, 4, 658.
(2) Johnson, P. M.; Reynolds, T. B.; Stansbury, J. W.; Bowman, C. N. *Polymer* 2005, 46, 3300.
(3) Kannurpatti, A. R.; Anderson, K. J.; Anseth, J. W.; Bowman, C. N. *Journal of Polymer Science Part B-Polymer Physics* 1997, 35, 2297.
(4) Krongauz, V. V. *Thermochimica Acta* 2010, 503, 70.
(5) Barrat, J. L.; Joanny, J. F. *ADVANCES IN CHEMICAL PHYSICS* 1996, 94, 1.
(6) Fuoss, R. M. *Science* 1948, 108, 545.
(7) Katchalsky, A.; Eisenberg, H. *Journal of Polymer Science* 1951, 6, 145.
(8) Qiu, Y.; Park, K. *Advanced Drug Delivery Reviews* 2001, 53, 321.
(9) Hammond, P. T. *Current Opinion in Colloid & Interface Science* 1999, 4, 430.
(10) Yang, Y.-H.; Haile, M.; Park, Y. T.; Malek, F. A.; Grunlan, J. C. *Macromolecules* 2011, 44, 1450.
(11) Andreeva, D. V.; Fix, D.; M☐ohwald, H.; Shchukin, D. G. *Advanced Materials* 2008, 20, 2789.
(12) Cassier, T.; Lowack, K.; Decher, G. *Supramolecular Science* 1998, 5, 309.
(13) Rauf, S.; Zhou, D. J.; Abell, C.; Klenerman, D.; Kang, D. J. *Chemical Communications* 2006, 1721.
(14) Dubacheva, G. V.; Dumy, P.; Auzely, R.; Schaaf, P.; Boulmedais, F.; Jierry, L.; Coche-Guerente, L.; Labbe, P. *Soft Matter* 2010, 6, 3747.
(15) Van der Heyden, A.; Wilczewski, M.; Labbe, P.; Auzely, R. *Chemical Communications* 2006, 3220.
(16) Bertrand, P.; Jonas, A.; Laschewsky, A.; Legras, R. *Macromolecular Rapid Communications* 2000, 21, 319.
(17) Vinogradova, O. I. *Journal of Physics-Condensed Matter* 2004, 16, R1105.
(18) Tindale, J. J.; Ragogna, P. J. *Chem. Commun.* 2009, 1831.
(19) Kim, H. K.; Ju, H. T.; Hong, J. W. *European Polymer Journal* 2003, 39, 2235.
(20) Shapiro, I. R.; Jenkins, D. M.; Thomas, J. C.; Day, M. W.; Peters, J. C. *Chemical Communications* 2001, 2152.
(21) Alvey, L. J.; Rutherford, D.; Juliette, J. J. J.; Gladysz, J. A. *J. Org. Chem.* 1998, 63, 6302.
(22) Poole, R. L.; Buehner, R. W.; Idacavage, M. J. *Degree of Cure Determination of Radiation Curable Systems Using FTIR-ATR Spectroscopy*, UCB Chemicals Corporation, 2000.
(23) Murata, H.; Koepsel, R. R.; Matyjaszewski, K.; Russell, A. J. *Biomaterials* 2007, 28, 4870.
(24) Zhu, M.; Aikens, C. M.; Hollander, F. J.; Schatz, G. C.; Jin, R. *Journal of the American Chemical Society* 2008, 130, 5883.
(25) Sablong, R.; van der Vlugt, J. I.; Thomann, R.; Mecking, S.; Vogt, D. *Adv. Synth. Catal.* 2005, 347, 633.
(26) Honda, K.; Morita, M.; Otsuka, H.; Takahara, A. *Macromolecules* 2005, 38, 5699.
(27) Hare, E. F.; Shafrin, E. G.; Zisman, W. A. *Journal of Physical Chemistry* 1954, 58, 236.

(28) Tindale, J. J.; Na, C.; Jennings, M. C.; Ragogna, P. J. *Canadian Journal of Chemistry-Revue Canadienne De Chimie* 2007, 85, 660.

(29) Miao, H.; Cheng, L. L.; Shi, W. F. *Progress in Organic Coatings* 2009, 65, 71.

(30) Sangermano, M.; Bongiovanni, R.; Longhin, M.; Rizza, G.; Kausch, C. M.; Kim, Y.; Thomas, R. R. *Macromolecular Materials and Engineering* 2009, 294, 525.

(31) Tindale, J. J.; Mouland, K. L.; Ragogna, P. J. *Journal of Molecular Liquids* 2010, 152, 14.

(32) Zhang, H.; Tang, L. C.; Zhou, L. Y.; Eger, C.; Zhang, Z. *Composites Science and Technology* 2011, 71, 471.

(33) Zhang, S. W.; Yu, A. X.; Liu, S. L.; Zhao, J.; Jiang, J. Q.; Liu, X. Y. *Polymer Bulletin* 2012, 68, 1469.

(34) Choi, W.; Tuteja, A.; Mabry, J. M.; Cohen, R. E.; McKinley, G. H. *Journal of Colloid and Interface Science* 2009, 339, 208.

(35) Feng, L.; Zhang, Y. A.; Xi, J. M.; Zhu, Y.; Wang, N.; Xia, F.; Jiang, L. *Langmuir* 2008, 24, 4114.

(36) Hsu, S. H.; Sigmund, W. M. *Langmuir* 2010, 26, 1504.

(37) Priolo, M. A.; Gamboa, D.; Holder, K. M.; Grunlan, J. C. *Nano Letters* 2010, 10, 4970.

(38) Priolo, M. A.; Holder, K. M.; Gamboa, D.; Grunlan, J. C. *Langmuir* 2011, 27, 12106.

(39) Lerot, L.; Low, P. F. *Clays and Clay Minerals* 1976, 24, 191.

(40) Vaia, R. A.; Giannelis, E. P. *Macromolecules* 1997, 30, 8000.

(41) Ceccia, S.; Turcato, E. A.; Maffettone, P. L.; Bongiovanni, R. *Progress in Organic Coatings* 2008, 63, 110.

(42) Lan, T.; Kaviratna, P. D.; Pinnavaia, T. J. *Chemistry of Materials* 1994, 6, 573.

(43) Beele, B.; Guenther, J.; Perera, M.; Stach, M.; Oeser, T.; Bluemel, J. *New Journal of Chemistry* 2010, 34, 2729.

(44) Tagliazucchi, M.; Rabin, Y.; Szleifer, I. *Journal of the American Chemical Society* 2011, 133, 17753.

(45) Karamdoust, S.; Yu, B.; Bonduelle, C. V.; Liu, Y.; Davidson, G.; Stojcevic, G.; Yang, J.; Lau, W. M.; Gillies, E. R. *Journal of Materials Chemistry* 2012, 22, 4881.

(46) Lehaf, A. M.; Hariri, H. H.; Schlenoff, J. B. *Langmuir* 2012, 28, 6348.

(47) Gemici, Z.; Shimomura, H.; Cohen, R. E.; Rubner, M. F. *Langmuir* 2008, 24, 2168.

(48) Yoshizawa, M.; Ogihara, W.; Ohno, H. *Polymers for Advanced Technologies* 2002, 13, 589.

(49) Ohno, H.; Yoshizawa, M.; Ogihara, W. *Electrochim. Acta* 2004, 50, 255.

(50) Cheng, S. J.; Beyer, F. L.; Mather, B. D.; Moore, R. B.; Long, T. E. *Macromolecules* 2011, 44, 6509.

(51) Ghassemi, H.; Riley, D. J.; Curtis, M.; Bonaplata, E.; McGrath, J. E. *ChemInform* 1999, 30, no.

(52) Lin, H.; de Oliveira, P. W.; Veith, M. *Optical Materials* 2011, 33, 759.

(53) Hatakeyama, E. S.; Ju, H.; Gabriel, C. J.; Lohr, J. L.; Bara, J. E.; Noble, R. D.; Freeman, B. D.; Gin, D. L. *Journal of Membrane Science* 2009, 330, 104.

(54) Jimenez, Z. B., Christopher; Hoyle, Charles E.; Lowe, Andrew B.; Zhou, Hui; Pojman, John A. *Journal of Polymer Science, Part A: Polymer Chemistry* 2007, 45, 13.

(55) Berven, B. M.; Oviasuyi, R. O.; Klassen, R. J.; Idacavage, M.; Gillies, E. R.; Ragogna, P. J. *Journal of Polymer Science Part A: Polymer Chemistry* 2012.

(56) Bowman, C. N.; Kloxin, C. J. *AIChE Journal* 2008, 54, 2775.

(57) Devadas, M. S.; Bairu, S.; Qian, H.; Sinn, E.; Jin, R.; Ramakrishna, G. *The Journal of Physical Chemistry Letters* 2011, 2752.

(58) Wang, G.; Huang, T.; Murray, R. W.; Menard, L.; Nuzzo, R. G. *Journal of the American Chemical Society* 2004, 127, 812.

(59) Zhu, M.; Aikens, C. M.; Hendrich, M. P.; Gupta, R.; Qian, H.; Schatz, G. C.; Jin, R. *Journal of the American Chemical Society* 2009, 131, 2490.

(60) Zhu, Y.; Wu, Z.; Gayathri, C.; Qian, H.; Gil, R. R.; Jin, R. *J. Catal.* 2010, 271, 155.

(61) Zhu, Y.; Qian, H.; Drake, B. A.; Jin, R. *Angewandte Chemie International Edition* 2010, 49, 1295.

(62) Ramakrishna, G.; Varnayski, O.; Kim, J.; Lee, D.; Goodson, T. *J Am Chem Soc* 2008, 130, 5032.

(63) Muhammed, M. A. H.; Shaw, A. K.; Pal, S. K.; Pradeep, T. *J. Phys. Chem. C* 2008, 112, 14324.

(64) Wu, Z.; Wang, M.; Yang, J.; Zheng, X.; Cai, W.; Meng, G.; Qian, H.; Wang, H.; Jin, R. *Small* 2012, n/a.

(65) Lee, B. H.; Choi, J. H.; Kim, H. J. *Jct Research* 2006, 3, 221.

(66) Parker, J. F.; Weaver, J. E. F.; McCallum, F.; Fields-Zinna, C. A.; Murray, R. W. *Langmuir* 2010, 26, 13650.

(67) Venzo, A.; Antonello, S.; Gascon, J. A.; Guryanov, I.; Leapman, R. D.; Perera, N. V.; Sousa, A.; Zamuner, M.; Zanella, A.; Maran, F. *Analytical Chemistry* 2011, 83, 6355.

(68) Antonello, S.; Hesari, M.; Polo, F.; Maran, F. *Nanoscale* 2012.

(69) Swanick, K. N.; Hesari, M.; Workentin, M. S.; Ding, Z. *Journal of the American Chemical Society* 2012, 134, 15205.

(70) Amara, J. P.; Swager, T. M. *Macromolecules* 2006, 39, 5753.

(71) Garcia-Raya, D.; Madueno, R.; Blazquez, M.; Pineda, T. *Journal of Physical Chemistry C* 2009, 113, 8756.

(72) Negishi, Y.; Kurashige, W.; Kamimura, U. *Langmuir* 2011, 27, 12289.

(73) Lee, D.; Donkers, R. L.; Wang, G.; Harper, A. S.; Murray, R. W. *Journal of the American Chemical Society* 2004, 126, 6193.

(74) Wang, G.; Guo, R.; Kalyuzhny, G.; Choi, J.-P.; Murray, R. W. The *Journal of Physical Chemistry B* 2006, 110, 20282.

The invention claimed is:

1. A method of forming a polyelectrolyte polymer, the method comprising the step of photopolymerizing a monomer comprising an ionic group covalently linked to a photocurable group, wherein the monomer has structure (A):

$$[R^X\text{-}M\text{-}C^{U(4-X)}]^Z A \qquad (A)$$

wherein:

M is a boron (B) or phosphorus (P) atom,

X is a whole number from 0 to 3, each R and $C^U$ group is selected independently of each other;

each R is an optionally substituted alkyl or aryl group;

each $C^U$ includes a photocurable moiety; and when M is boron, A is a cation, and Z=−1, and when M is phosphorus, A is an anion, and Z=+1.

2. The method of claim 1, wherein said alkyl group is C1-C30 straight chain, branched or cycloalkyl, and the alkyl group is optionally substituted with one or more of halogen and optionally substituted phenyl.

3. The method of claim 2, wherein said optionally substituted phenyl group is substituted with one or more of halogen and C1-C6 alkyl.

4. The method of claim 1, wherein said aryl group is a phenyl group optionally substituted up to five times with a halogen, C1-C30 straight chain, branched or cycloalkyl, and the alkyl group is optionally substituted with one or more halogen, wherein each substitution is made independently of the other.

5. The method of claim 1, wherein M is phosphorus, and-R is an optionally substituted alkyl group.

6. The method of claim 5, wherein R has the formula —CH$_2$R' in which R' is C1-C29 straight chain, branched or cycloalkyl, and the alkyl group is optionally substituted with one or more of halogen and optionally substituted phenyl.

7. The method of claim 5, wherein R has the formula —CH$_2$ CH$_2$R'' in which R'' is C1-C28 straight chain, branched or cycloalkyl, and the alkyl group is optionally substituted with one or more of halogen and optionally substituted phenyl.

8. The method of claim 6, wherein each of R' and R'' is perfluorinated.

9. The method of claim 6, wherein the optional phenyl substituents are halogen or C1-C8 alkyl.

10. The method of claim 1, wherein M is boron, and-each R is an optionally substituted aryl group.

11. The method of claim 10, wherein the aryl group is optionally substituted phenyl wherein the optional substituents are halogen, C1-C8 alkyl.

12. The method of claim 1, wherein the photocurable moiety is selected from the group consisting of alkene, isocyanate, alcohol, epoxide, and thiol, wherein the alkene is optionally conjugated with a carbonyl and aryl group.

13. The method of claim 12, wherein M is phosphorus and C$^U$ has the formula —(C1-C12 alkyl)-R$^U$ wherein R$^U$ includes said photocurable moiety.

14. The method of claim 13, wherein R$^U$ has the structure defined by formula (B) or (C):

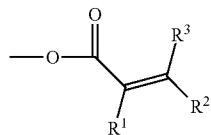
(B)

wherein each of R$^1$, R$^2$ and R$^3$ of (B) is independently selected from the group consisting of H, methyl, ethyl and propyl;

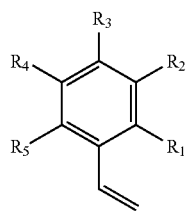
(C)

wherein at least one of R$^1$, R$^2$, R$^3$, R$^4$ and R$^5$ of (C) is a bond covalently linking the aromatic ring of (C) to the C1-C12 alkylene diradical of —(C1-C12)-R$^U$, and each of the others of R$^1$, R$^2$, R$^3$, R$^4$ and R$^5$ is selected independently from the group consisting of H, halogen and optionally substituted C1-C8 alkyl.

15. The method of claim 14, wherein M is boron and-C$^U$ is optionally substituted aryl.

16. The method of claim 14, wherein C$^U$ has the structure defined by formula (C):

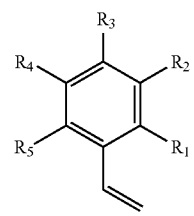
(C)

wherein at least one of R$^1$, R$^2$, R$^3$, R$^4$ and R$^5$ of (C) is a bond and each of the others of R$^1$, R$^2$, R$^3$, R$^4$ and R$^5$ is selected independently from the group consisting of H, halogen and C1-C8 alkyl.

17. The method of claim 1, wherein the step of photopolymerizing includes photopolymerizing a mixture of two or more monomers.

18. The method of claim 1, wherein the step of photopolymerizing includes photopolymerizing a mixture of a monomer and a cross-linking agent.

19. The method of claim 18, further comprising forming a homogeneous mixture of the monomer and the cross-linking agent prior to the step of photopolymerizing.

20. The method of claim 19, wherein the forming a homogeneous mixture includes sonicating the mixture of at least two monomers.

21. The method of claim 20, wherein sonicating includes insonating.

22. The method of claim 19, wherein the step of forming a homogeneous mixture includes mixing a solvent and the monomer and the cross-linking agent.

23. The method of claim 19, wherein the step of forming a homogeneous mixture includes mixing the monomer and the cross-linking agent together in the absence of solvent.

24. The method of claim 19, wherein the cross-linking agent comprises one or more of EB 130, ethylene glycol diacrylate, hexanediol diacrylate, diethylene glycol diacrylate, glycerol diacrylate, trimethylol propane triacrylate, hexane diol dimethacrylate, glycerol triacrylate, trimethylolpropane triacrylate, ethylene glycol dimethacrylate, 1,3-propanediol dimethacrylate, 1,2,4-butanetriol trimethacrylate, and 1,4-butanediol diacrylate.

25. A method of forming a composite material comprising photopolymerizing a mixture of a monomer as defined by claim 1, and nanoparticles and/or microparticles.

26. The method of claim 25, wherein the nanoparticles comprise silica.

27. The method of claim 26, wherein nanoparticles are passivated.

28. The method of claim 1, wherein the step of photopolymerizing is part of a roll-to-roll polymer production process.

29. A polyelectrolyte polymer produced according to the method of claim 1.

30. A polyelectrolyte polymer that is the photocured reaction product of a monomer as defined by claim 1.

31. A polyelectrolyte polymer that is the photocured reaction product of a monomer as defined by claim 1 and a cross-linking agent.

32. The polyelectrolyte of claim 31, wherein the cross-linking agent is one or more of EB 130, ethylene glycol diacrylate, hexanediol diacrylate, diethylene glycol diacrylate, glycerol diacrylate, trimethylol propane triacrylate, hexane diol dimethacrylate, glycerol triacrylate, trimethylolpropane triacrylate, ethylene glycol dimethacrylate, 1,3-propanediol dimethacrylate, 1,2,4-butanetriol trimethacrylate, and 1,4-butanediol diacrylate.

33. A polyelectrolyte polymer comprising a polymer matrix having a phosphonium or borate salt, or a combination thereof, covalently linked thereto wherein the salt has structure (A):

  (A)

wherein:
M is a boron (B) or phosphorus (P) atom,
X is a whole number from 0 to 3,
each R and $C^U$ group is selected independently of each other;
each R is an optionally substituted alkyl or aryl group;
each $C^U$ includes a photocurable moiety; and
when M is boron, A is a cation, and Z=−1, and
when M is phosphorus, A is an anion, and Z=+1.

34. The polyelectrolyte polymer of claim 33, wherein the matrix is crosslinked.

35. The polyelectrolyte polymer of claim 33, wherein the polymer surface has a water contact angle between about 120° and about 150°.

36. The polyelectrolyte polymer of claim 33, wherein the salt is a phosphonium salt having at least one of said R-group covalently attached thereto.

37. The polyelectrolyte polymer of claim 36, wherein the R-group is substituted with one or more halogen atoms, preferably fluorine atoms.

38. The polyelectrolyte polymer of claim 36, wherein the phosphonium salt has three said R-groups covalently attached thereto, wherein the R-groups are the same or different from each other.

39. The polyelectrolyte polymer of claim 33, wherein the salt is a borate salt having at least one of said R-group covalently attached thereto.

40. The polyelectrolyte polymer of claim 33, wherein the salt comprises a phosphonium ion and anion on an outer surface of the polymer.

41. The polyelectrolyte polymer of claim 40, wherein the anion is one or more of those selected from the group consisting of carboxylates ($CH_3CO_2^-$, $C_2H_5CO_2^-$, optionally substituted $ArCO_2^-$), sulfates ($HSO_4$, $CH_3SO_4^-$), sulfonates ($CH_3SO_3^-$), tosylates, and fluoroorganics ($CF_3SO_4^-$, $(CF_3SO_2)_2N$, $(C_2F_5SO_2)_2N$, $(C_3F_7SO_2)_2N^-$, $CF_3CO_2^-$, tetraphenylborate, triphenyl(substituted aryl)borate, diphenylbis(substituted aryl)borate, phenyltris(substituted aryl)borate, tetrakis(substituted aryl)borate and tetrakis (pentafluorophenyl)borate).

42. The polyelectrolyte of claim 41, wherein aryl substituents are one or more of vinyl, $CF_3$, $OCH_3$, methyl, ethyl, propyl, butyl, pentyl.

43. The polyelectrolyte of claim 40, wherein the anion is one or more of those selected from the group consisting of $ClO_4^-$, fluoroinorganics ($PF_6^-$, $BF_4^-$, $AsF_6^-$, $SbF_6^-$) and halides ($Br^-$, $I^-$, $Cl^-$).

44. The polyelectrolyte polymer of claim 33, wherein the salt comprises a phosphonium ion and the surface of the polymer is coated with $[Au_{25}L_{18}]$.

45. A composite material comprising the polyelectrolyte polymer of claim 33 and nanoparticles and/or microparticles incorporated into the matrix of the polymer.

46. The composite material of claim 45, wherein the particles are nanoparticles, and the material has a surface having a water contact angle between about 120° and about 150°.

47. The composite material of claim 45, wherein the salt comprises a phosphonium ion anionic layer comprises a layerable material selected from the group consisting of clays, colloidal silica, inorganic hydroxides, silicon based polymers, polyoligomeric silsesquioxane, carbon nanotubes, graphene, or any combinations thereof, wherein the clay is suitable for use in an anionic solution may be used: sodium montmorillonite, hectorite, saponite, Wyoming bentonite, halloysite and any combinations thereof.

48. The method of claim 7, wherein each of R' and R" is perfluorinated.

49. The method of claim 7, wherein the optional phenyl substituents are halogen or C1-C8 alkyl.

* * * * *